(12) United States Patent
Sieckowski et al.

(10) Patent No.: US 11,861,449 B2
(45) Date of Patent: Jan. 2, 2024

(54) SINGLE SLOT CRADLE WITH INTERCHANGEABLE TOPS

(71) Applicant: ZEBRA TECHNOLOGIES CORPORATION, Lincolnshire, IL (US)

(72) Inventors: Steven D. Sieckowski, Port Jefferson, NY (US); Jaxon Paul, Holtsville, NY (US); Roland Wing Fai Lee, Jericho, NY (US); Eric M. Malmed, Selden, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 119 days.

(21) Appl. No.: 17/333,398

(22) Filed: May 28, 2021

(65) Prior Publication Data

US 2022/0383012 A1 Dec. 1, 2022

(51) Int. Cl.
*G06K 7/10* (2006.01)
*H02J 7/00* (2006.01)

(52) U.S. Cl.
CPC ........ *G06K 7/10881* (2013.01); *H02J 7/0044* (2013.01); *G06K 2007/10524* (2013.01)

(58) Field of Classification Search
CPC ............ G06K 7/10881; G06K 7/10376; H02J 7/0044
USPC .......................... 235/472.01, 462.45, 462.43
See application file for complete search history.

(56) References Cited

U.S. PATENT DOCUMENTS

| 9,277,668 | B2 | 3/2016 | Feng et al. | |
| 9,825,476 | B2 | 11/2017 | Mazzone | |
| 9,881,292 | B2 | 1/2018 | Hicks et al. | |
| 11,068,680 | B1 * | 7/2021 | Kállay | G06K 7/1413 |
| 2004/0169084 | A1 * | 9/2004 | Tamburrini | G06K 7/1096 |
| | | | | 235/462.38 |
| 2007/0038434 | A1 * | 2/2007 | Cvetko | G06F 1/1632 |
| | | | | 703/23 |

(Continued)

FOREIGN PATENT DOCUMENTS

DE 202005019744 U1 6/2006

OTHER PUBLICATIONS

International Search Report and Written Opinion for International Application No. PCT/US2022/015560 dated May 3, 2022.

*Primary Examiner* — Edwyn Labaze

(57) ABSTRACT

Single slot cradles with interchangeable tops are disclosed herein. An example cradle includes a base assembly including a coupling mechanism, a top housing assembly operably coupled with the coupling mechanism, a circuit board assembly, and a first cup assembly. The top housing assembly includes a housing opening. The circuit board assembly is at least partially disposed within the housing opening and includes a board communication interface and at least one of a power interface or a data connection interface. The first cup assembly removably couples with at least one of the base assembly or the top housing assembly and includes at least one dock to operably couple with a handheld scanning device and further includes a cup communication interface. The board communication interface communicatively couples with the cup communication interface to allow transmission between at least one of the power interface or the data interface and the handheld scanning device.

19 Claims, 73 Drawing Sheets

(56) References Cited

U.S. PATENT DOCUMENTS

| | | | |
|---|---|---|---|
| 2015/0220765 A1* | 8/2015 | Carnevali | G06K 7/10881 |
| | | | 235/462.45 |
| 2016/0203455 A1* | 7/2016 | Hicks | G06Q 20/204 |
| | | | 235/449 |
| 2017/0140363 A1* | 5/2017 | Hicks | G06K 7/10297 |
| 2019/0334358 A1 | 10/2019 | Fountain et al. | |
| 2020/0380219 A1 | 12/2020 | Zhao et al. | |

\* cited by examiner

SINGLE SLOT CRADLE WITH INTERCHANGEABLE TOPS

BACKGROUND

Handheld barcode readers and/or scanning devices may be used in various environments such as, for example, warehouse environments, checkout stations, and/or other similar settings. These scanning devices may come in varying configurations and/or sizes depending on a use environment. For example, some handheld scanning devices may be in the form of a scan "sled" or "gun," while other handheld scanning devices may be in the form of a scan sled with an additional terminal coupled therewith. Other arrangements are possible. Different configurations of these handheld scanning devices may require distinct charging and/or retention mechanisms. For example, a cradle may be provided having a cup that includes an opening that corresponds to the shape of the handheld scanning device to retain a portion of the device and, optionally, to provide power and/or data transmission thereto. However, because handheld scanning devices may have a number of configurations, separate cradles having cups with corresponding distinct configurations are often needed. It may be cumbersome to modify these cradles to replace the cup with one that can accommodate a different handheld scanning device.

Accordingly, there is a need for improved accessories having improved functionalities.

SUMMARY

In accordance with a first aspect, a single slot cradle includes a base assembly including a coupling mechanism, a top housing assembly operably coupled with the coupling mechanism, a circuit board assembly, and a first cup assembly. The top housing assembly includes a housing opening. The circuit board assembly is at least partially disposed within the housing opening and includes a board communication interface and at least one of a power interface or a data connection interface. The first cup assembly removably couples with at least one of the base assembly or the top housing assembly and includes at least one dock to operably couple with a handheld scanning device and further includes a cup communication interface. The board communication interface communicatively couples with the cup communication interface to allow transmission between at least one of the power interface or the data interface and the handheld scanning device.

In a variation of this embodiment, the cup communication interface is in the form of a flex tail interconnection. In some examples, the at least one dock of the first cup assembly includes at least one leaf spring contact or a pogo pin connection. In some examples, the board communication interface includes at least one of a leaf spring contact or a pogo pin connection.

In some examples, the cradle may include a retention mechanism that secures the first cup assembly with the top housing assembly. The retention mechanism may be in the form of a coin screw.

In some approaches, the first cup assembly further includes a latch that rotatably couples the first cup assembly with the top housing assembly or the base assembly.

Further, in some approaches, the first cup assembly may include a first dock that receives a sled of the handheld scanning device and a second dock that receives a terminal of the handheld scanning device. In any of these approaches, the cradle may retain a plurality of base assemblies.

In accordance with a second aspect, a cradle for a handheld scanning device includes a base assembly including a coupling mechanism, a top housing assembly operably coupled with the coupling mechanism, and a circuit board assembly. The top housing assembly includes a housing opening, and the circuit board assembly is at least partially disposed within the opening. The circuit board assembly includes at least one of a power interface or a data connection interface and further includes a board communication interface to removably couple with at least one of a first cup assembly or a second cup assembly. The first cup assembly includes a cup communication interface to communicatively couple with the board communication interface and at least one dock having a first configuration to operably couple with a handheld scanning device. The second cup assembly includes a cup communication interface to communicatively couple with the board communication interface and at least one dock having a second configuration to operably couple with the handheld scanning device.

In accordance with a third aspect, an approach for manufacturing a cradle having a replaceable cup assembly includes operably coupling a cable with an interface of a circuit board assembly. The circuit board assembly further includes a board communication interface. The approach further includes at least partially disposing the circuit board assembly within a top housing opening of a top housing assembly, operably coupling the top housing assembly with a coupling mechanism of a base assembly, and removably coupling a first cup assembly including a cup communication interface and at least one dock to operably couple with a handheld scanning device with at least one of the base assembly or the top housing assembly.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
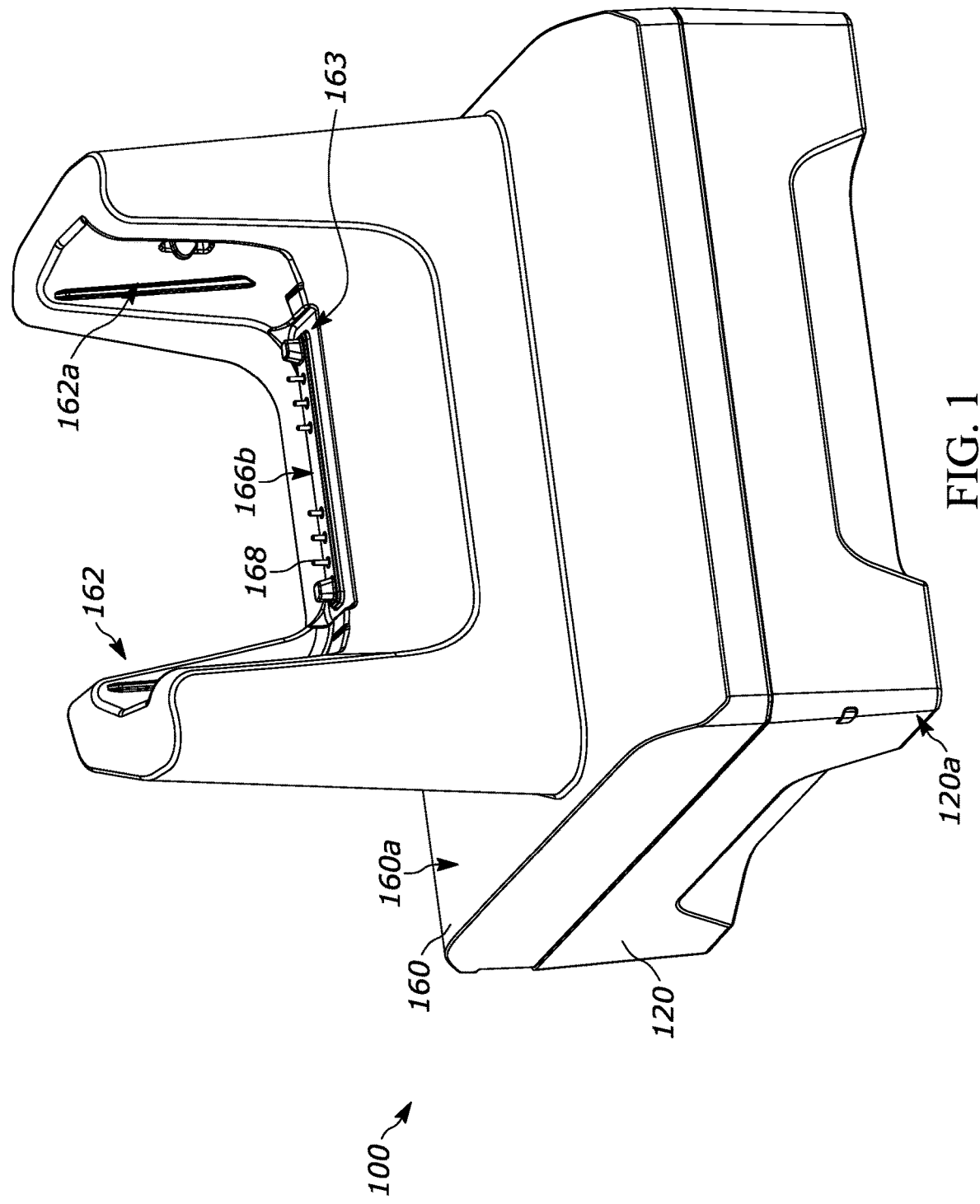
FIG. 1 illustrates a front perspective view of an example cradle for a handheld scanning device in accordance with various embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Generally speaking, pursuant to these various embodiments, a cradle capable of retaining and/or charging a handheld scanning device or devices is described herein. The cradle may have interchangeable cup assemblies that are capable of receiving different configurations of scanning devices, and may be quickly replaceable by a user without the use of complex tools. Advantageously, a user needn't unplug power and/or data transmission cables when replacing the cup assemblies, thereby reducing downtime and complexity.

Turning to FIGS. 1-14, a first example cradle 100 for a handheld scanning device 101 is provided that includes a base assembly 120 having a coupling mechanism 124, a top housing assembly 130, a circuit board assembly 150, and a first cup assembly 160. The base assembly 120 includes a lower support side 120*a*, an upper side 120*b*, and a sidewall 120*c* extending therebetween. The base 120 further defines a cavity 121 which may receive any number of components such as, for example, circuit board assemblies and the like. The base 120 may rest on any number of support members positioned on the lower support side 120*a*. The base assembly 120 may accommodate any number of components such as, for example, circuit boards, mechanical, and/or other electromechanical components. For example, any number of power and/or data transmission ports 122 may be at least partially disposed within the cavity 121 and may be positioned adjacent to the sidewall 120*c* to receive a power and/or data transmission cable (e.g., a USB-C cable). Other examples are possible.

Figure 2:
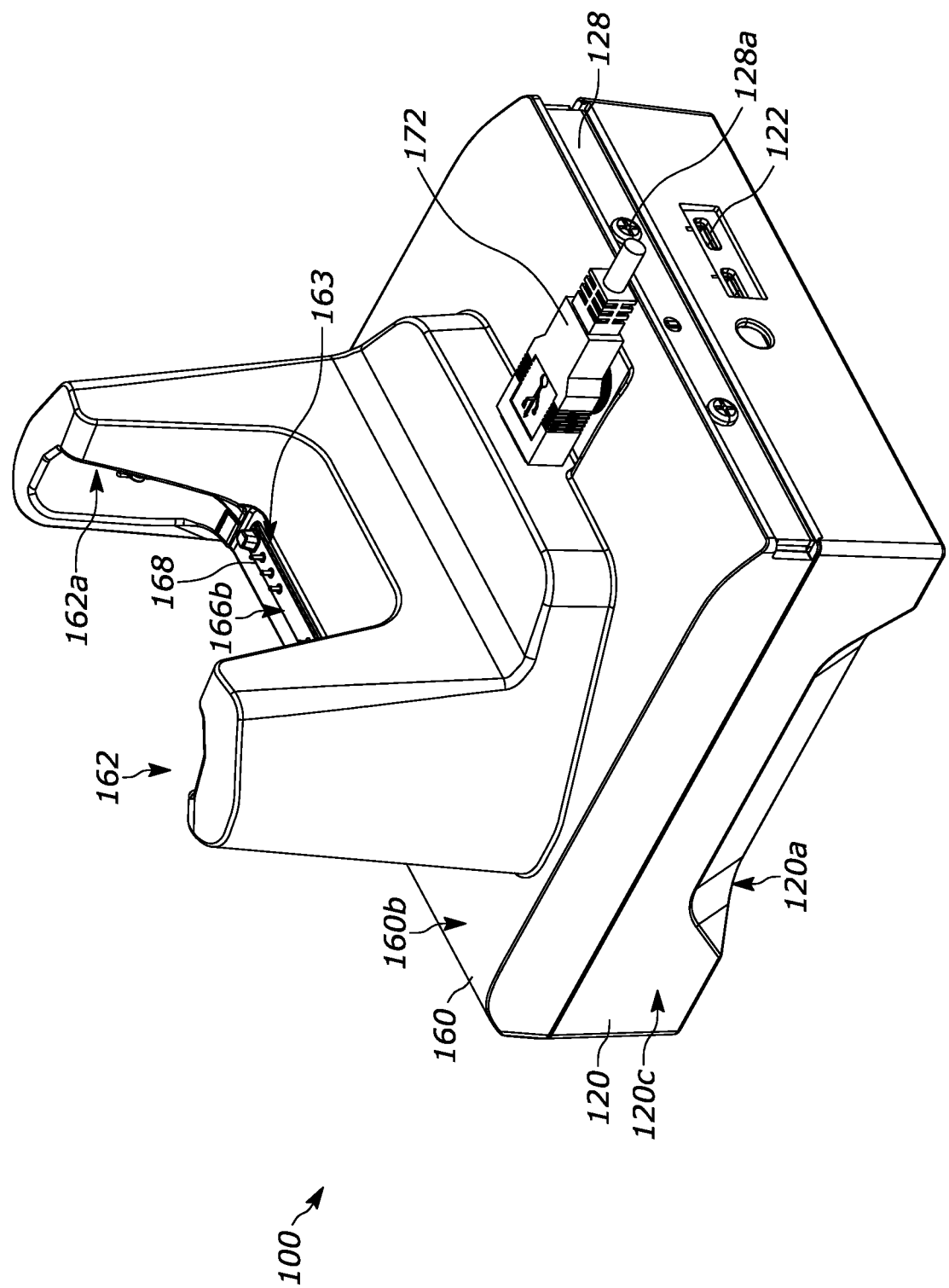
FIG. 2 illustrates a rear perspective view of the example cradle of FIG. 1 having a first example cup assembly in accordance with various embodiments.
Figure 3:
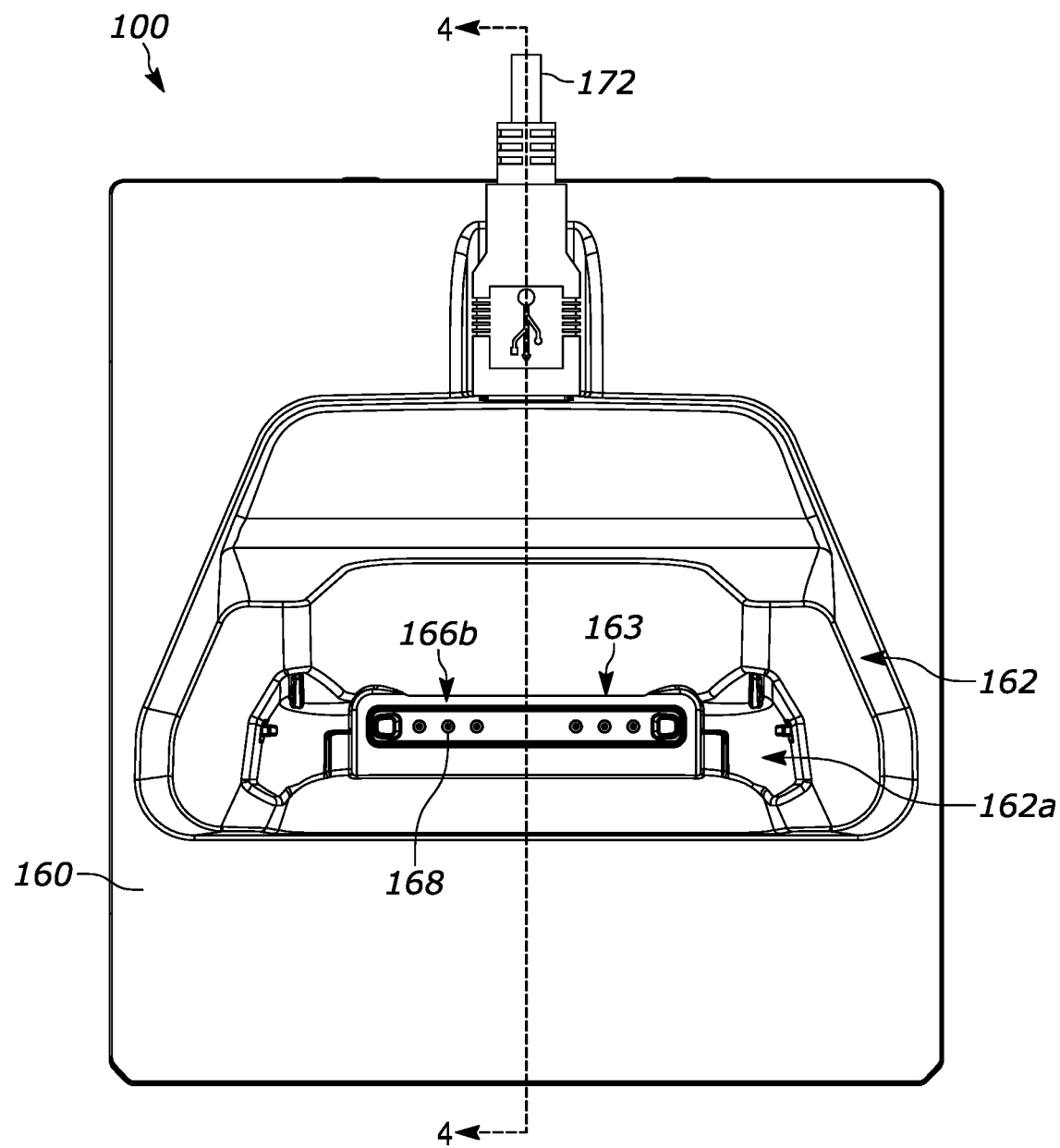
FIG. 3 illustrates a top plan view of the example cradle of FIGS. 1 & 2 in accordance with various embodiments.
Figure 4:
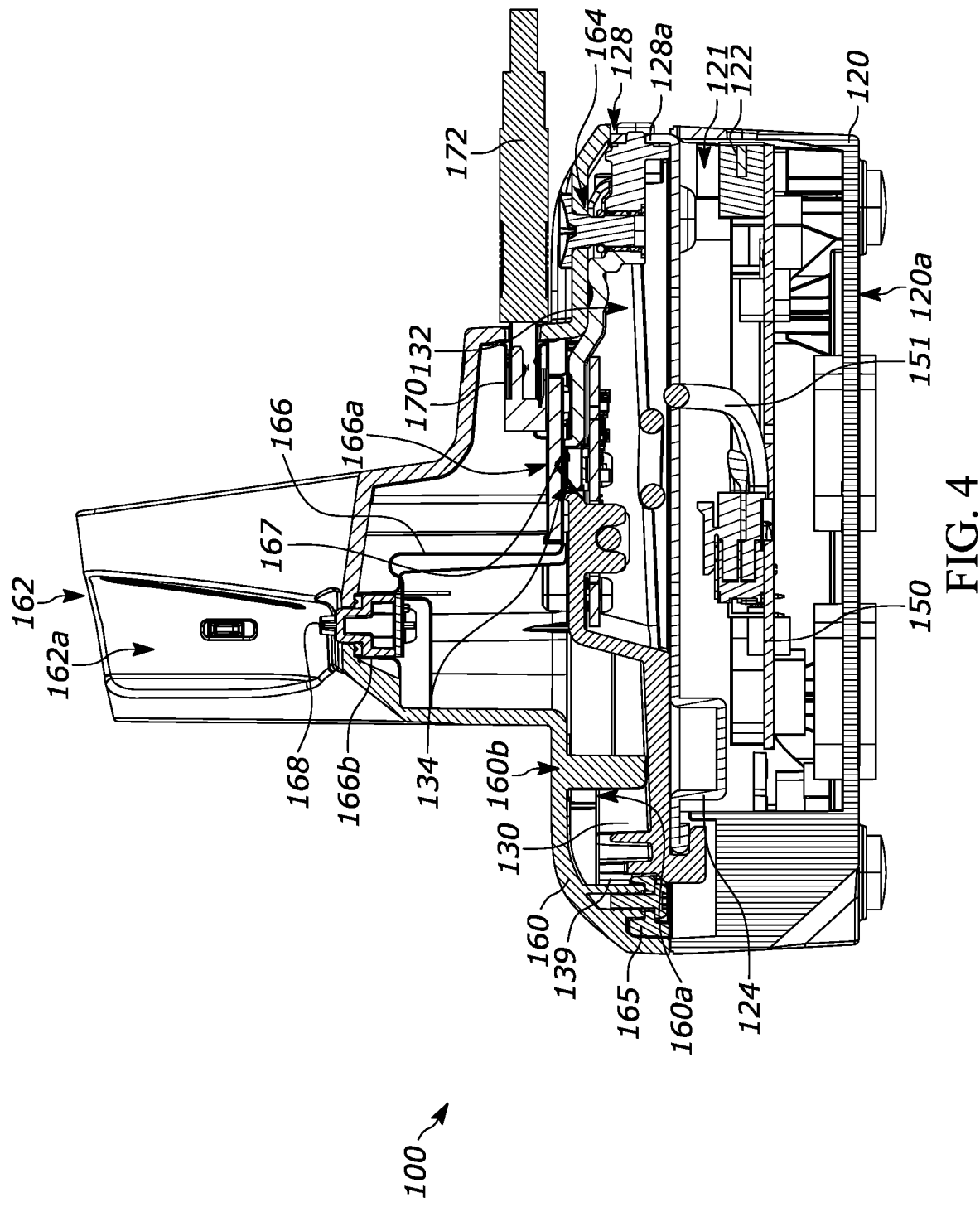
FIG. 4 illustrates a side elevation cross-sectional view of the example cradle of FIGS. 1-3 in accordance with various embodiments.
Figure 5:
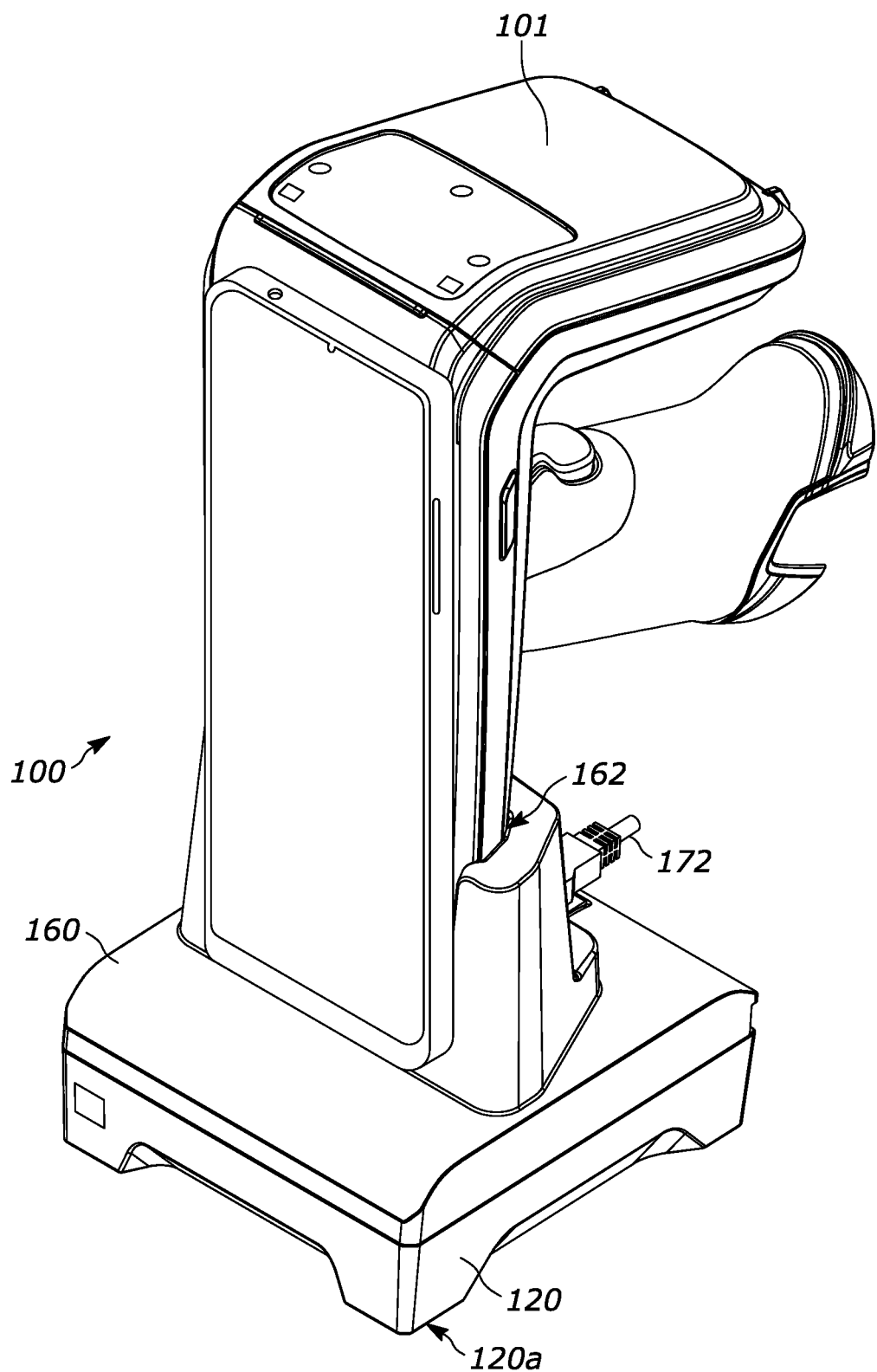
FIG. 5 illustrates a front perspective view of the example cradle of FIGS. 1-4 including a first example handheld scanning device in accordance with various embodiments.
Figure 6:
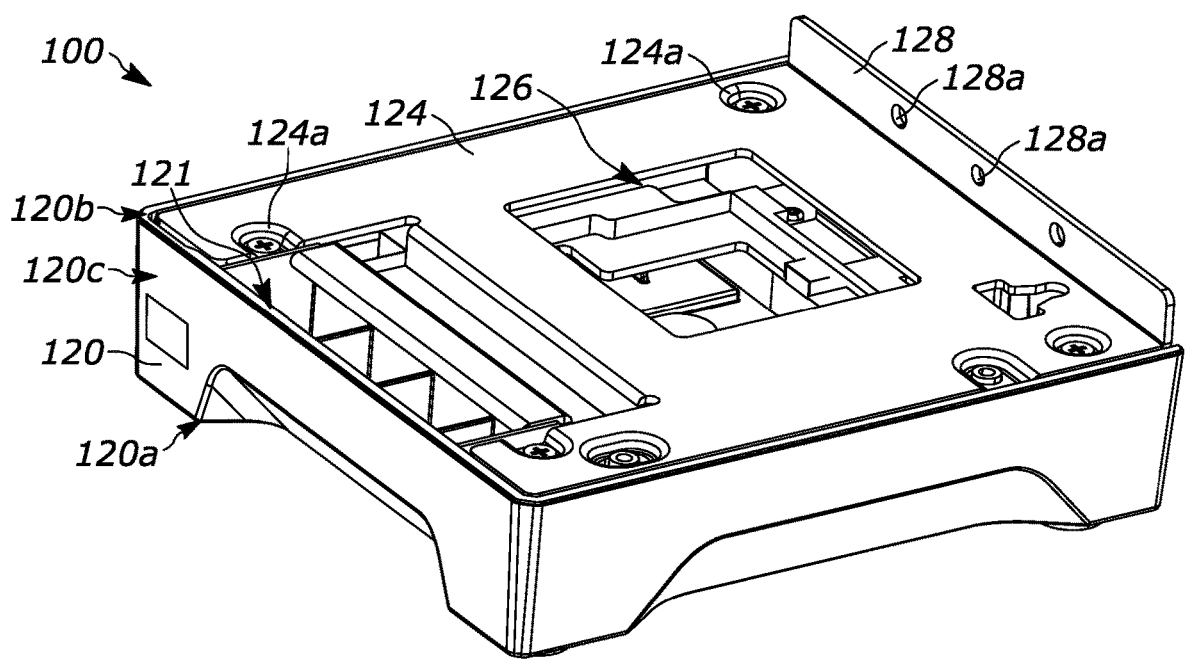
FIG. 6 illustrates a front perspective view of an example base assembly for use with the example cradle of FIGS. 1-5 in accordance with various embodiments.

As illustrated in FIGS. 2, 4, and 6, the coupling mechanism 124 is in the form of a plate that is positionable over the upper side 120*b* of the base assembly 120. In the illustrated example, the coupling mechanism 124 includes a number of base mounting openings 124*a* to receive fasteners or other securement mechanisms to secure the coupling mechanism 124 with the base assembly 120. However, other examples such as latches, protrusions, and/or a friction-fit coupling are possible. The coupling mechanism 124 includes a component opening 126 and a top housing mounting region 128. The component opening 126 is dimensioned to receive any number of electromechanical components such as, for example, the circuit board assembly 150. The top housing mounting region 128 is in the form of a raised ledge or flange that includes openings 128*a* to receive a fastener or fasteners.

The top housing assembly 130 is in the form of a plate adapted to be positionable over the upper side 120*b* of the base assembly 120 and the coupling mechanism 124. The top housing assembly 130 includes a lower side 130*a*, an upper side 130*b*, a circuit board recess 132, a housing opening 134, a coupling mechanism mounting region 136 (FIG. 8), and a cup retention mechanism 137. The circuit board recess 132 extends upwardly from the upper side 130*b* of the housing assembly 130 and is dimensioned to receive at least a portion of the circuit board assembly 150. Further, the opening 134 is disposed through an upper surface of the circuit board recess 132. The top housing assembly 130 further includes any number of alignment and/or positioning members such as, for example, alignment members 138 and front alignment members 139.

The circuit board assembly 150 may include any number of components or subcomponents to perform electrical and/or electromechanical functions. For example, the circuit board assembly 150 may include a board communication interface 152 and any number of power interfaces 154 and/or data connection interfaces 156. In some examples, the interfaces may be capable of transmitting both power and data, and as such, a single interface may be used. These interfaces may receive power and/or data connection cables 151 (FIGS. 4 & 8) which are then coupled with the power and/or data transmission ports 122.

Figure 7:
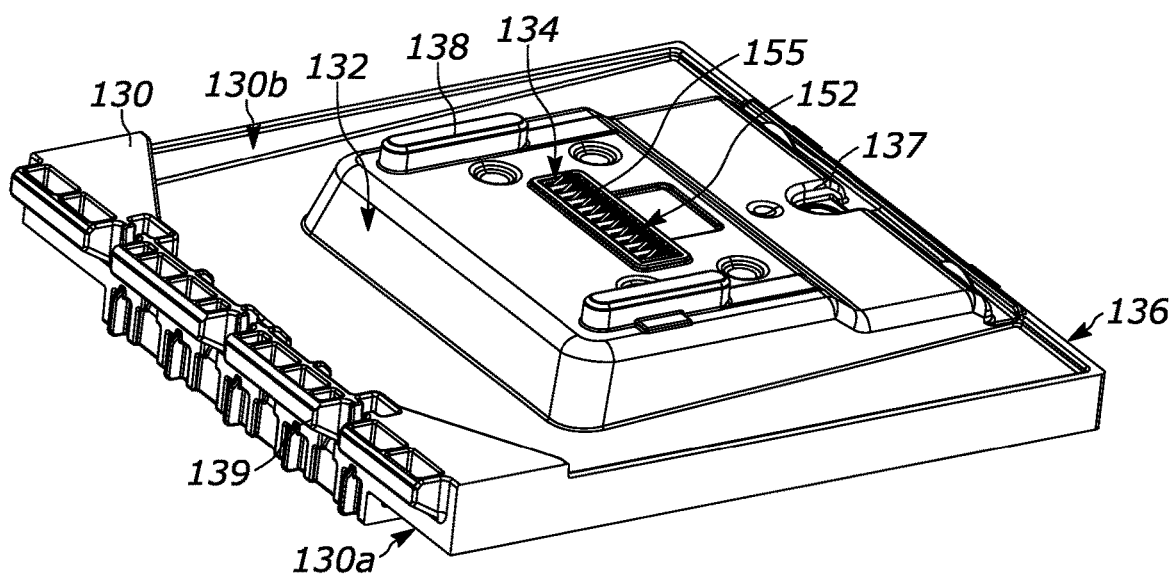
FIG. 7 illustrates a front perspective view of an example top housing assembly for use with the example cradle of FIGS. 1-5 in accordance with various embodiments.
Figure 8:
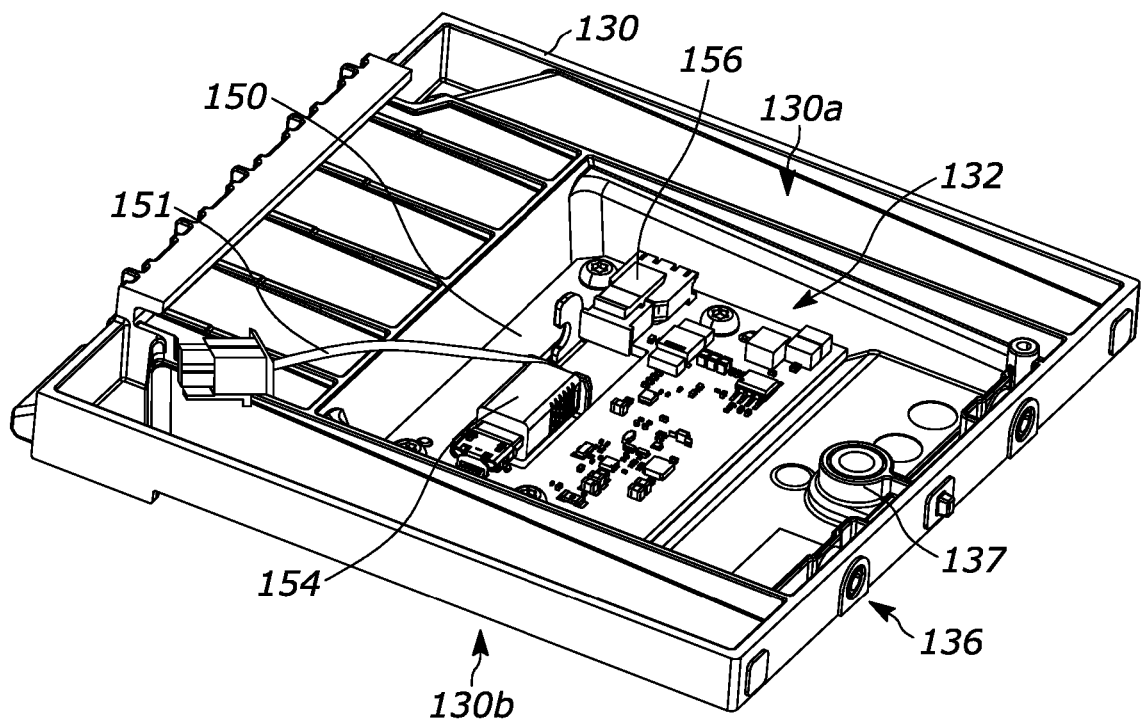
FIG. 8 illustrates a lower perspective view of the example top housing assembly of FIG. 7 in accordance with various embodiments.

The board communication interface 152 is generally positioned within and/or through the housing opening 134. Further, the board communication interface 152 may include any number of interconnects 155 such as leaf spring connectors, pogo pin connectors, and the like to form a communicative and/or electrical coupling, thereby allowing data and/or power transmission. In other examples, inductive charging mechanisms for electrical transmission may be used. As illustrated in FIGS. 4, 7, and 8, the circuit board 150 is at least partially disposed within the circuit board recess 132 of the top housing assembly 130, and may be operably coupled and/or secured therewith via any number of suitable approaches such as, for example, fasteners, adhesives, tabs, protrusions, and/or friction-fit couplings.

Figure 9:
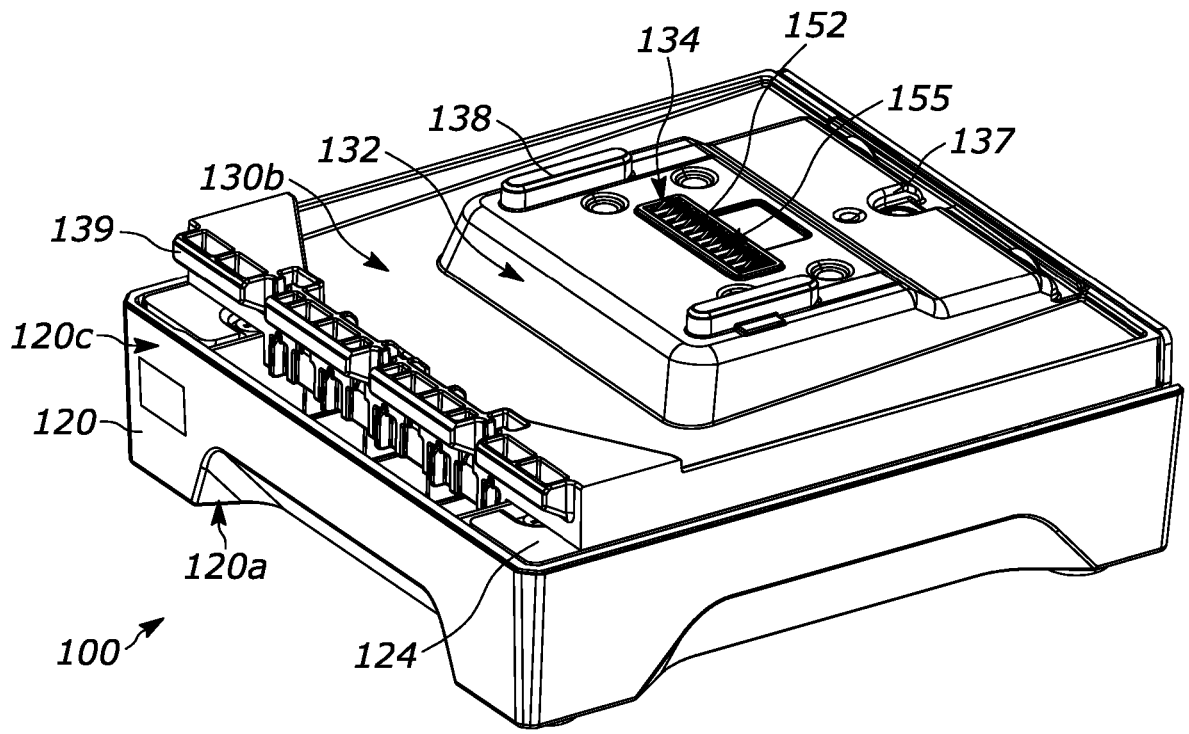
FIG. 9 illustrates an front perspective view of the example base assembly of FIG. 6 coupled with the example top housing of FIGS. 7 & 8 in accordance with various embodiments.

Upon or before operably coupling the circuit board assembly 150 with the top housing assembly 130, a first end of the power and/or data connection cable(s) 151 may be coupled with the power interface 154 and/or the data interface 156 of the circuit board assembly 150 and the opposing end of the power and/or data connection cables 151 may be coupled with the internal connection of the power and/or data transmission port or ports 122. With reference to FIG. 9, the top housing assembly 130 is operably coupled with the base assembly 120 by positioning the lower side 130*a* of the top housing assembly 130 adjacent to the upper side 120*b* of the base assembly 120. More specifically, the lower side 130*a* of the top housing assembly 130 is aligned with the coupling mechanism 124 of the base assembly 120 such that the coupling mechanism mounting region 136 of the top housing assembly 130 is aligned with the top housing mounting region 128 of the coupling mechanism 124. In the illustrated example, a fastener such as a screw or a bolt may be inserted into the openings 128*a* of the top housing mounting region 128, but other approaches for securing and/or operably coupling the top housing assembly 130 with the base assembly 120 are possible.

The first cup assembly 160 includes a body having a lower side 160*a*, an upper side 160*b*, and any number of docks 162. The dock 162 includes slots, channels, and/or tracks 162*a* that are sized and dimensioned to receive a handheld scanning device 101 having a specific configuration or shape. An opening 162*b* extends through the lower and upper sides 160*a*, 160*b* of the dock 162 through which a portion of a cup communication interface 166 is at least partially disposed. The first cup assembly 160 further includes a retention mechanism 164 and a latch 165. More specifically, the first cup assembly 160 may be operably coupled with the top housing assembly 130 by first engaging the latch 165 with the front alignment members 139 of the top housing assembly 130. In the illustrated example, the latch 165 is in the form of a ledge that hooks and engages an underside of the front alignment members 139 to allow the first cup assembly 160 to rotate onto the base assembly 120 and the top housing assembly 130. When the cup assembly 160 is positioned adjacent to the top housing assembly, the cup retention mechanism 164 is aligned with the cup retention mechanism 137. In some examples, the retention mechanism 164 of the first cup assembly 160 and the cup retention mechanism 137 of the top housing assembly 130 may both be in the form of throughbores or threaded openings that receive a coin screw 167 therethrough to quickly secure the components with each other. As such, a user may removably couple the cup assembly 160 with the top housing assembly 130. In some examples, the first cup assembly may 160 alternatively or additionally couple with the base assembly 120 via any number of suitable approaches.

The cup assembly also includes a cup communication interface 166. With particular reference to FIGS. 10-14, the cup communication interface 166 is in the form of a flex tail interconnection having a first end 166a and a second end 166b. As illustrated in FIG. 11, the first end 166a of the cup communication interface 166 includes any number of interconnects 167 such as leaf spring connectors, pogo pin connectors, and the like, to form a communicative and/or electrical coupling to allow data and/or power transmission. In other examples, inductive charging mechanisms for electrical transmission may be used. The first end 166a of the cup communication interface 166 is operably coupled with the lower side 160a of the first cup assembly 160, and in some examples, may be positioned on a mounting support member or region.

Figure 10:
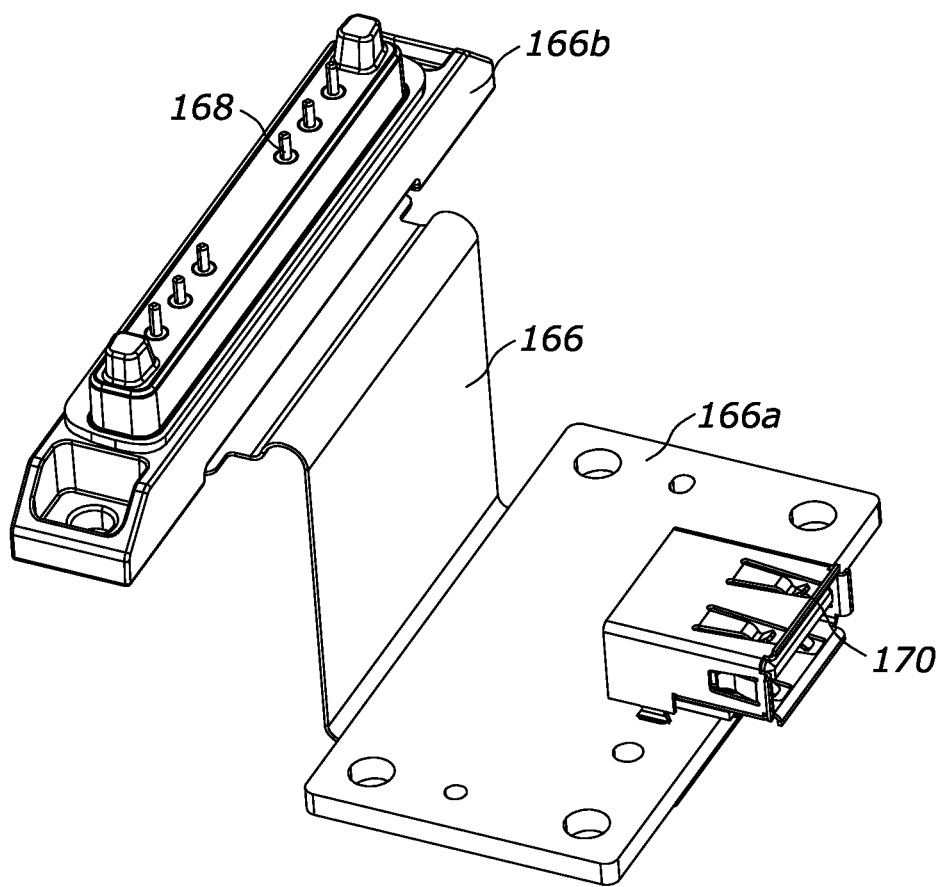
FIG. 10 illustrates a perspective view of an example cup communication interface for use with the first example cup assembly of FIGS. 1-9 in accordance with various embodiments.
Figure 11:
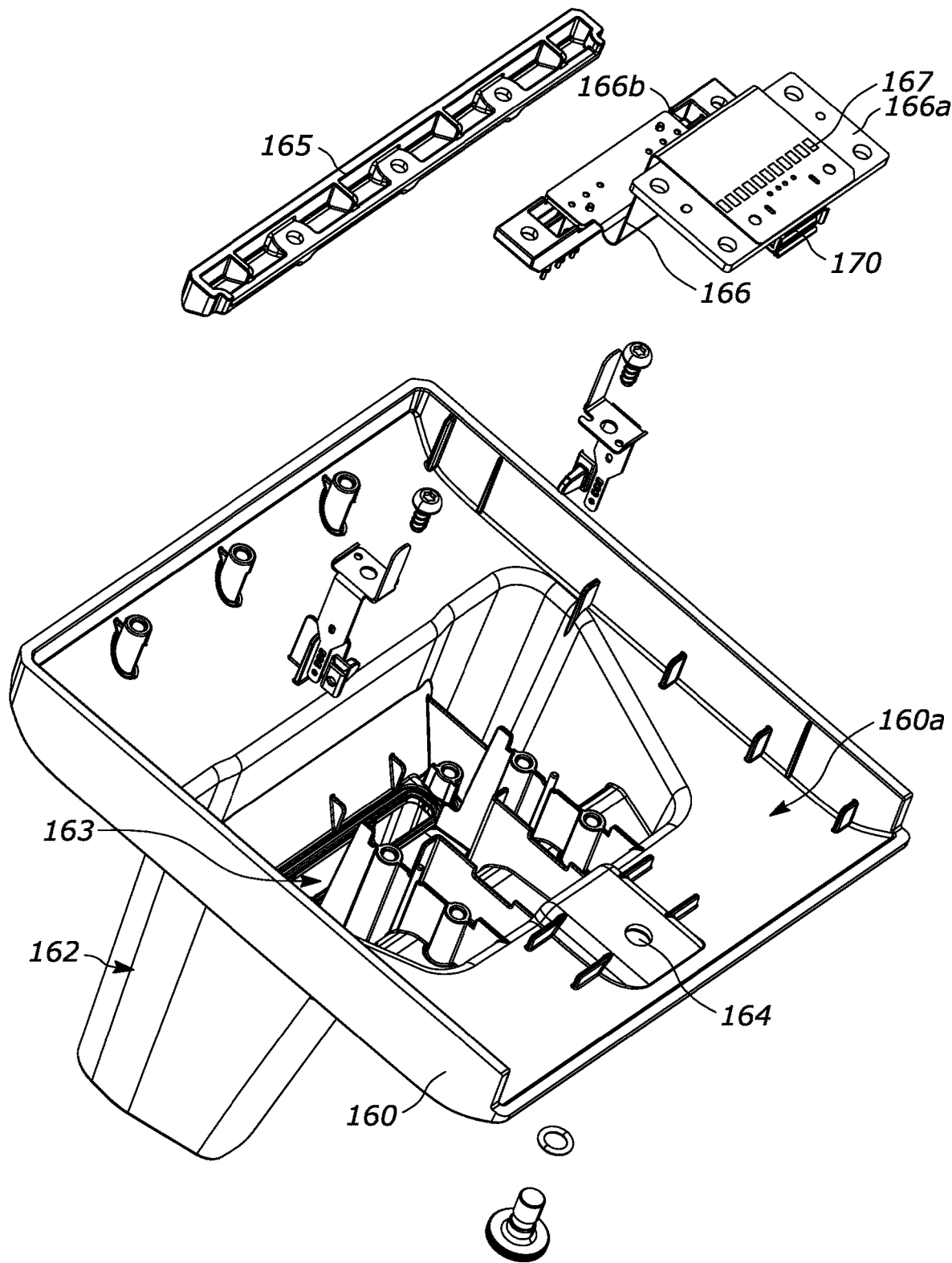
FIG. 11 illustrates an exploded lower perspective view of the first example cup assembly and the example cup communication interface of FIG. 10 in accordance with various embodiments.
Figure 12:
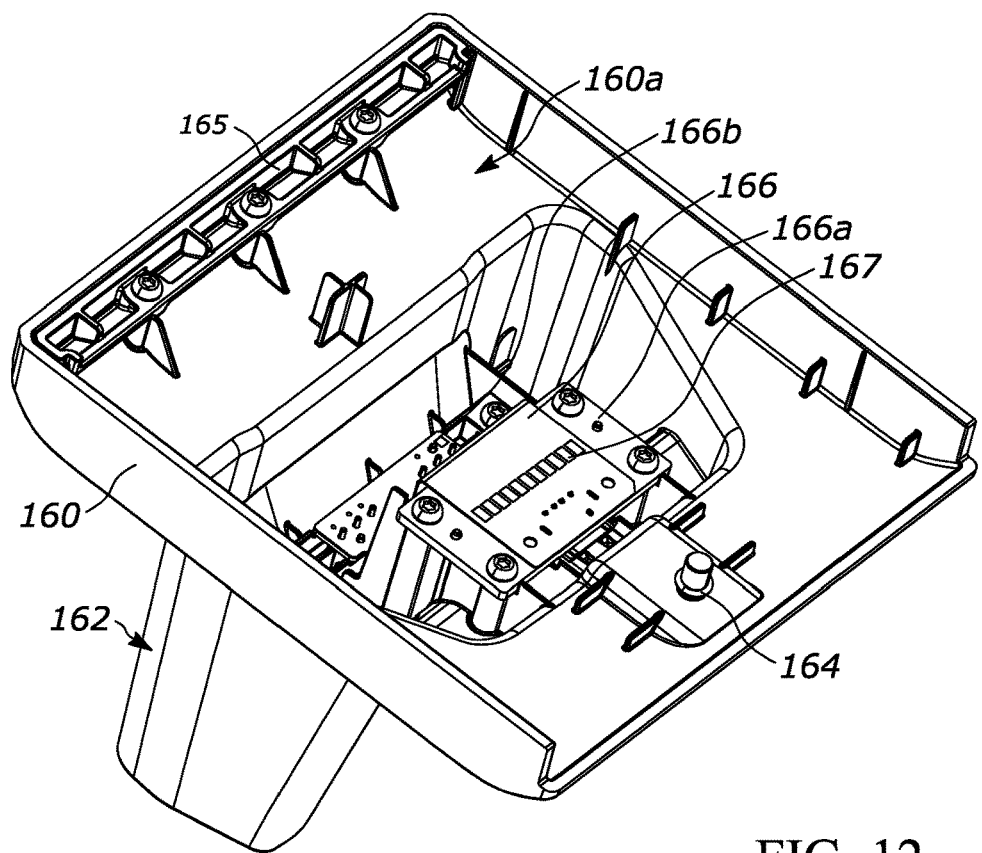
FIG. 12 illustrates a lower perspective view of an assembled first example cup assembly of FIGS. 10 &11 in accordance with various embodiments.
Figure 13:
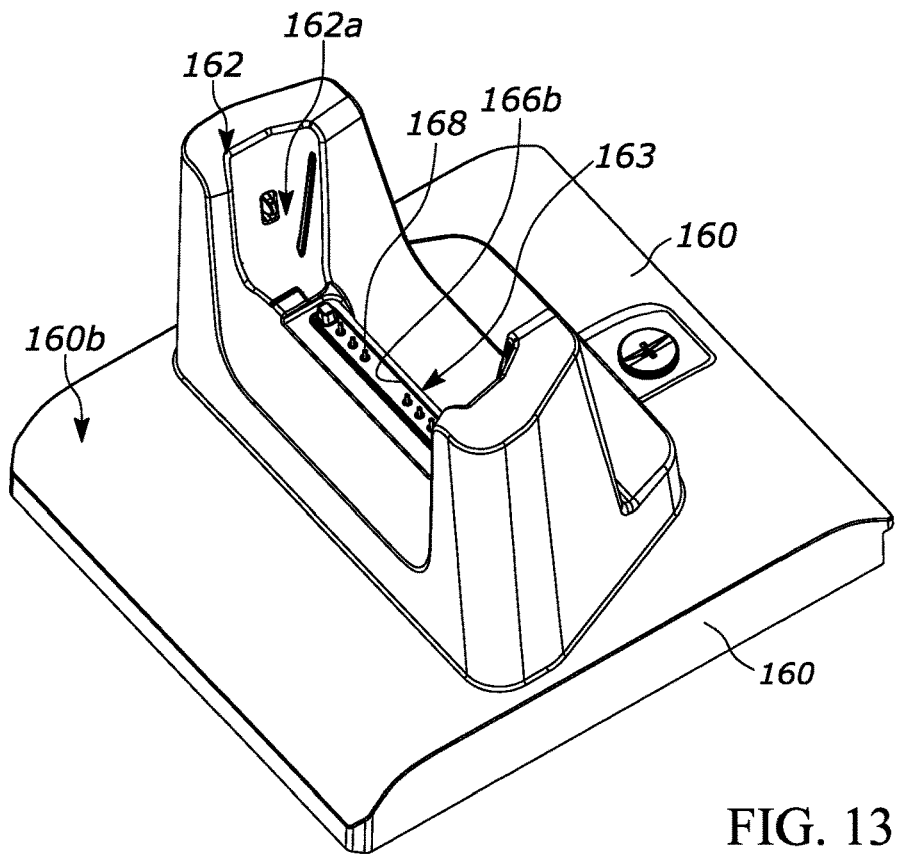
FIG. 13 illustrates a front perspective view of the assembled first example cup assembly of FIGS. 10-12 in accordance with various embodiments.
Figure 14:
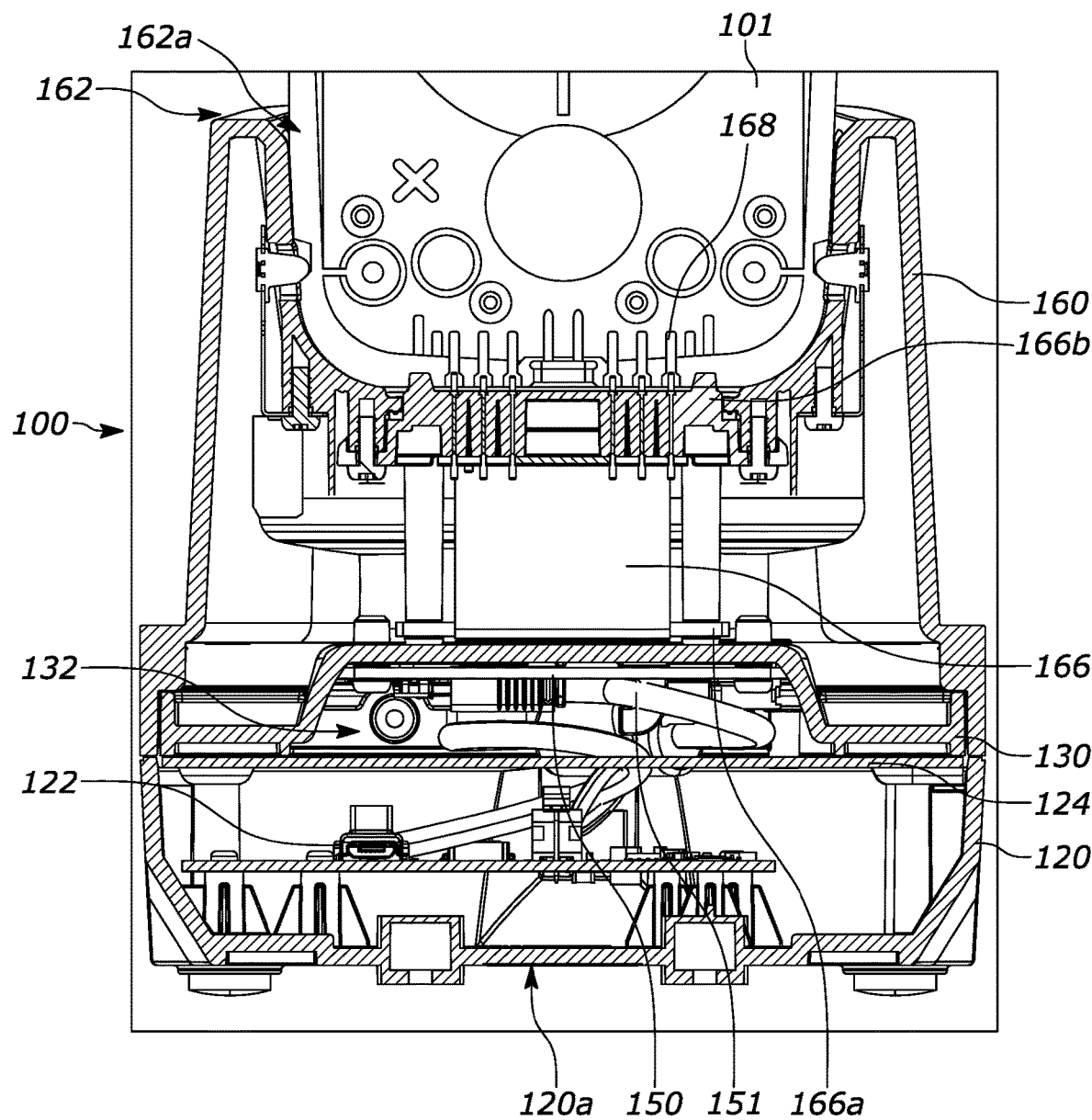
FIG. 14 illustrates a front elevation cross sectional view of the example cradle and handheld scanning device of FIGS. 1-13 in accordance with various embodiments.
Figure 15:
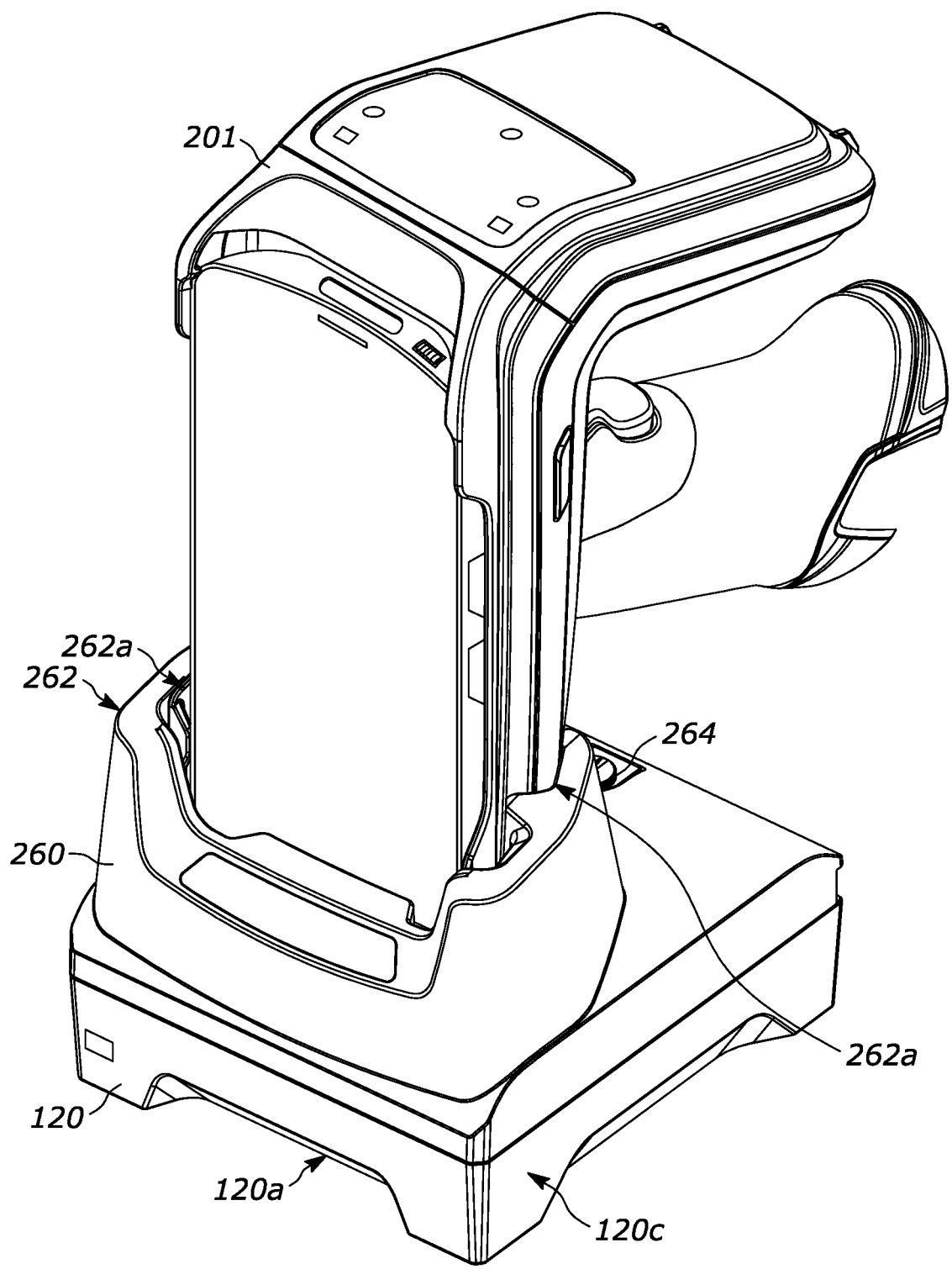
FIG. 15 illustrates a front perspective view of a cradle including a second example cup assembly for use with a second handheld scanning device in accordance with various embodiments.

Similarly, and as illustrated in FIGS. 10, 13, and 14, the second end 166b of the cup communication interface 166 includes any number of interconnects 168 such as leaf spring connectors, pogo pin connectors, and the like to form a communicative and/or electrical coupling to allow data and/or power transmission. In other examples, inductive charging mechanisms for electrical transmission may be used. The second end 166b of the cup communication interface 166 is positioned such that at least a portion of the interconnects 168 are disposed adjacent to and/or near the dock opening 163 of the dock 162.

The interconnects 167 of the first end 166a of the cup communication interface 166 are arranged to couple with the interconnects 155 of the board communication interface 152. In some examples, the interconnects 167 may be in the form of a single row of pogo pins. Other examples are possible. Upon coupling the first cup assembly 160 with the top housing assembly 130, the interconnects 155 of the board communication interface 152 engage the interconnects 167 of the first end 166a of the cup communication interface 166. As a result, a power and/or data transmission link is formed between any devices coupled with the power and/or data transmission port 122, the circuit board assembly 150 (i.e., the power interface 154 and/or the data interface 156), the interconnects 155, the board communication interface 152, and the first and second ends 166a, 166b of the cup communication interface 166. Because the second end 166b of the cup communication interface 166 is communicatively coupled with the first end 166a of the cup communication interface 166, the interconnects 168 may provide an electrical link to the handheld scanning device 101 when disposed within the slot or channel 162a of the dock 162. As illustrated in FIG. 14, the handheld scanning device 101 includes corresponding interconnects 101a adapted to engage the interconnects 168 of the second end 166b of the cup communication interface 166. Accordingly, power and/or data may be transmitted between the handheld scanning device 101 and any components (e.g., charging devices, computing devices, etc.) coupled with the power and/or data transmission port(s) 122.

As illustrated in FIG. 10, the first end 166a of the cup communication interface 166 additionally includes a cup auxiliary power and/or data transmission port 170. This port 170 is positioned through an auxiliary opening 163a formed on the first cup assembly 160 and may receive an auxiliary power and/or data cable 172, which may provide and/or facilitate the charging of additional devices such as, for example, personal mobile computing devices. Other examples are possible.

Advantageously, the cradle 100 may be used with any number of varying cup assemblies having different cup configurations. In some examples, the first cup assembly 160 may be decoupled from the top housing assembly 130 such that the base assembly 120, top housing assembly 130, and circuit board assembly 150 remain (as illustrated in FIG. 9). With reference to FIGS. 15-22, a different cup assembly may be selectively coupled with the base assembly 120, top housing assembly 130, and circuit board assembly 150 by positioning the desired coupling assembly above the top housing assembly 130 and securing and/or coupling the desired cup assembly therewith. More specifically, with reference to FIGS. 15-19, the cradle 100 may receive a second cup assembly 260 which may include similar features and/or components as the first cup assembly 160. Accordingly, such similar features will be designated with reference numerals having identical two-digit suffixes as the cup assembly 160, and will not be described in substantial detail. It is appreciated that any of the features described with respect to the first cup assembly 160 may be incorporated into the second cup assembly 260, and vice-versa.

The second cup assembly 260 includes a dock 262 having a different configuration than the dock 162 of the first cup assembly 160. More specifically, the dock 262 includes two slots or channels 262a dimensioned and configured to receive a handheld scanning device 201 having a different configuration. As before, the second cup assembly 260 may be quickly decoupled from the top housing assembly 130 without needing to unplug or rearrange wires or cables.

The handheld scanning device 201 includes a scan sled and an additional terminal coupled therewith. Each of these components may be capable of receiving power and/or transmitting data, and as such, each of the slots or channels 262a includes a dock opening 263. As illustrated in FIGS. 16-19, a cup communication interface 266 includes a first end 266a having interconnects 267, a second end 266b having interconnects 268, and a middle region 266c having interconnects 269. As with the cup communication interface 166, the interconnects 267 disposed at the first end 266a are positioned on a lower side 260a of the second cup assembly 260 to engage the interconnects 155 of the board communication interface 152 of the circuit board assembly 150 when the second cup assembly 260 is coupled with the top housing assembly 130.

Figure 16:
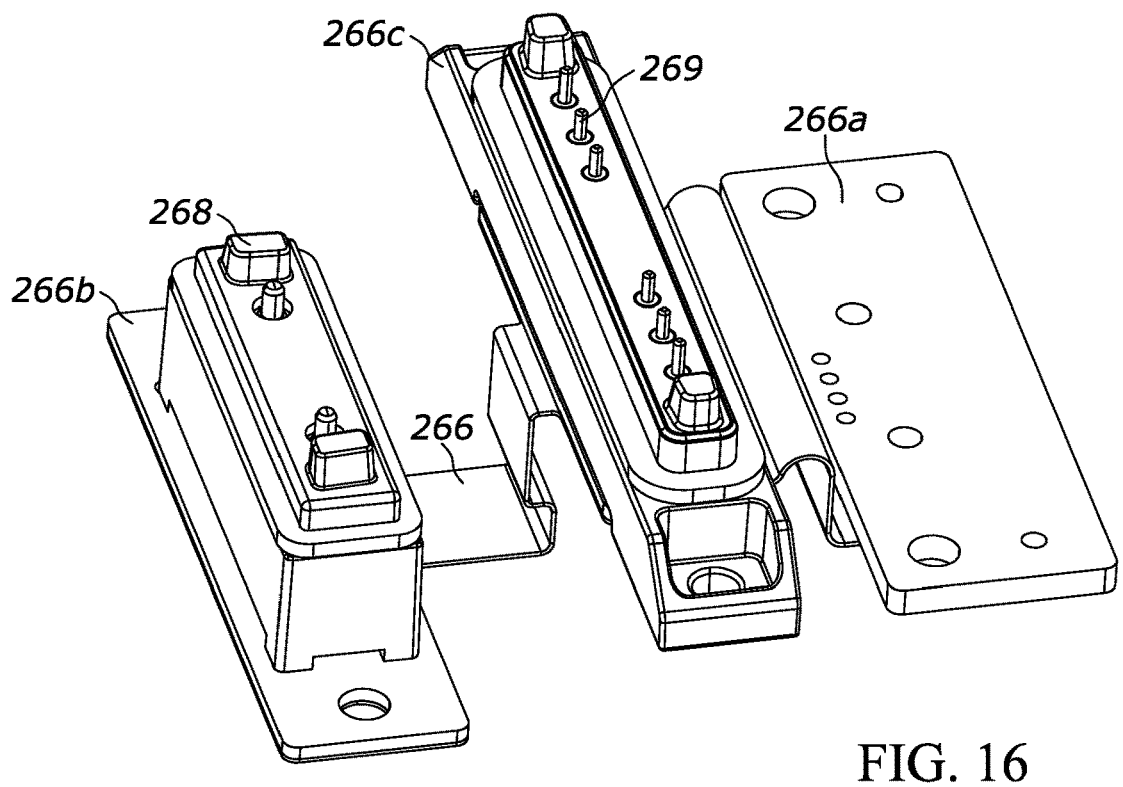
FIG. 16 illustrates a perspective view of an example cup communication interface for use with the second example cup assembly of FIG. 15 in accordance with various embodiments.
Figure 17:
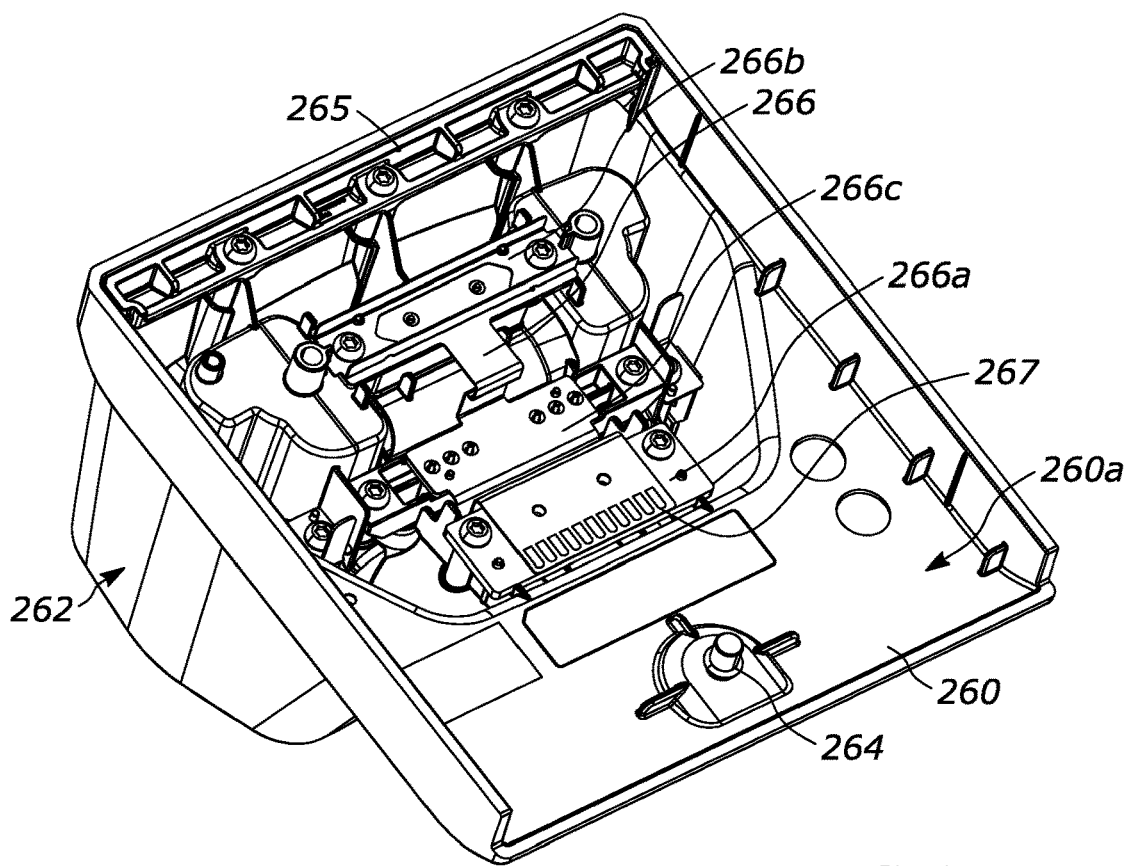
FIG. 17 illustrates a lower perspective view of an assembled second example cup assembly of FIGS. 15 and 16 in accordance with various embodiments.
Figure 18:
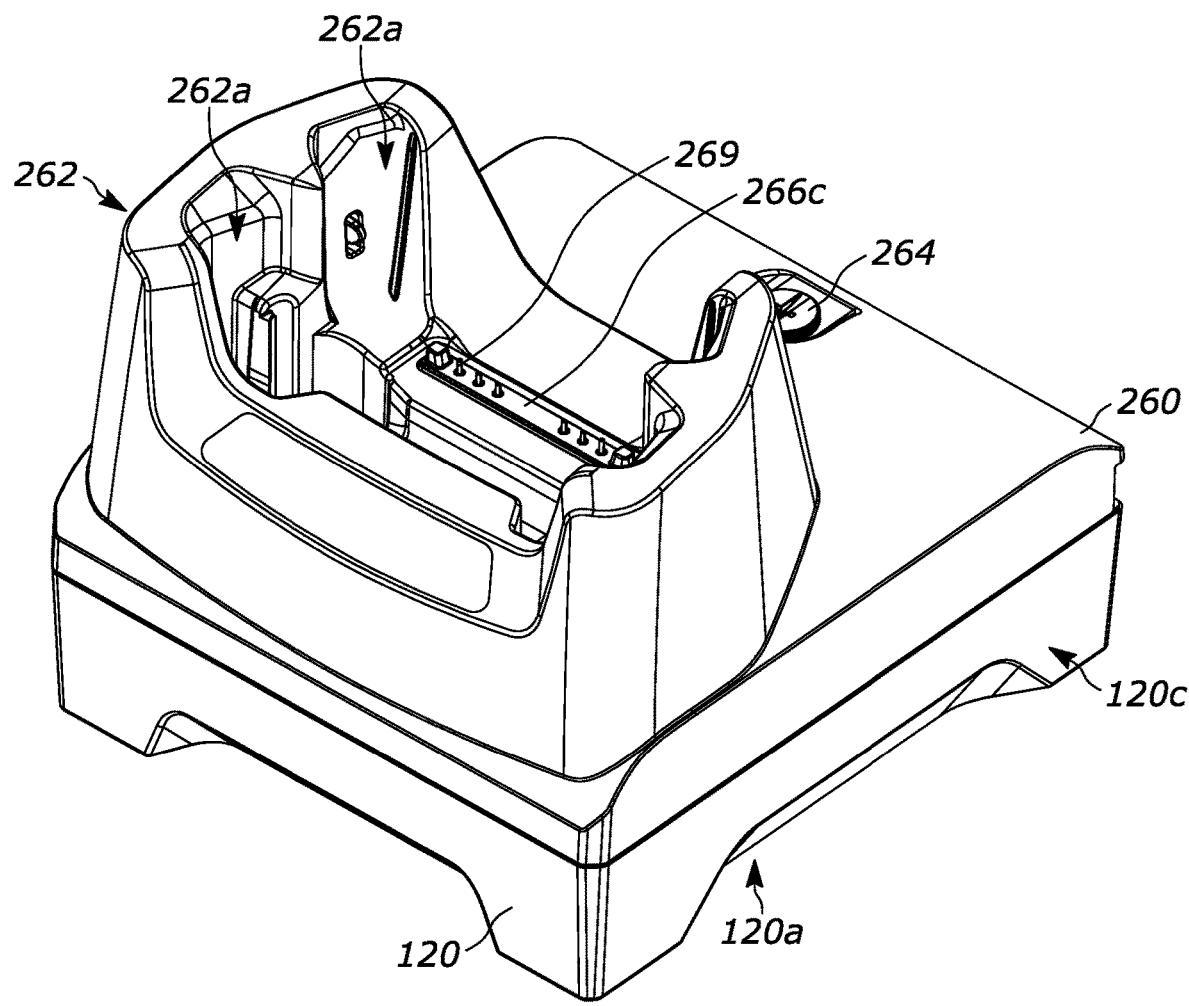
FIG. 18 illustrates a front perspective view of the assembled second example cup assembly of FIGS. 15-17 in accordance with various embodiments.
Figure 19:
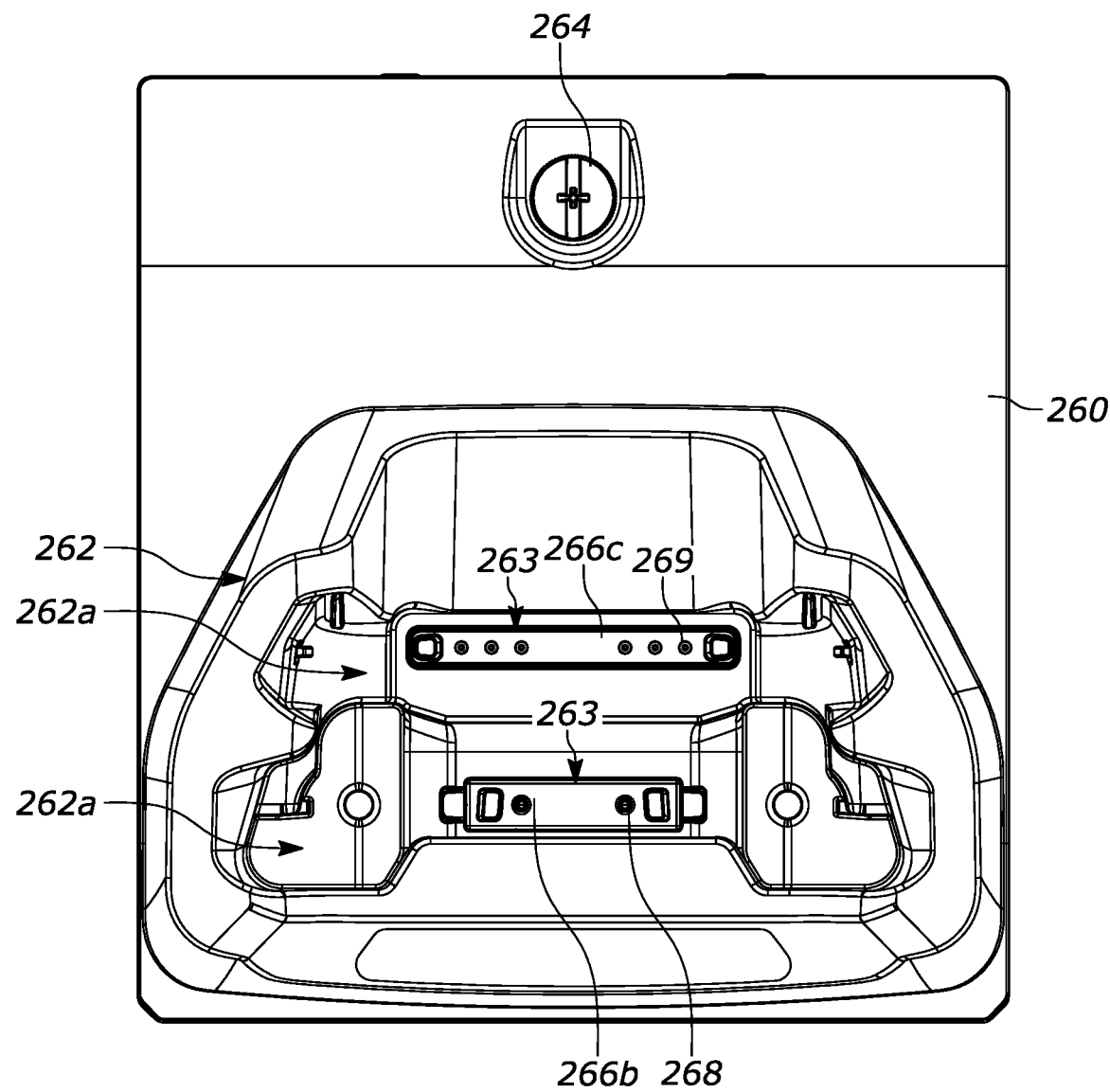
FIG. 19 illustrates a top plan view of the second example cup assembly of FIGS. 15-18 in accordance with various embodiments.

The second end 266b and middle region 266c of the cup communication interface 266 include any number of interconnects 268, 269 such as leaf spring connectors, pogo pin connectors, and the like to form a communicative and/or electrical coupling to allow data and/or power transmission. The second end 266b and the middle region 266c of the cup communication interface 266 are positioned such that at least a portion of the interconnects 268, 269 are disposed adjacent to and/or near the dock openings 263 of the dock 262. As illustrated in FIG. 16, the interconnects 268, 269 may have different sizes and/or configurations in order to couple with desired components of the handheld scanning device 201.

In some examples, both of the components of the handheld scanning device 201 may receive power and/or data transmission when disposed within the dock 262 of the second cup assembly 260. However, in other examples, a user may selectively permit power and/or data transmission of a specific component of the handheld scanning device 201 as desired.

Figure 20:
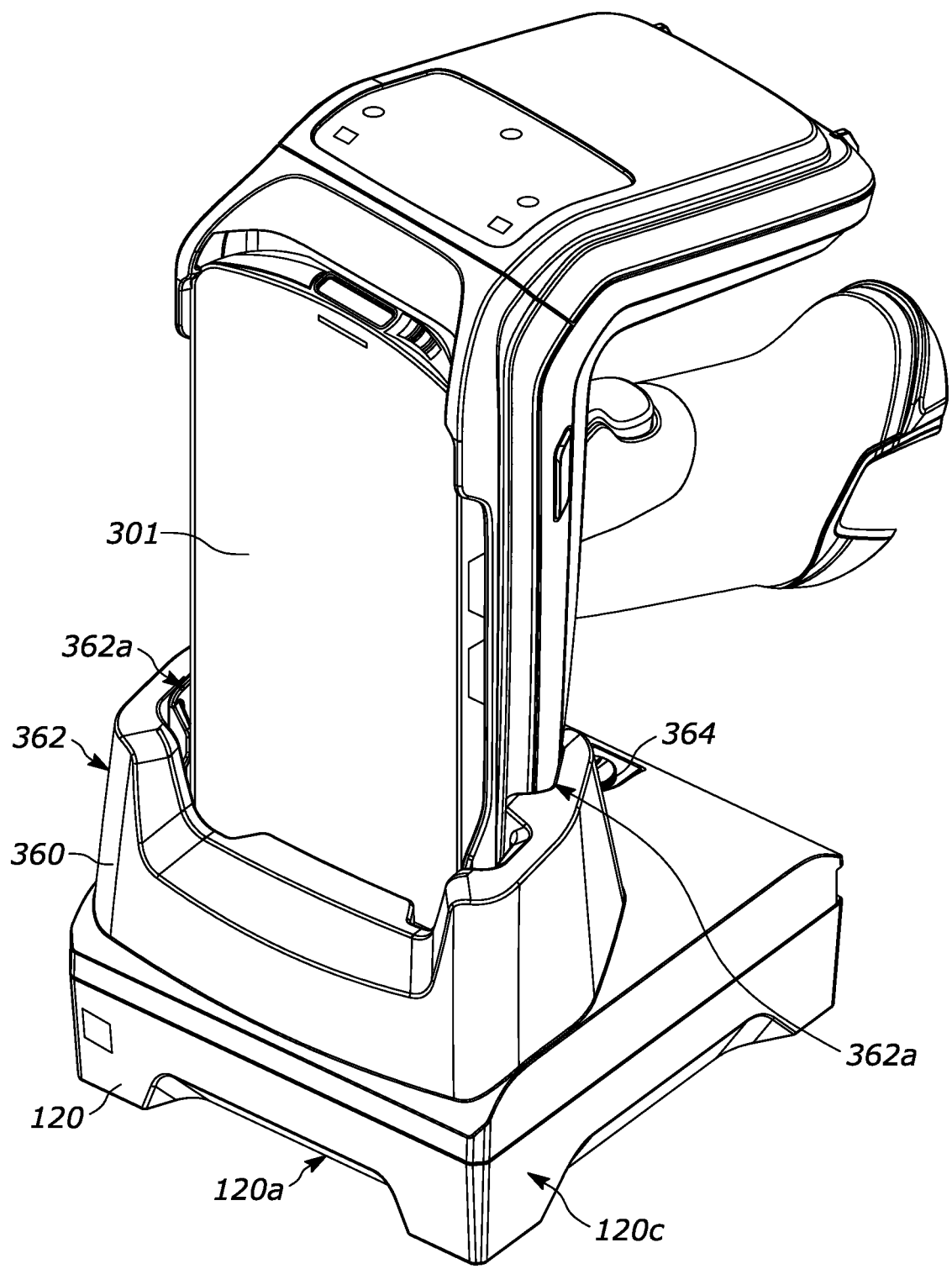
FIG. 20 illustrates a front perspective view of a cradle including a third example cup assembly for use with a third handheld scanning device in accordance with various embodiments.
Figure 21:
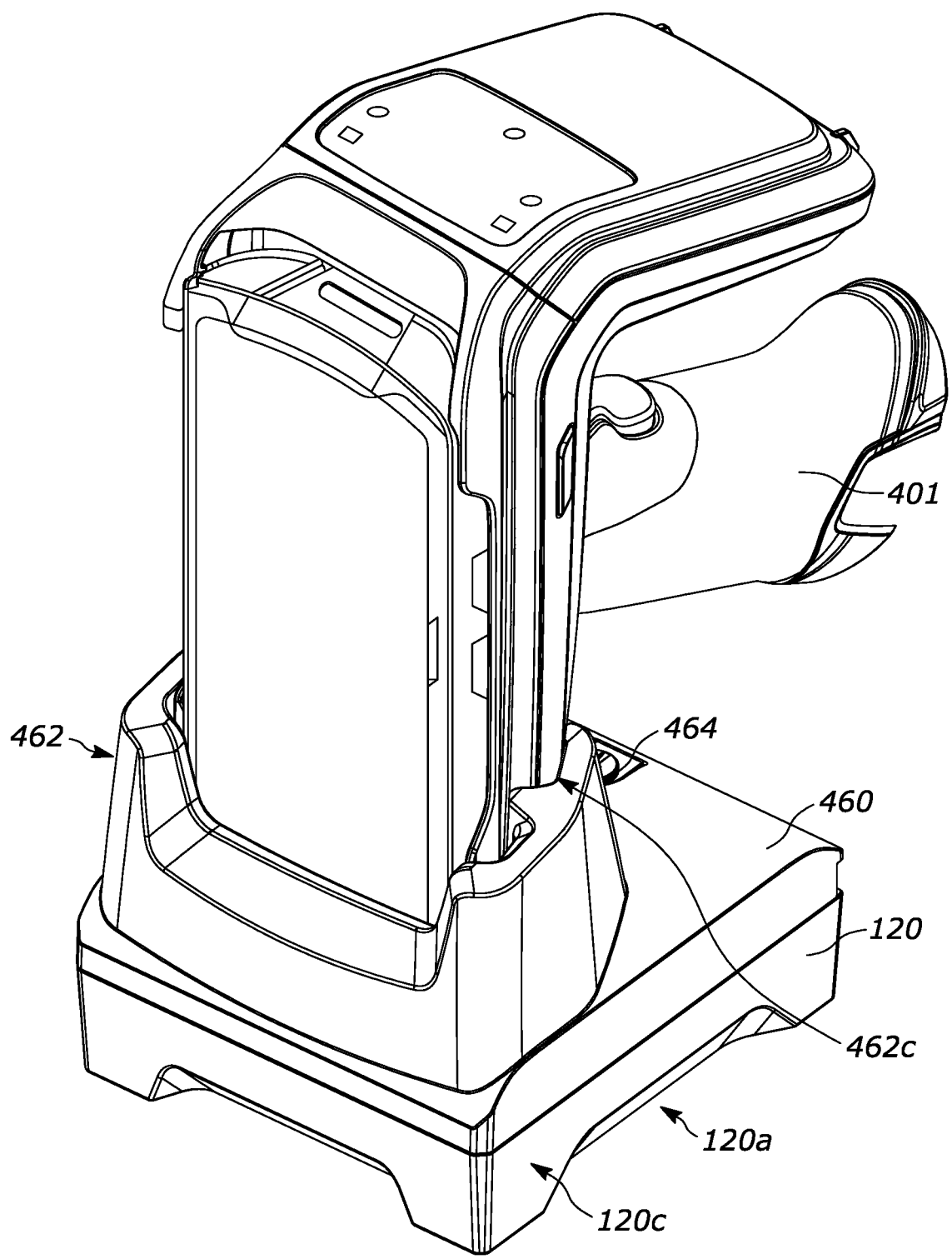
FIG. 21 illustrates a front perspective view of a cradle including a fourth example cup assembly for use with a fourth handheld scanning device in accordance with various embodiments.
Figure 22:
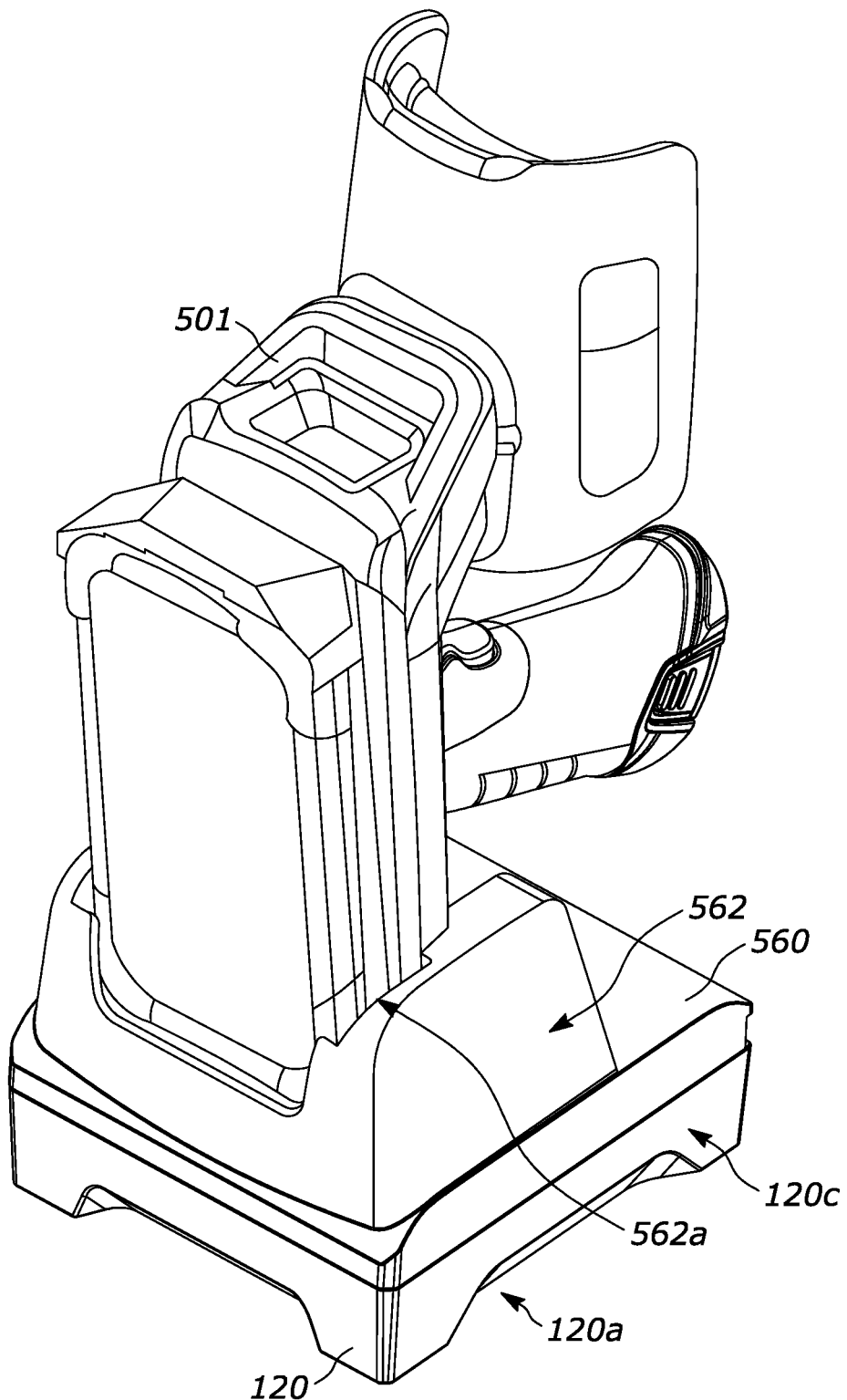
FIG. 22 illustrates a front perspective view of a cradle including a fifth example cup assembly for use with a fifth handheld scanning device in accordance with various embodiments.

With reference to FIGS. 20-22, third, fourth, and fifth cup assemblies 360, 460, 560 are provided which may be selectively coupled with the base assembly 120, the top housing assembly 130, and the circuit board assembly 150. The third, fourth, and fifth cup assemblies 360, 460, 560 each include similar features as the first and second cup assemblies 160, 260, and as such, similar features will be designated with reference numerals having identical two-digit suffixes as the cup assemblies 160, 260, and will not be described in substantial detail. It is appreciated that any of the features described with respect to the first and/or second cup assembly 160, 260 may be incorporated into the third, fourth, and/or fifth cup assemblies 360, 460, 560, and vice-versa. The third, fourth, and fifth cup assemblies 360, 460, 560 may include respective docks 362, 462, 562 having differently-configured slots or channels 362a, 462a, 562a that are sized and configured to receive specific handheld scanning devices 301, 401, 501, respectively. As before, the third, fourth, and fifth cup assemblies 360, 460, 560 may be quickly decoupled from the top housing assembly 130 without needing to unplug or rearrange wires or cables.

Figure 23:
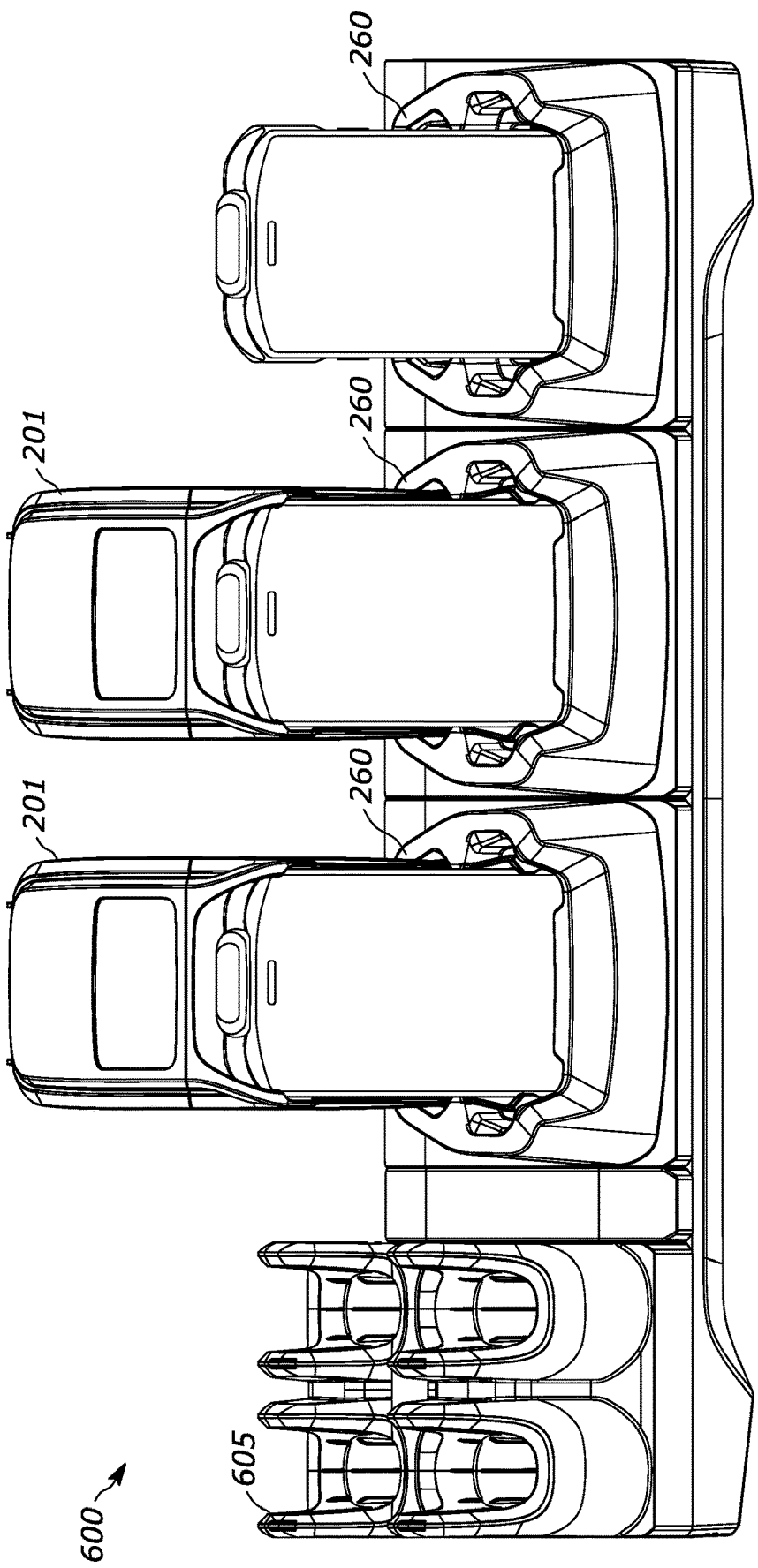
FIG. 23 illustrates a front perspective view of an example base accommodating a plurality of cradles in accordance with various embodiments.
Figure 24:
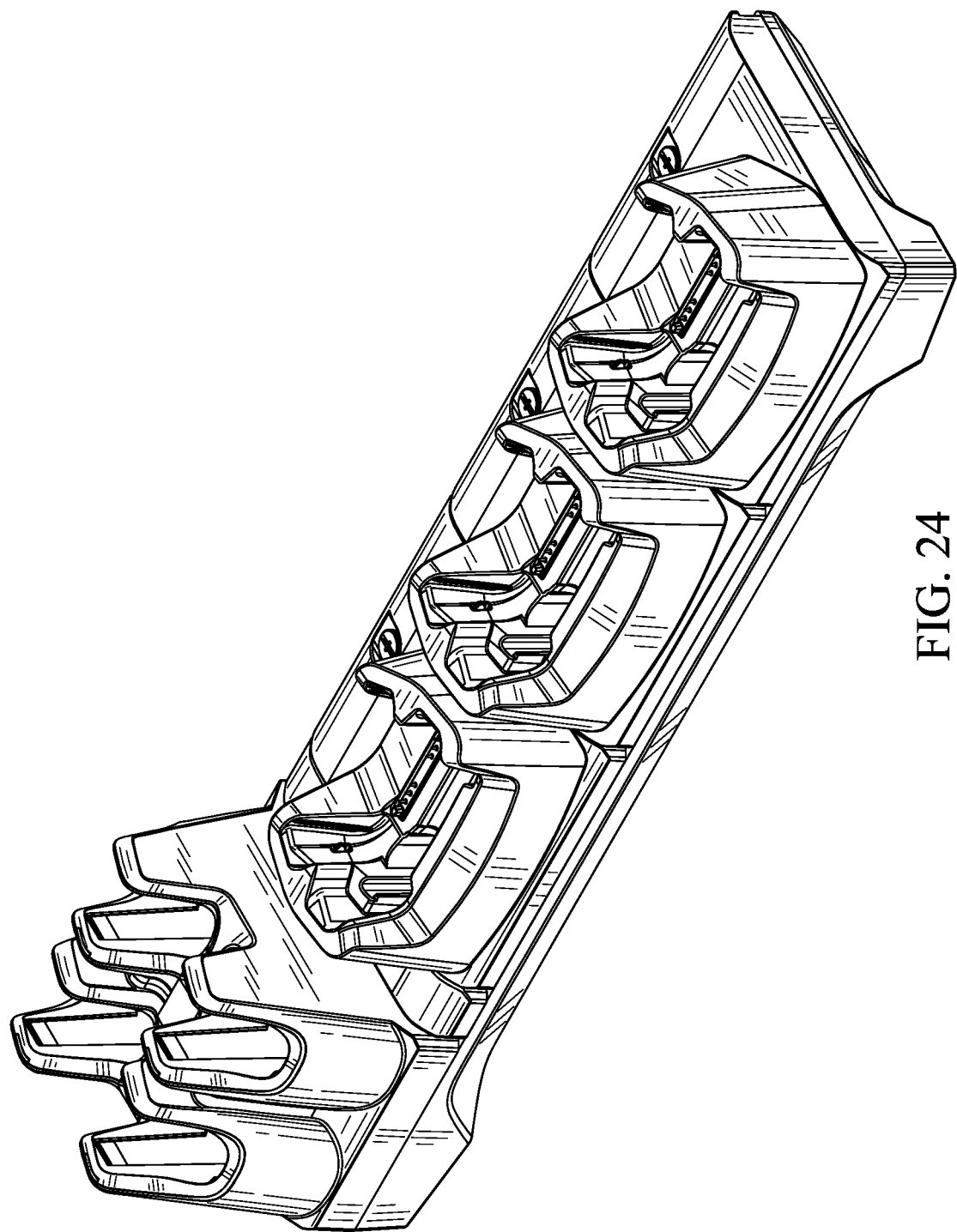
FIG. 24 illustrates a perspective view of the example base of FIG. 23 in accordance with various embodiments.
Figure 25:
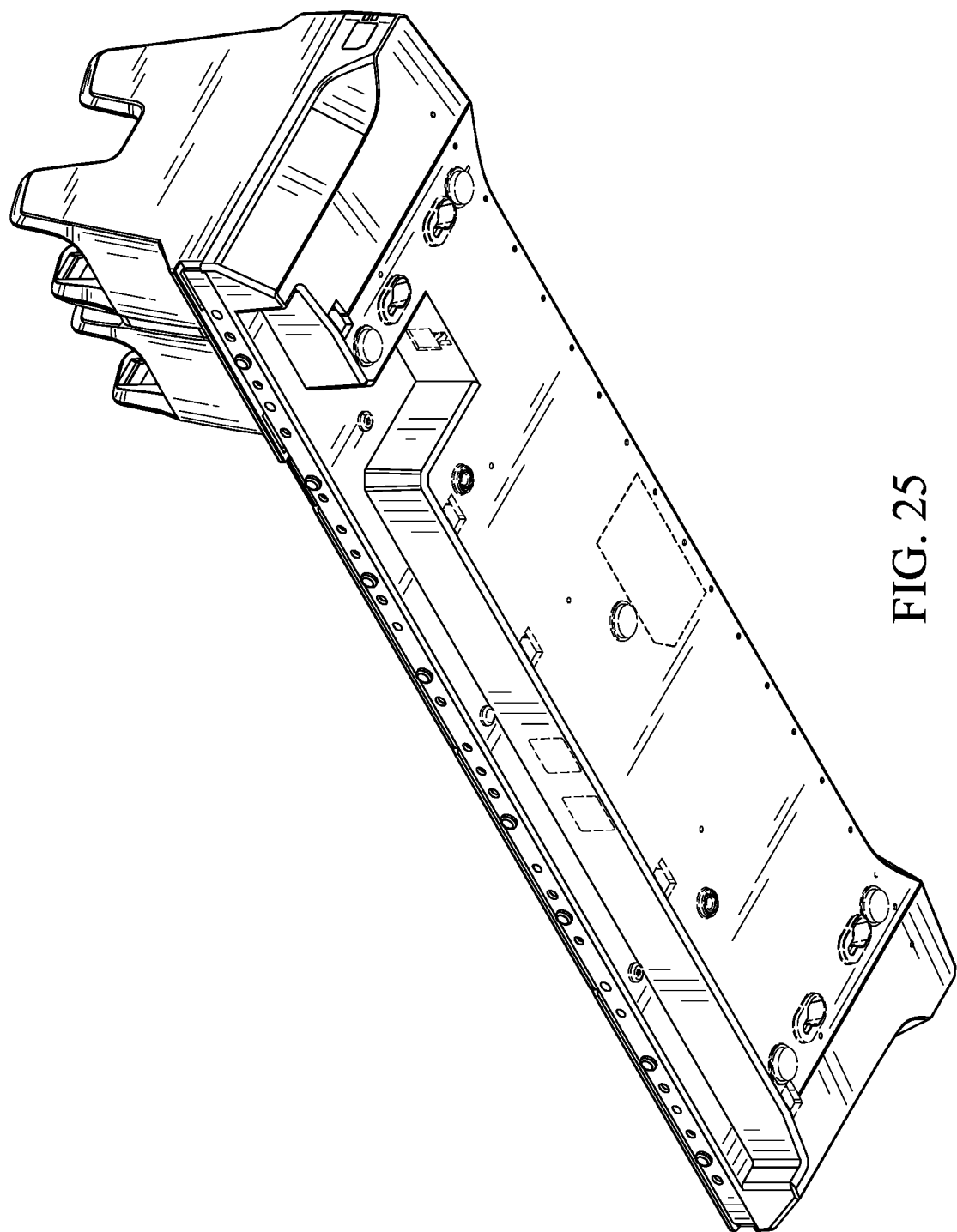
FIG. 25 illustrates a lower perspective view of the example base of FIGS. 23 & 24 in accordance with various embodiments.
Figure 26:
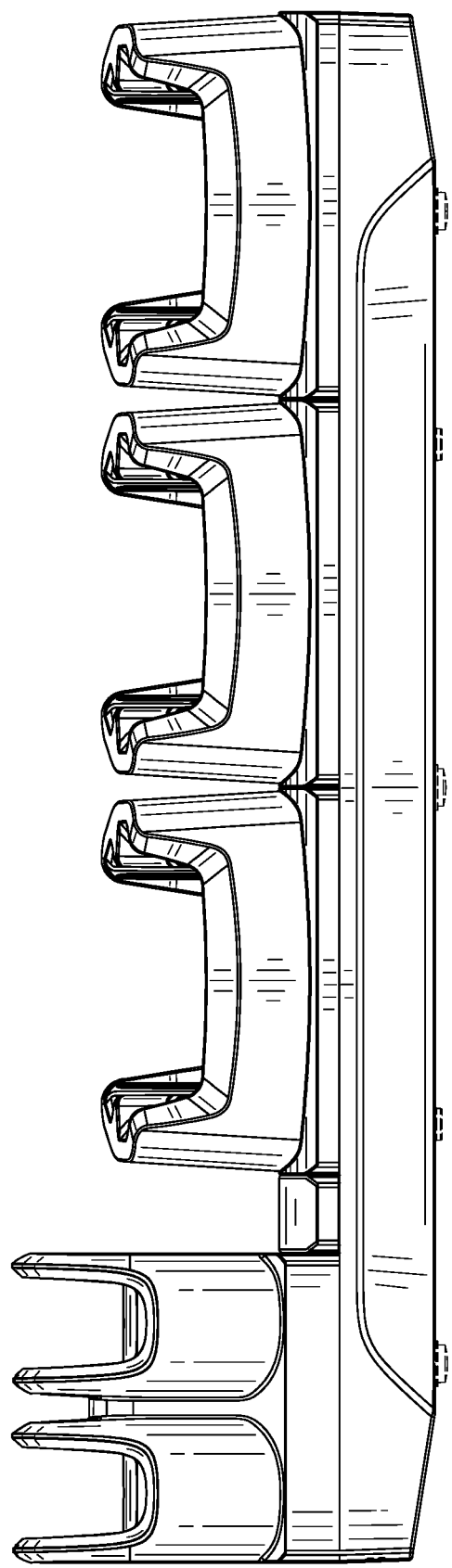
FIG. 26 illustrates a front elevation view of the example base of FIGS. 23-25 in accordance with various embodiments.
Figure 27:
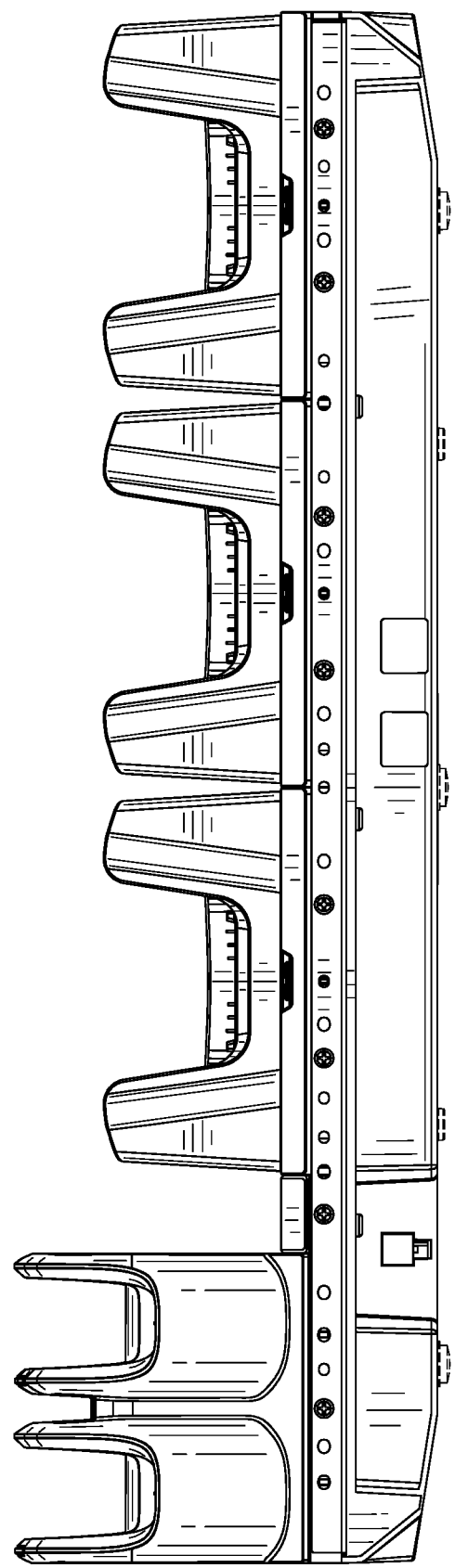
FIG. 27 illustrates a rear elevation view of the example base of FIGS. 23-26 in accordance with various embodiments.
Figure 29:
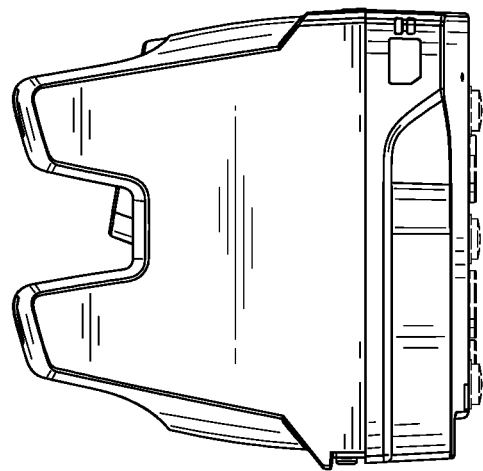
FIG. 29 illustrates a right side elevation view of the example base of FIGS. 23-28 in accordance with various embodiments.
Figure 28:
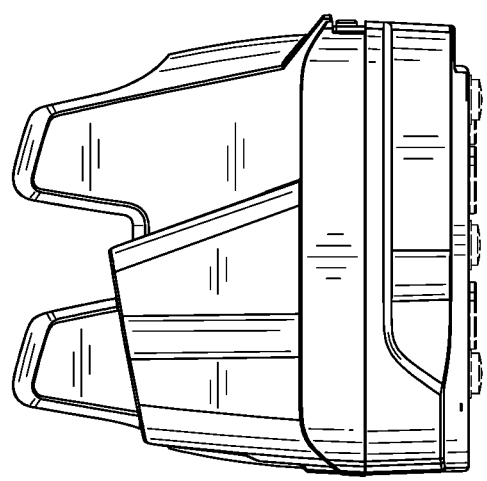
FIG. 28 illustrates a left side elevation view of the example base of FIGS. 23-27 in accordance with various embodiments.
Figure 30:
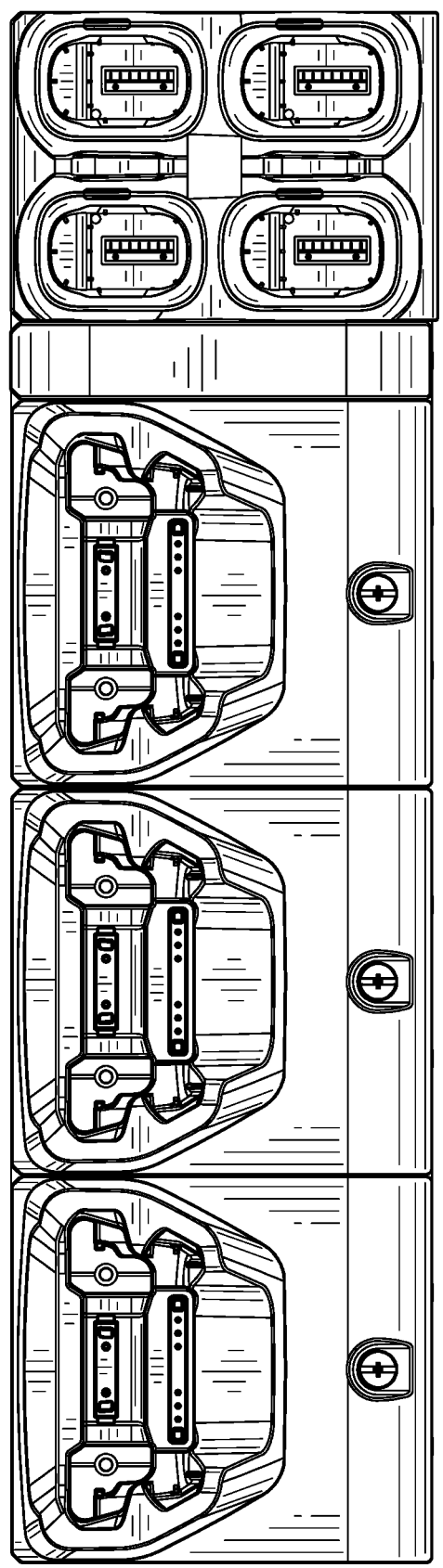
FIG. 30 illustrates a top plan view of the example base of FIGS. 23-29 in accordance with various embodiments.
Figure 31:
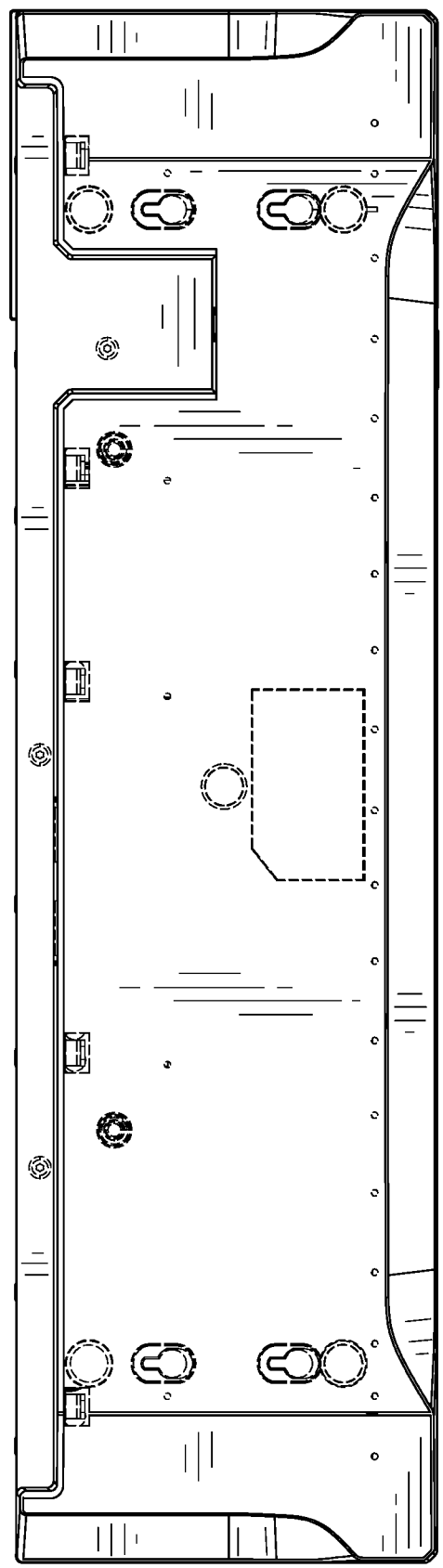
FIG. 31 illustrates a bottom plan view of the example base of FIGS. 23-30 in accordance with various embodiments.
Figure 32:
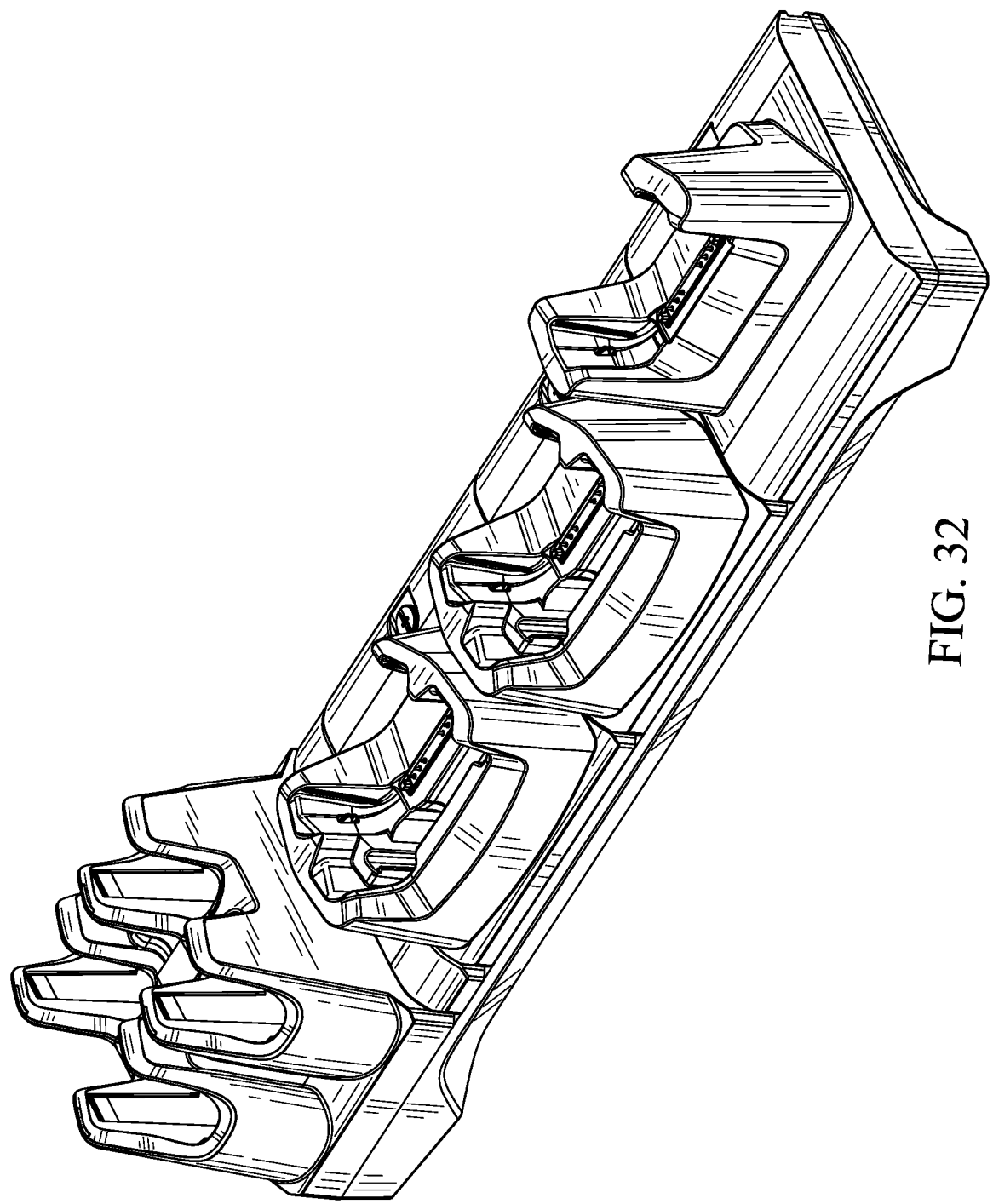
FIG. 32 illustrates a perspective plan view of an alternative base in accordance with various embodiments.
Figure 33:
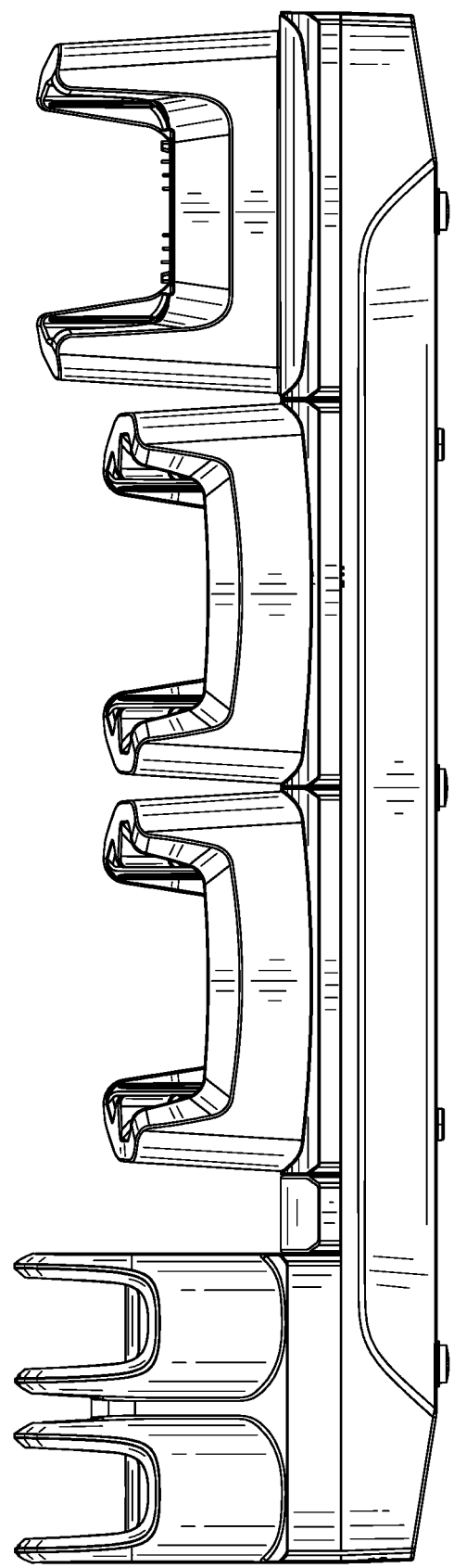
FIG. 33 illustrates a front elevation view of the example base of FIG. 32 in accordance with various embodiments.
Figure 34:
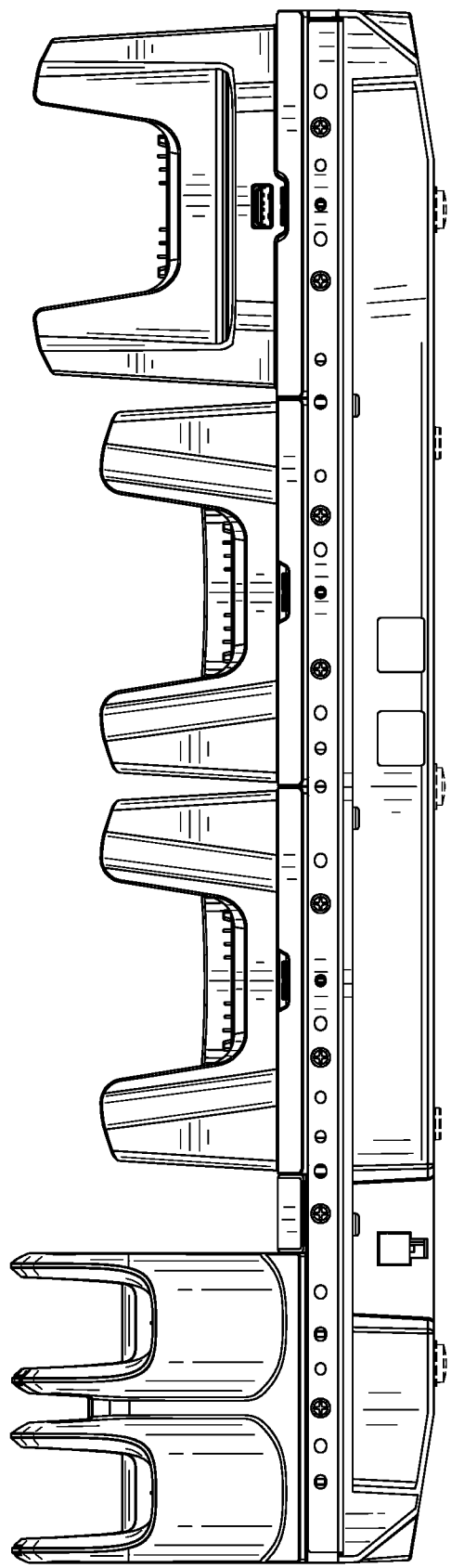
FIG. 34 illustrates a front elevation view of the example base of FIGS. 32 & 33 in accordance with various embodiments.
Figure 36:
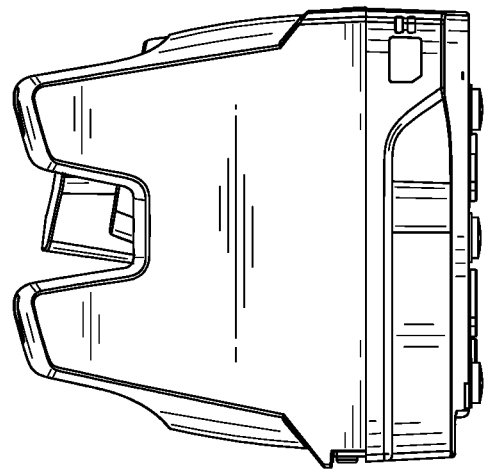
FIG. 36 illustrates a right side elevation view of the example base of FIGS. 32-35 in accordance with various embodiments.
Figure 35:
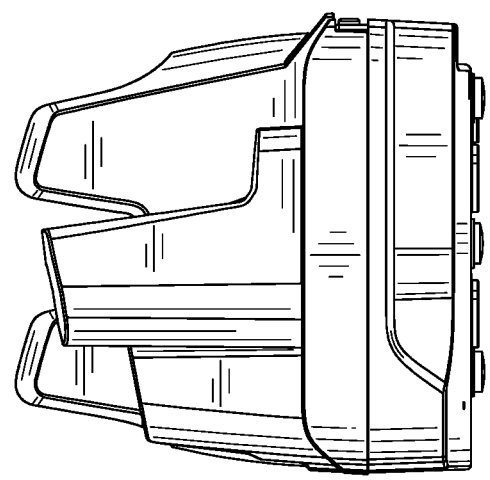
FIG. 35 illustrates a left side elevation view of the example base of FIGS. 32-34 in accordance with various embodiments.
Figure 37:
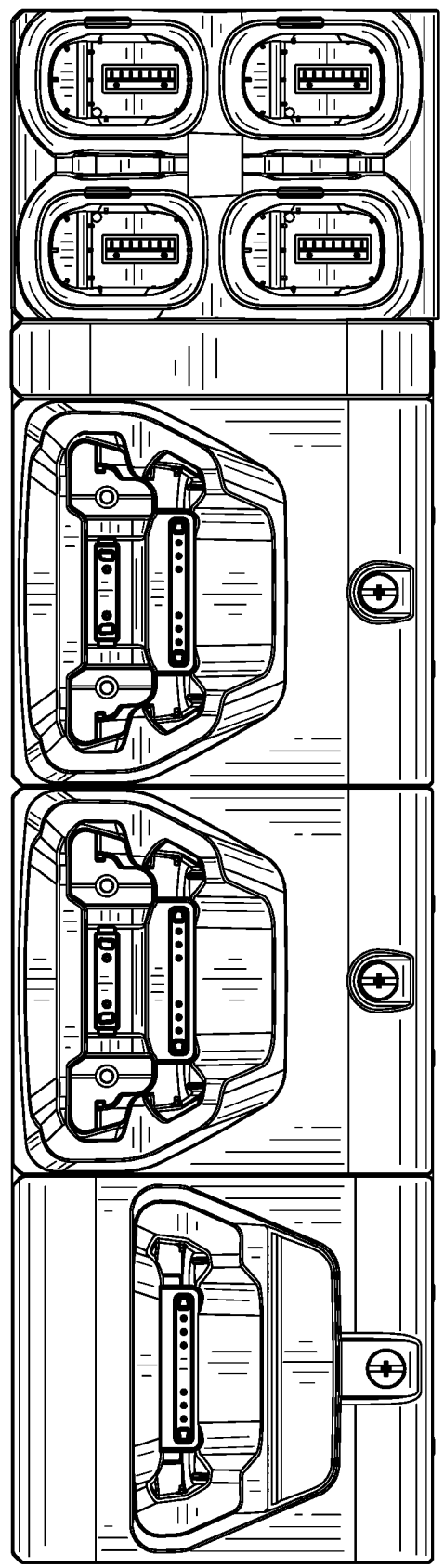
FIG. 37 illustrates a top plan view of the example base of FIGS. 32-36 in accordance with various embodiments.
Figure 38:
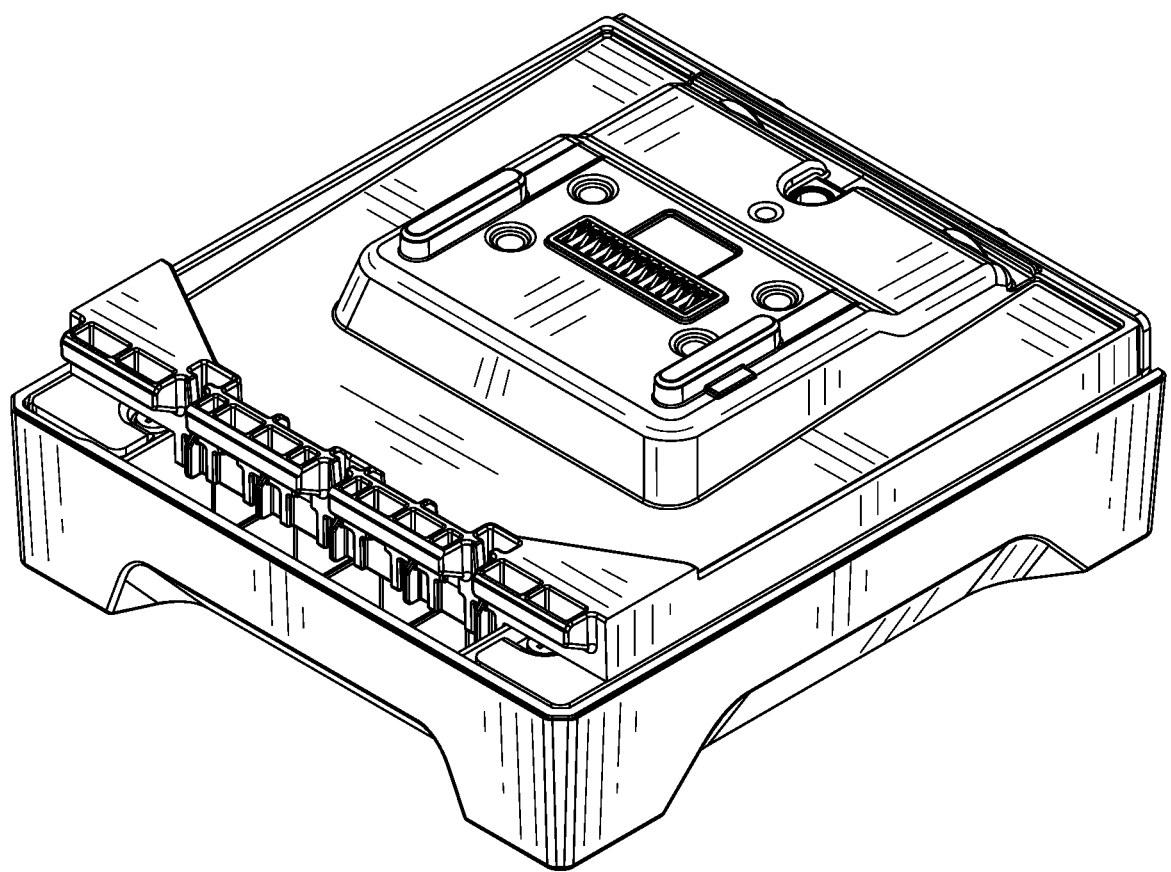
FIG. 38 illustrates a perspective view of the example base assembly for use with the example cradle of FIGS. 1-23 in accordance with various embodiments.
Figure 39:
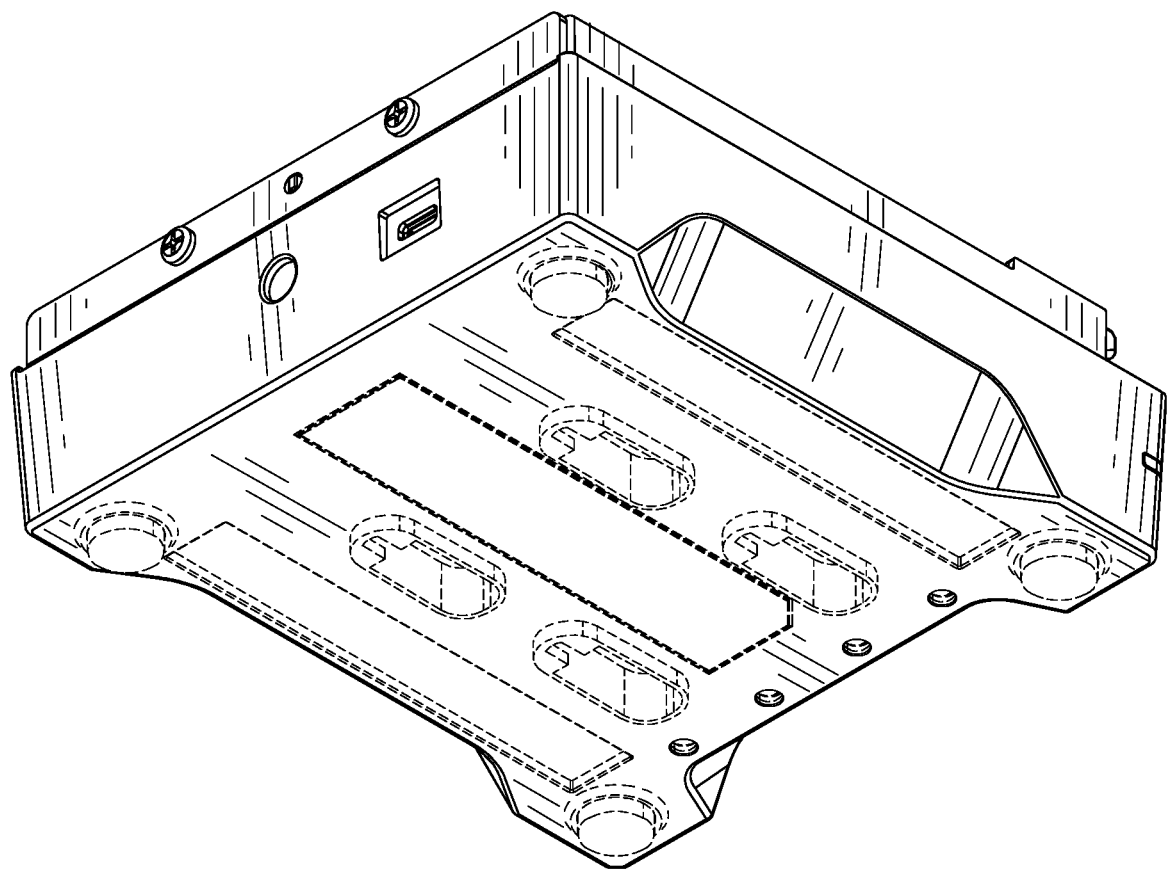
FIG. 39 illustrates a lower perspective view of the example base assembly of FIG. 38 in accordance with various embodiments.
Figure 40:
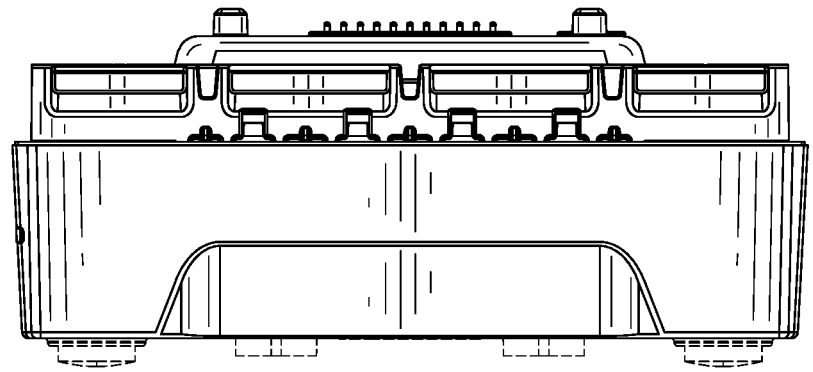
FIG. 40 illustrates a front elevation view of the example base assembly of FIGS. 38 & 39 in accordance with various embodiments.
Figure 41:
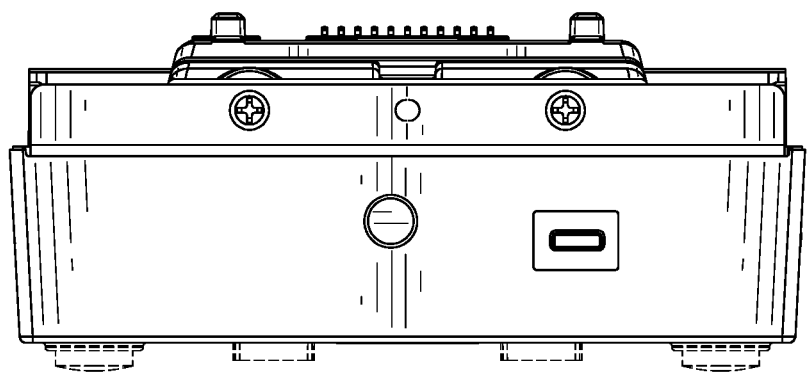
FIG. 41 illustrates a rear elevation view of the example base assembly of FIGS. 38-40 in accordance with various embodiments.
Figure 42:
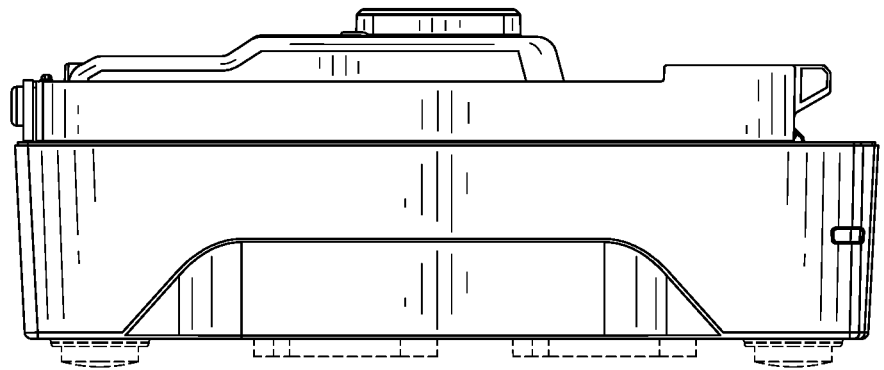
FIG. 42 illustrates a left side elevation view of the example base assembly of FIGS. 38-41 in accordance with various embodiments.
Figure 43:
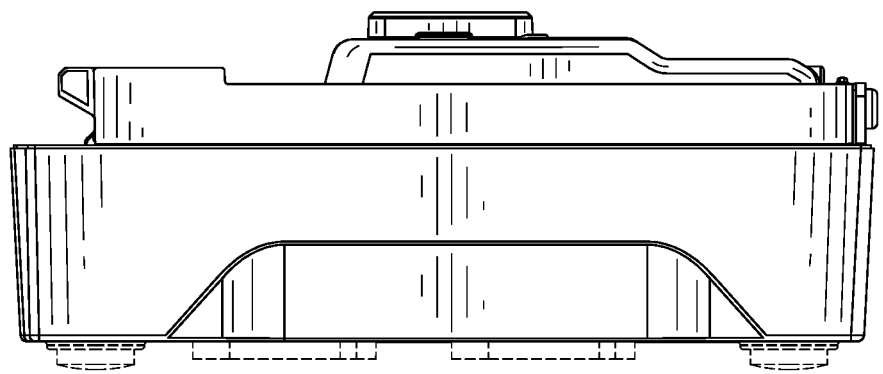
FIG. 43 illustrates a right side elevation view of the example base assembly of FIGS. 38-42 in accordance with various embodiments.
Figure 44:
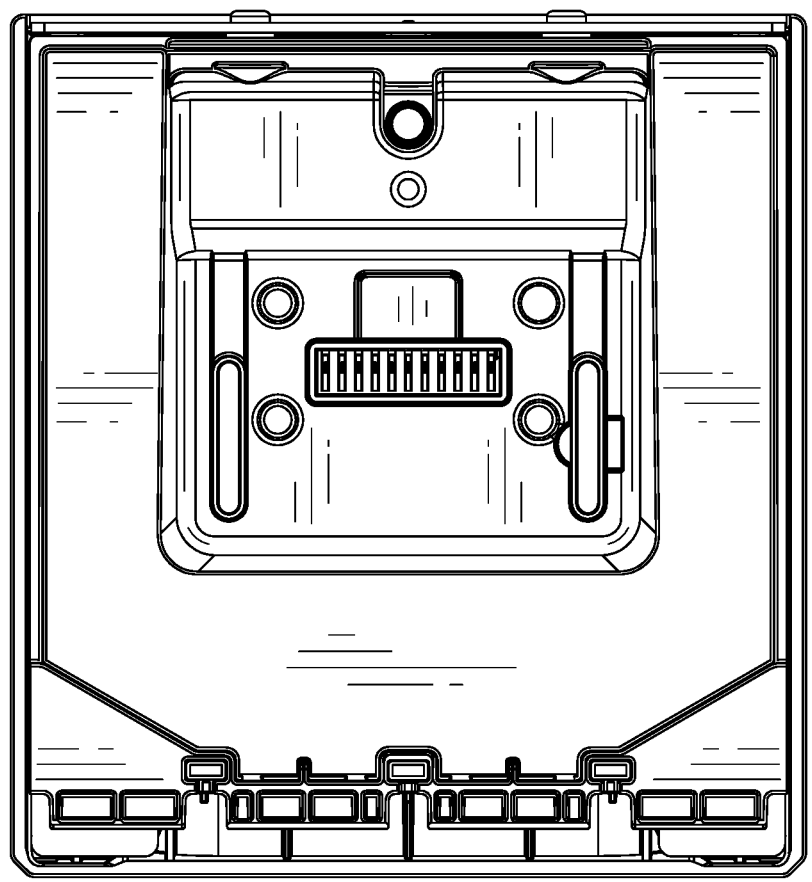
FIG. 44 illustrates a top plan view of the example base assembly of FIGS. 38-43 in accordance with various embodiments.
Figure 45:
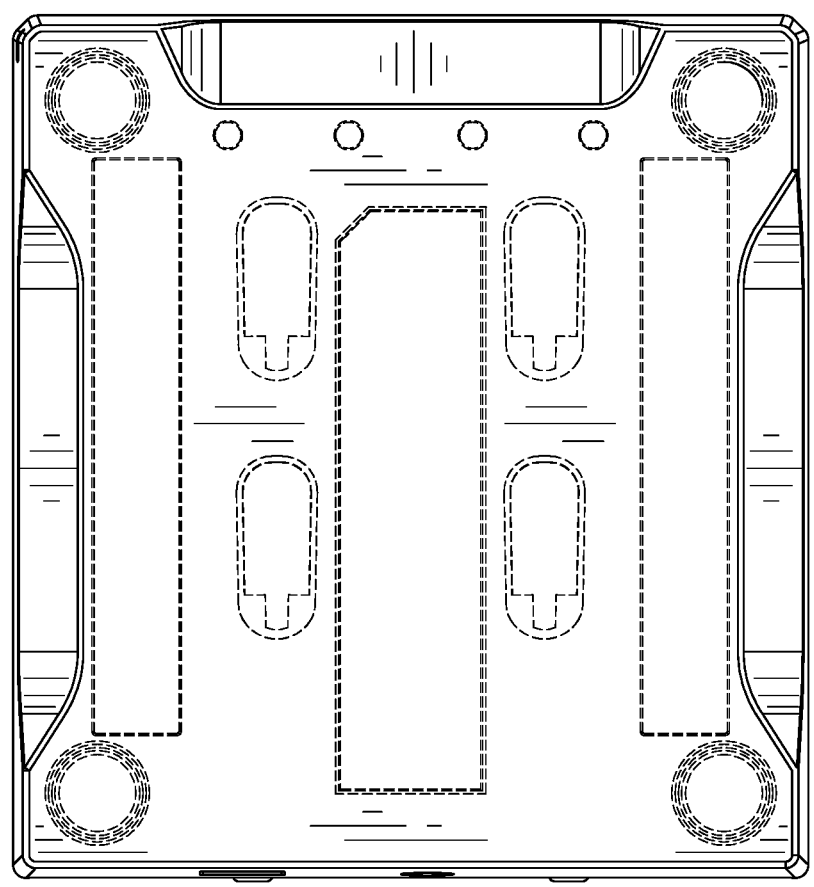
FIG. 45 illustrates a bottom plan view of the example base of FIGS. 38-44 in accordance with various embodiments.
Figure 46:
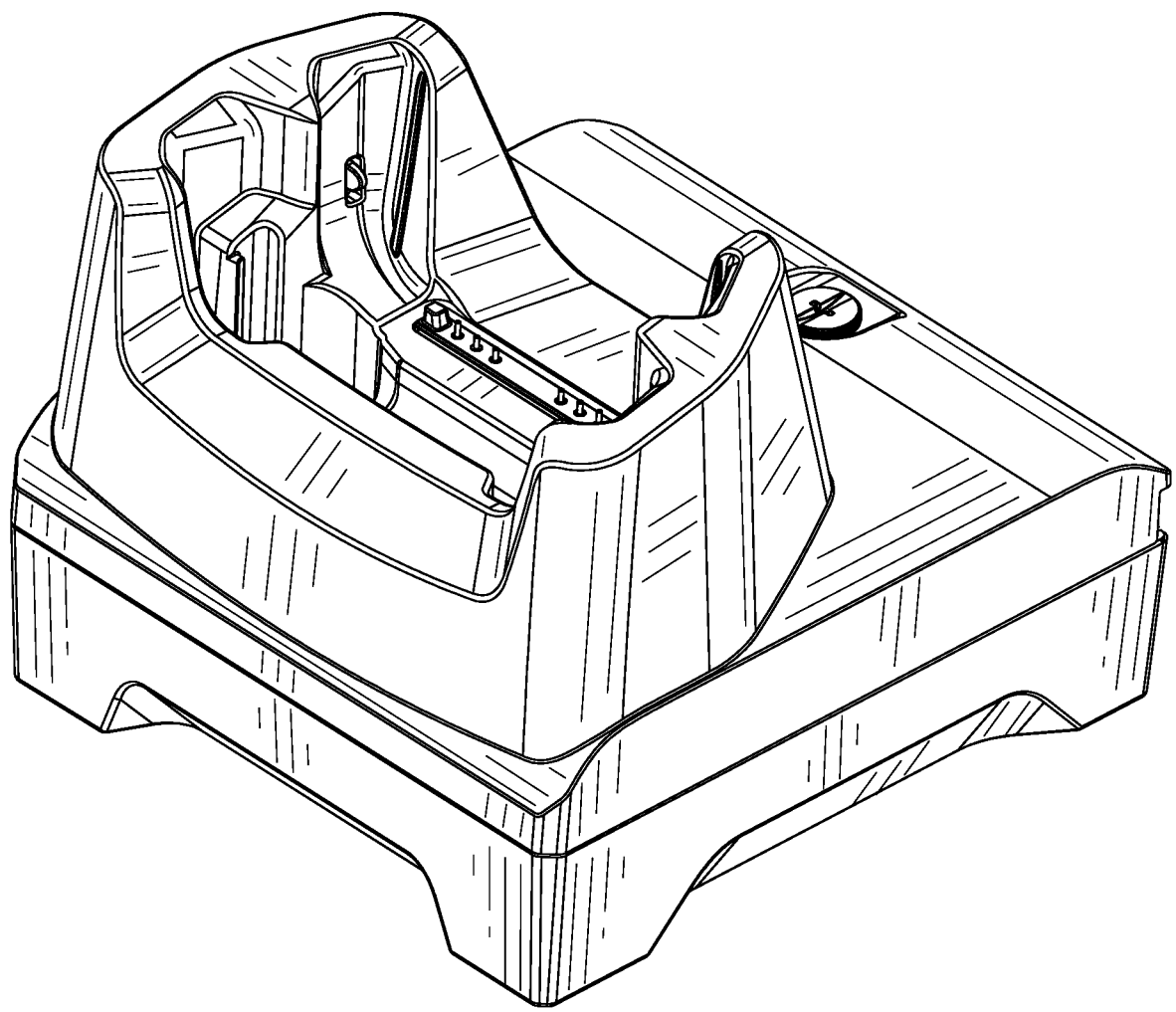
FIG. 46 illustrates a perspective view of the example second cup assembly of FIGS. 18 & 19 in accordance with various embodiments.
Figure 47:
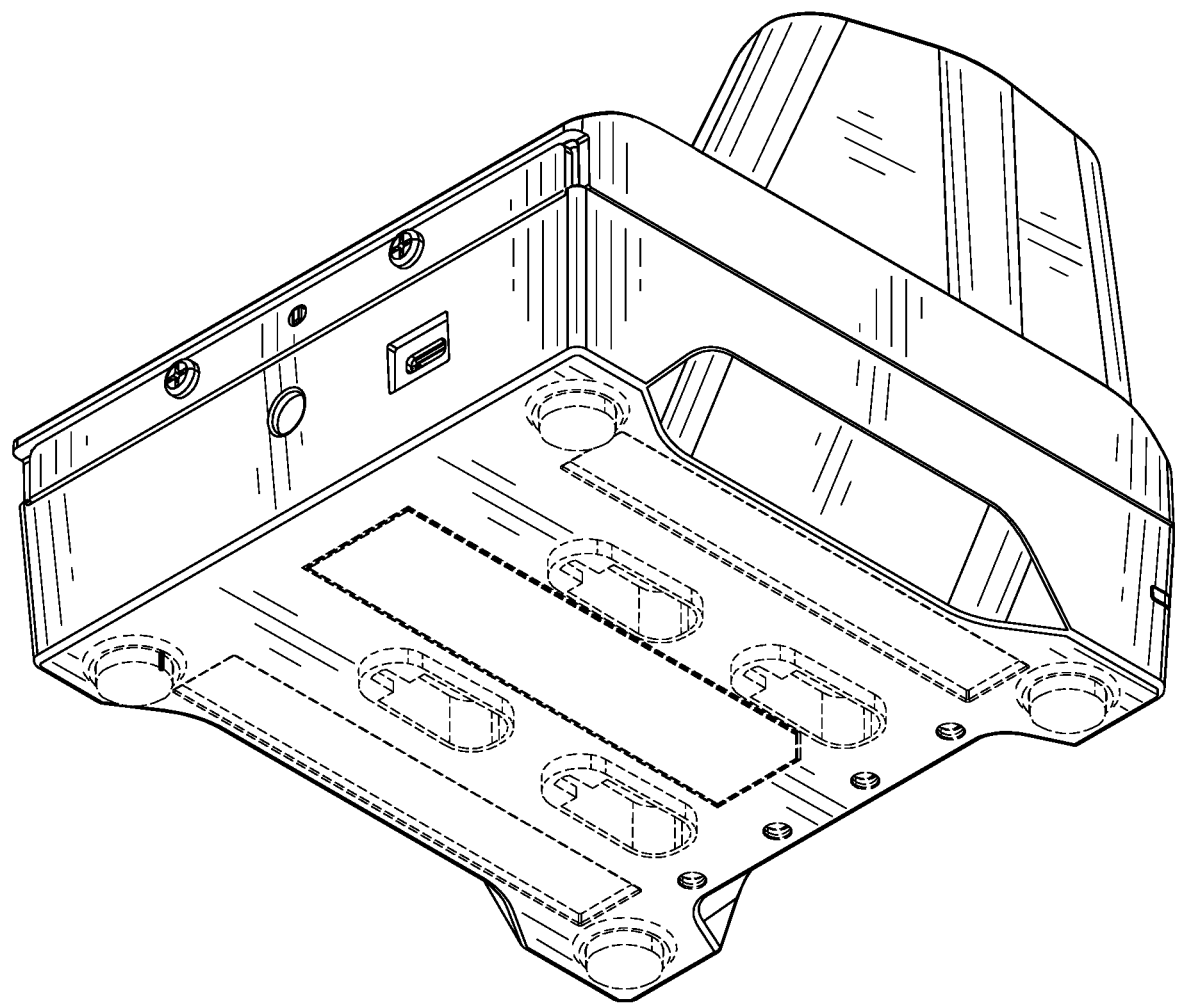
FIG. 47 illustrates a lower perspective view of the example assembly of FIG. 46 in accordance with various embodiments.
Figure 48:
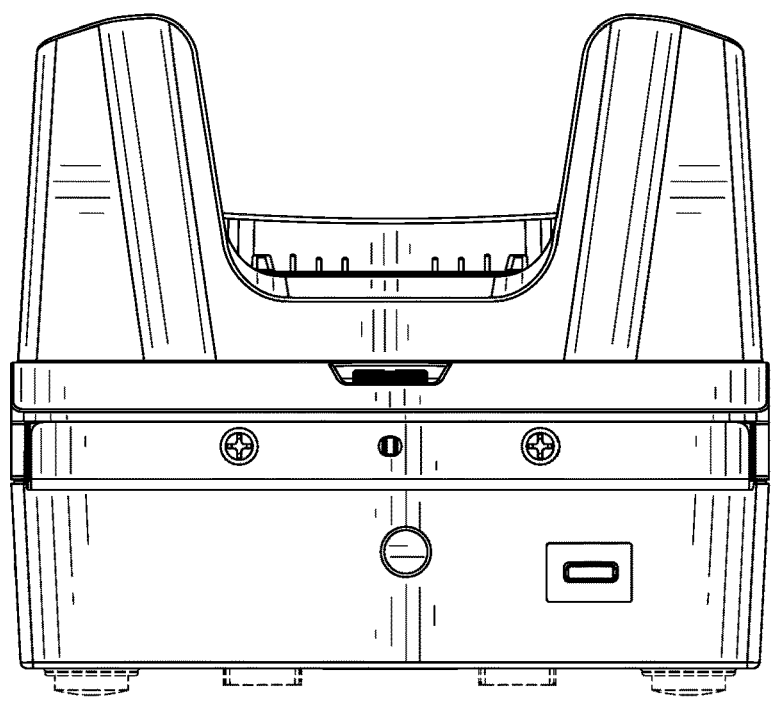
FIG. 48 illustrates rear elevation view of the example assembly of FIGS. 46 & 47 in accordance with various embodiments.
Figure 49:
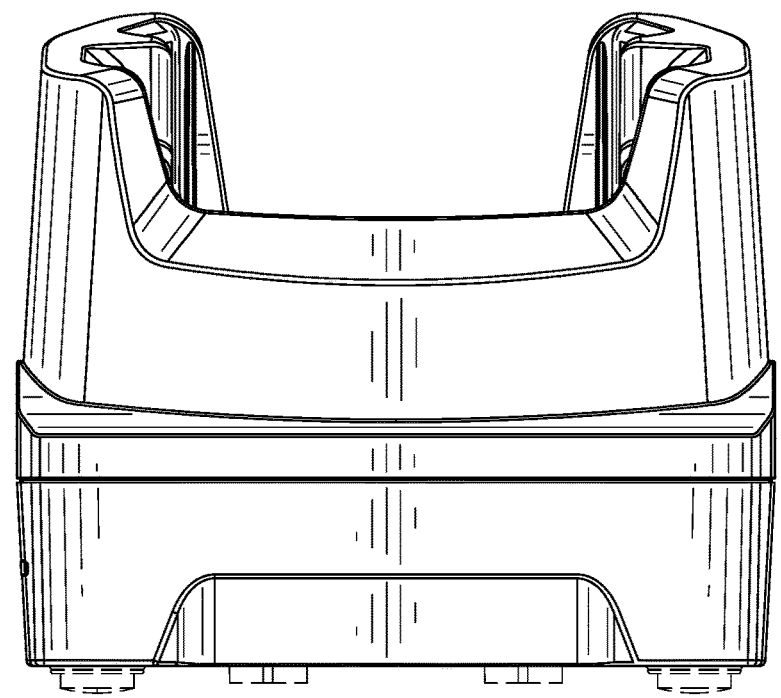
FIG. 49 illustrates a front elevation view of the example assembly of FIGS. 46-48 in accordance with various embodiments.
Figure 50:
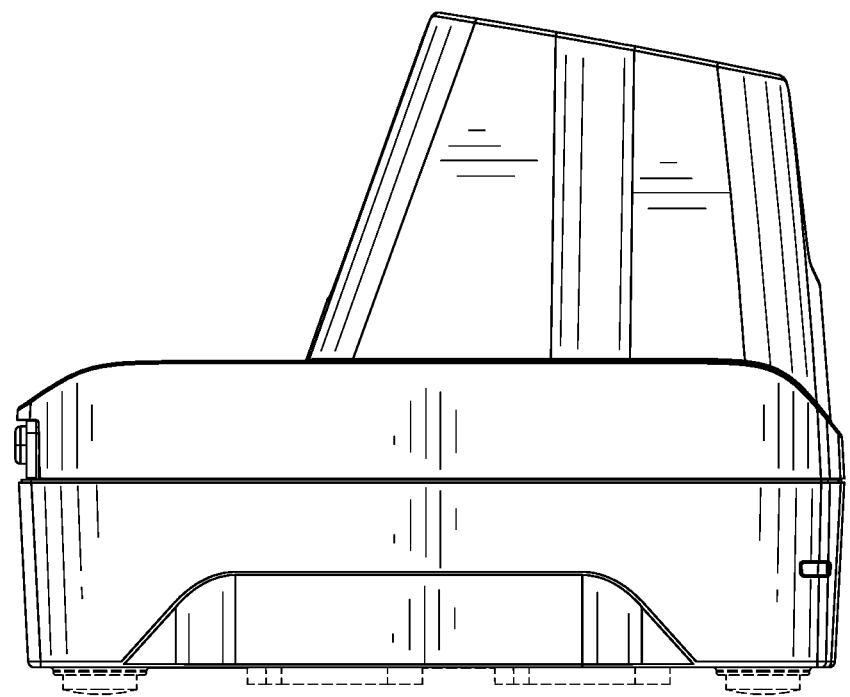
FIG. 50 illustrates a left side elevation view of the example assembly of FIGS. 46-49 in accordance with various embodiments.
Figure 51:
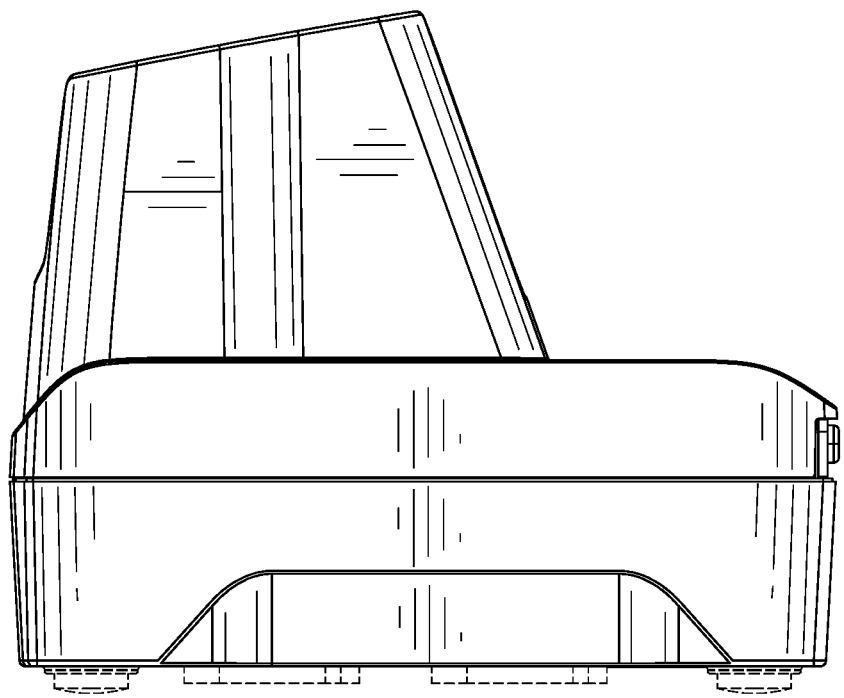
FIG. 51 illustrates a right side elevation view of the example assembly of FIGS. 46-50 in accordance with various embodiments.
Figure 52:
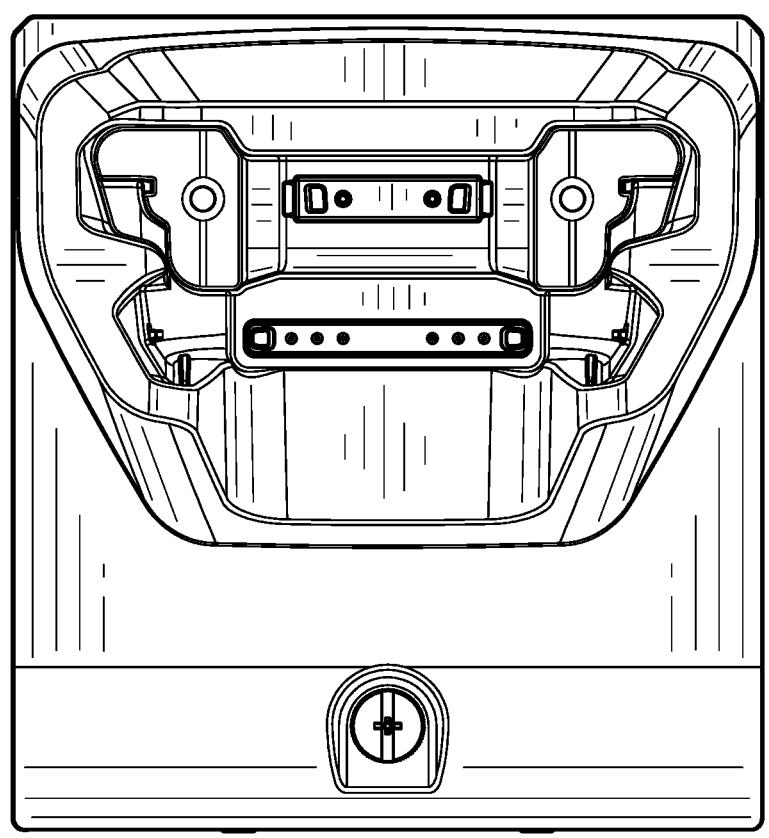
FIG. 52 illustrates a top plan view of the example assembly of FIGS. 46-51 in accordance with various embodiments.
Figure 53:
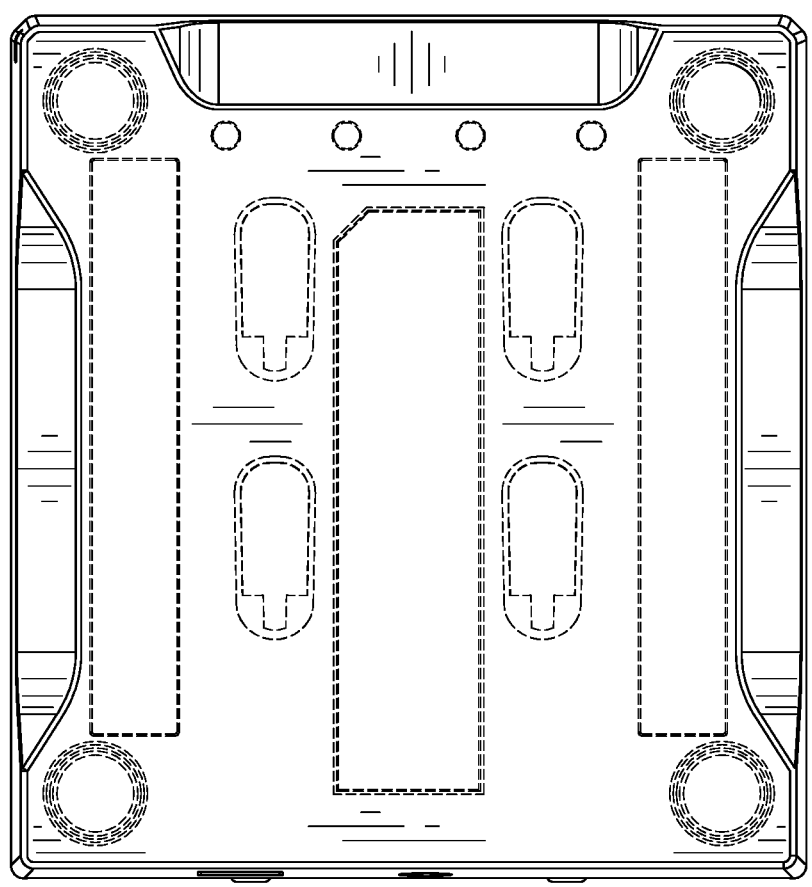
FIG. 53 illustrates a bottom plan view of the example assembly of FIGS. 46-52 in accordance with various embodiments.
Figure 54:
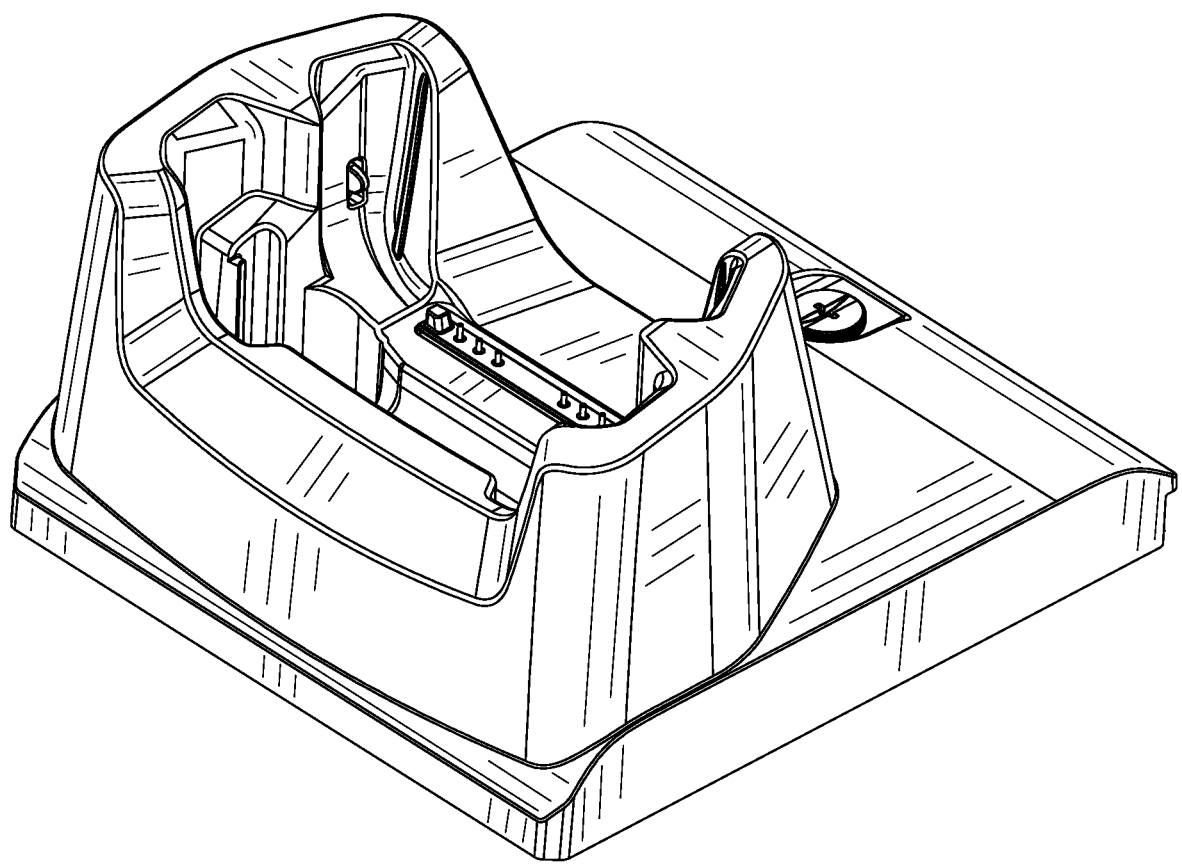
FIG. 54 illustrates a perspective view of an example cup assembly in accordance with various embodiments.
Figure 55:
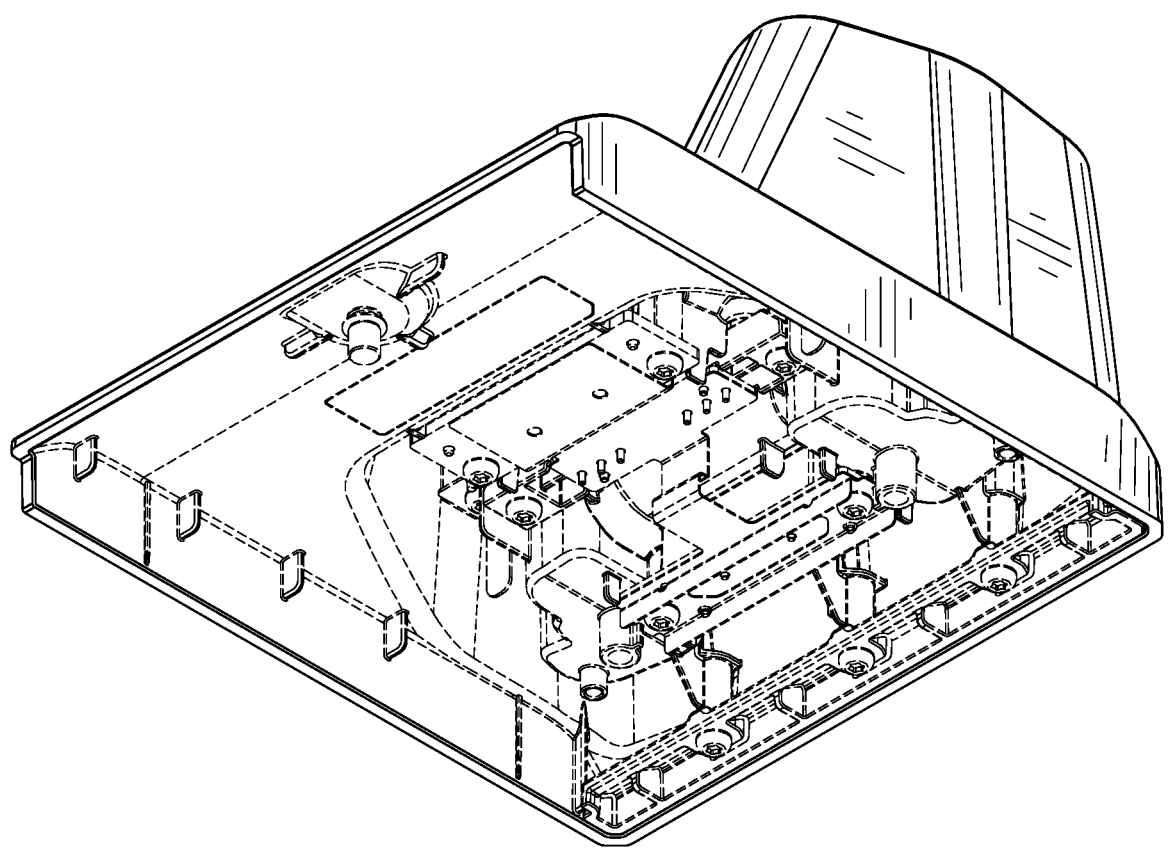
FIG. 55 illustrates a lower perspective view of the example cup assembly of FIG. 54 in accordance with various embodiments.
Figure 56:
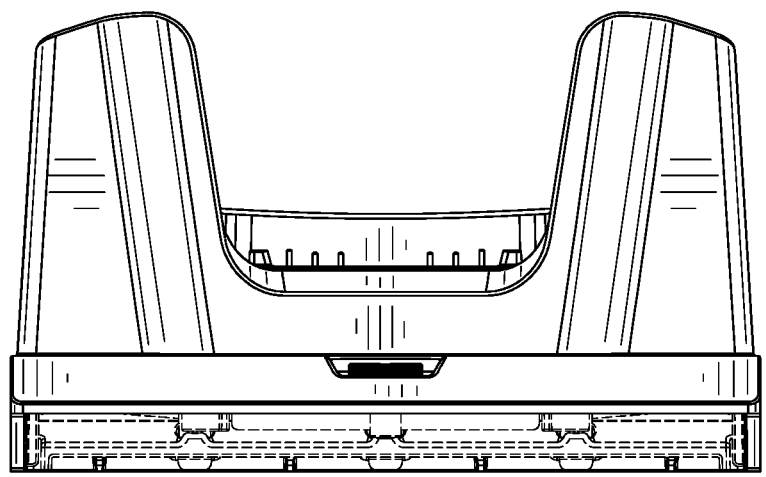
FIG. 56 illustrates rear elevation view of the example cup assembly of FIGS. 54 & 55 in accordance with various embodiments.
Figure 57:
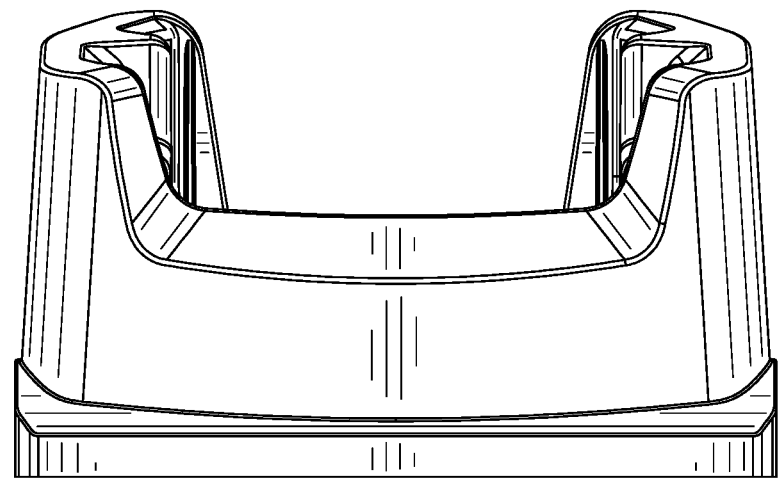
FIG. 57 illustrates a front elevation view of the example cup assembly of FIGS. 54-56 in accordance with various embodiments.
Figure 58:
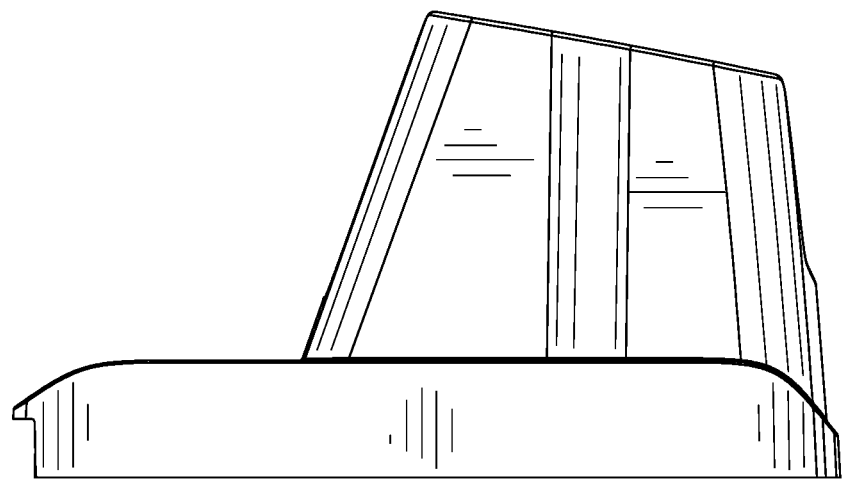
FIG. 58 illustrates a left side elevation view of the example cup assembly of FIGS. 54-57 in accordance with various embodiments.
Figure 59:
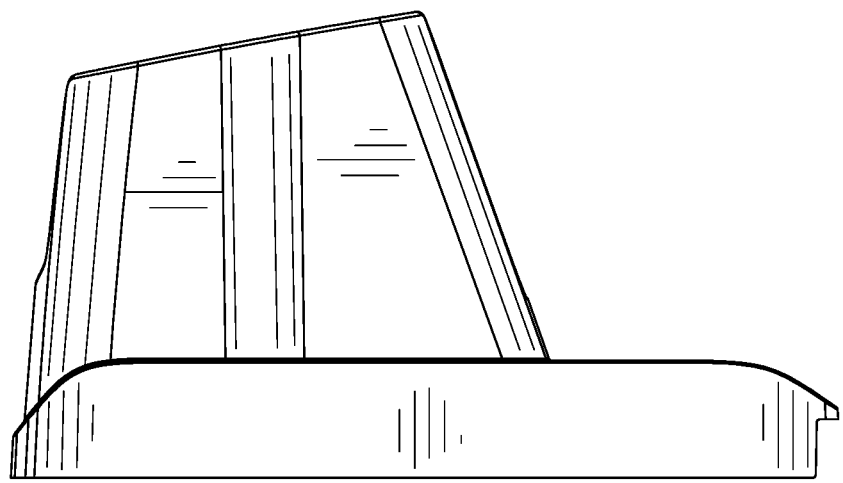
FIG. 59 illustrates a right side elevation view of the example cup assembly of FIGS. 54-58 in accordance with various embodiments.
Figure 60:
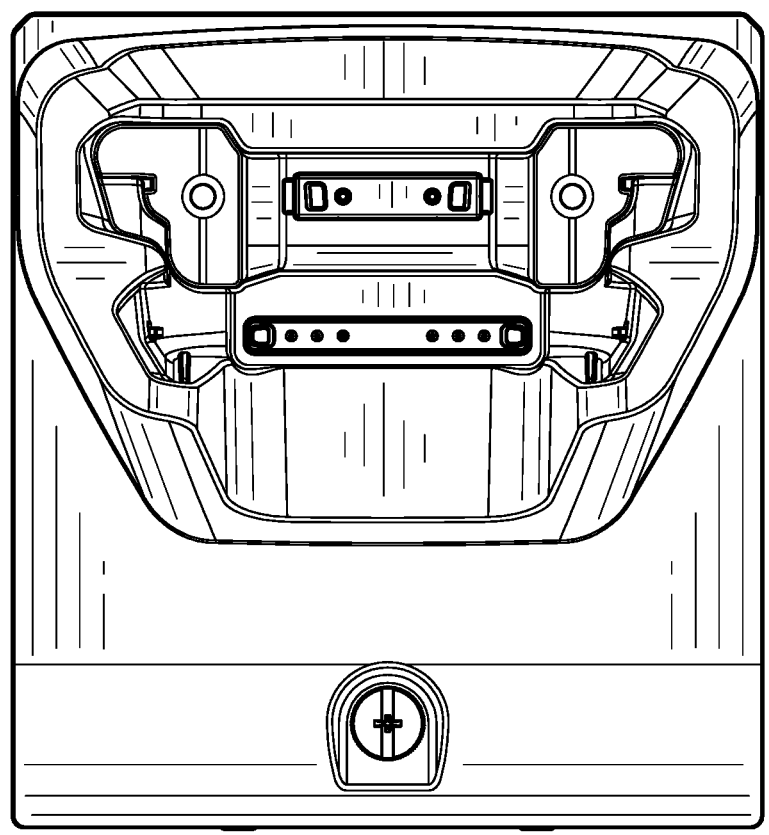
FIG. 60 illustrates a top plan view of the example cup assembly of FIGS. 54-59 in accordance with various embodiments.
Figure 61:
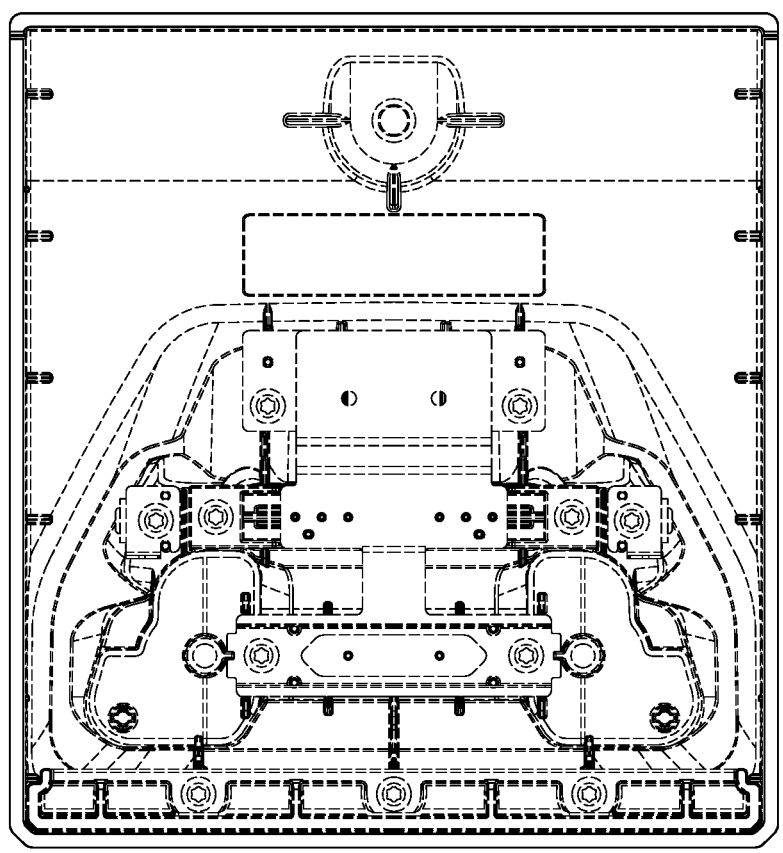
FIG. 61 illustrates a bottom plan view of the example cup assembly of FIGS. 54-60 in accordance with various embodiments.
Figure 62:
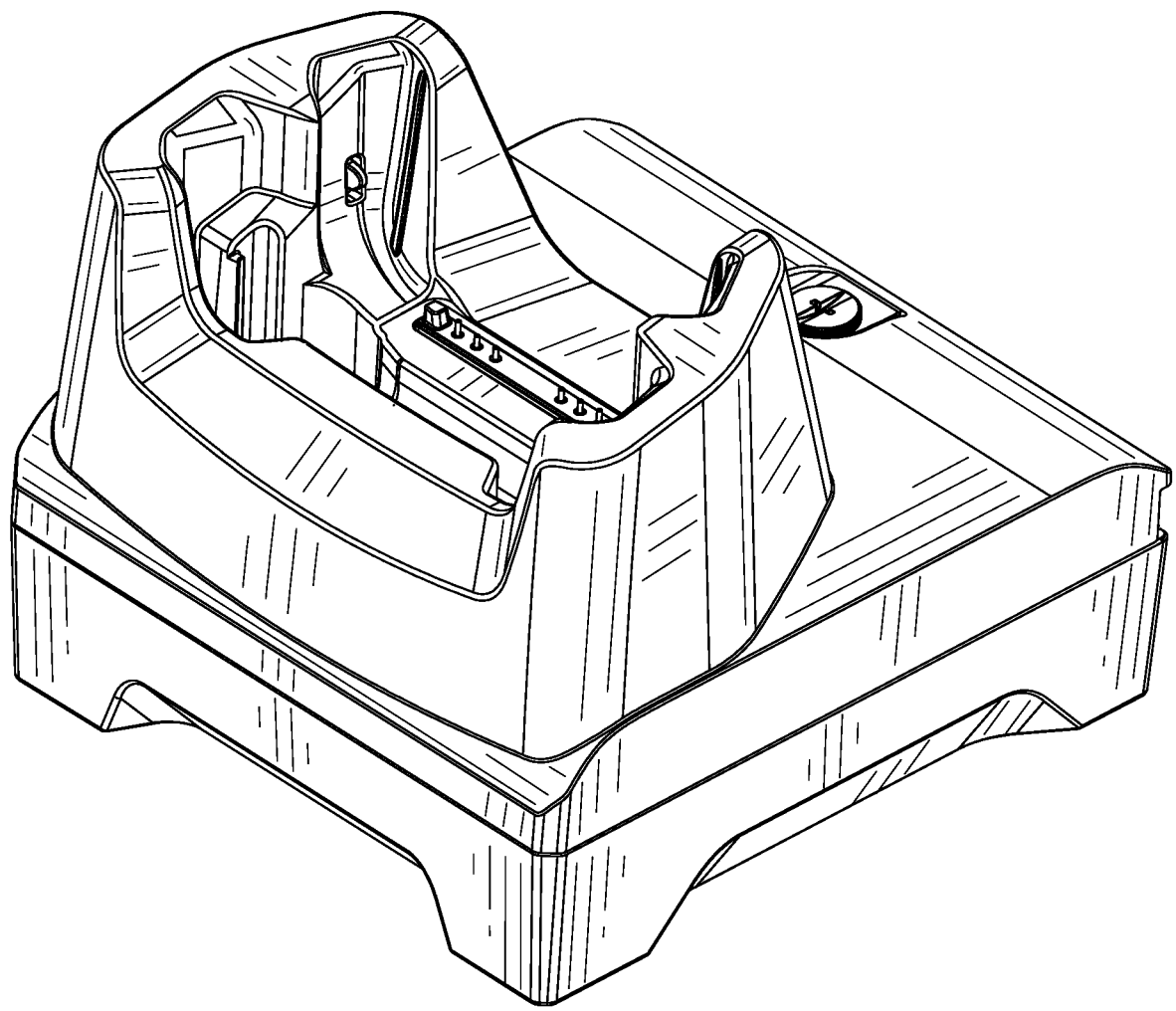
FIG. 62 illustrates a perspective view of an example assembly in accordance with various embodiments.
Figure 63:
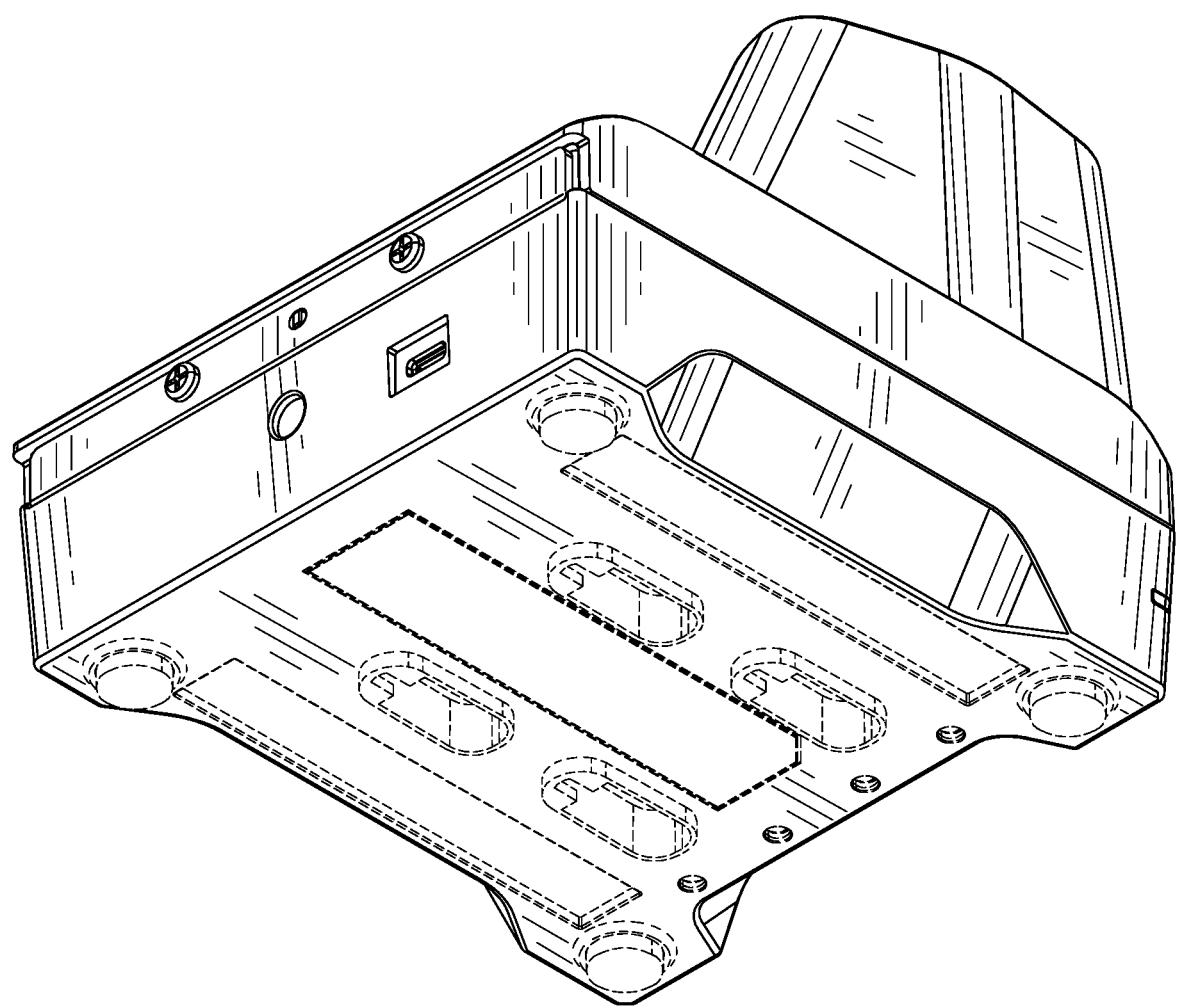
FIG. 63 illustrates a lower perspective view of the example assembly of FIG. 62 in accordance with various embodiments.
Figure 64:
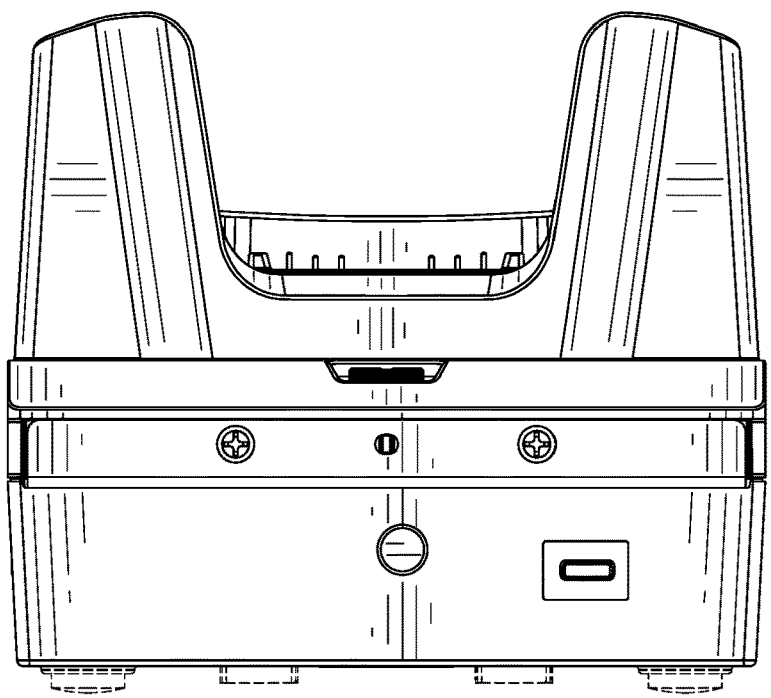
FIG. 64 illustrates rear elevation view of the example assembly of FIGS. 62 & 63 in accordance with various embodiments.
Figure 65:
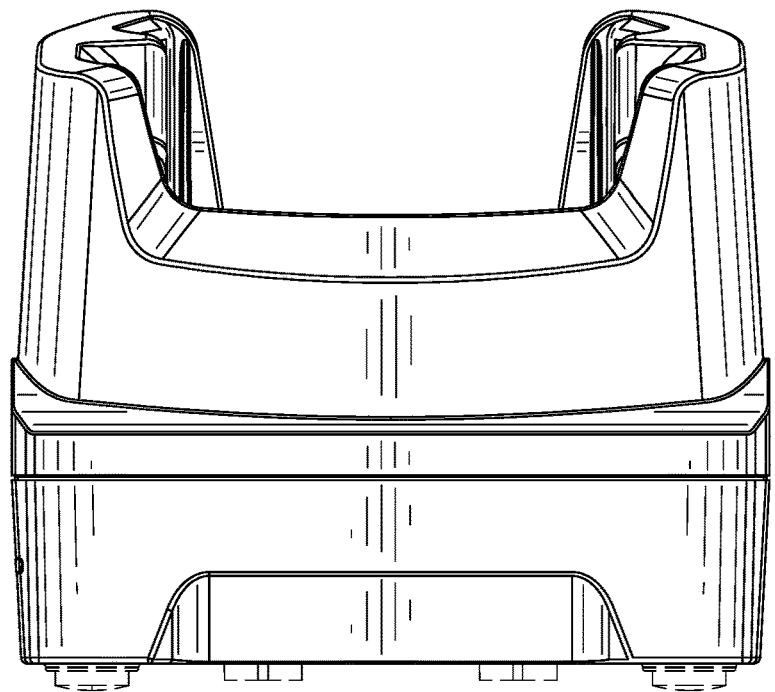
FIG. 65 illustrates a front elevation view of the example assembly of FIGS. 62-64 in accordance with various embodiments.
Figure 66:
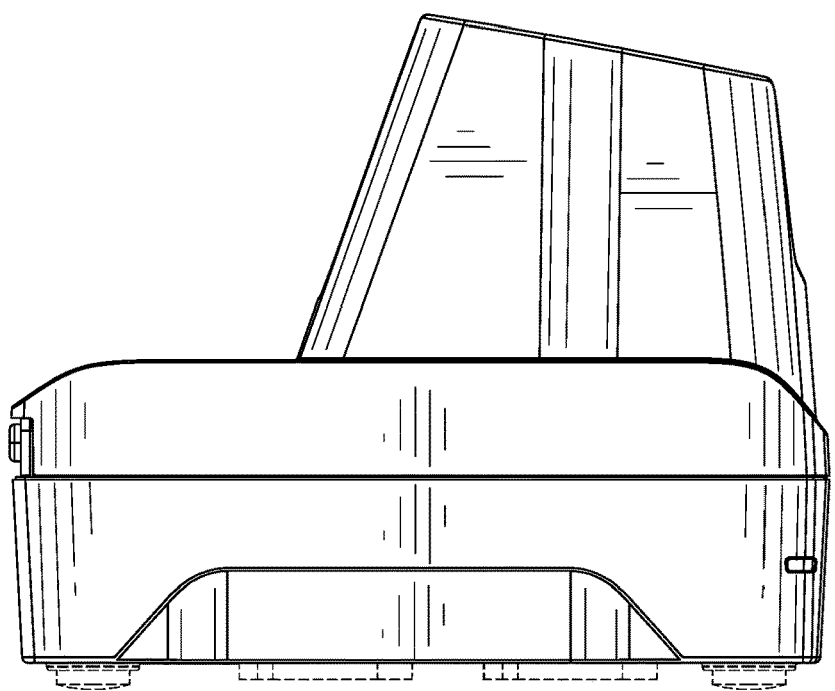
FIG. 66 illustrates a left side elevation view of the example assembly of FIGS. 62-65 in accordance with various embodiments.
Figure 67:
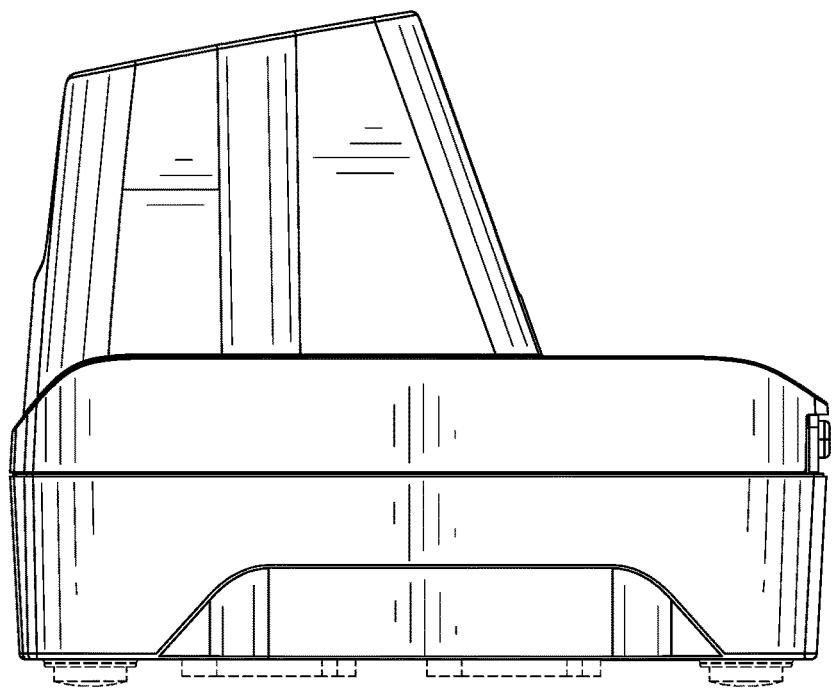
FIG. 67 illustrates a right side elevation view of the example assembly of FIGS. 62-66 in accordance with various embodiments.
Figure 68:
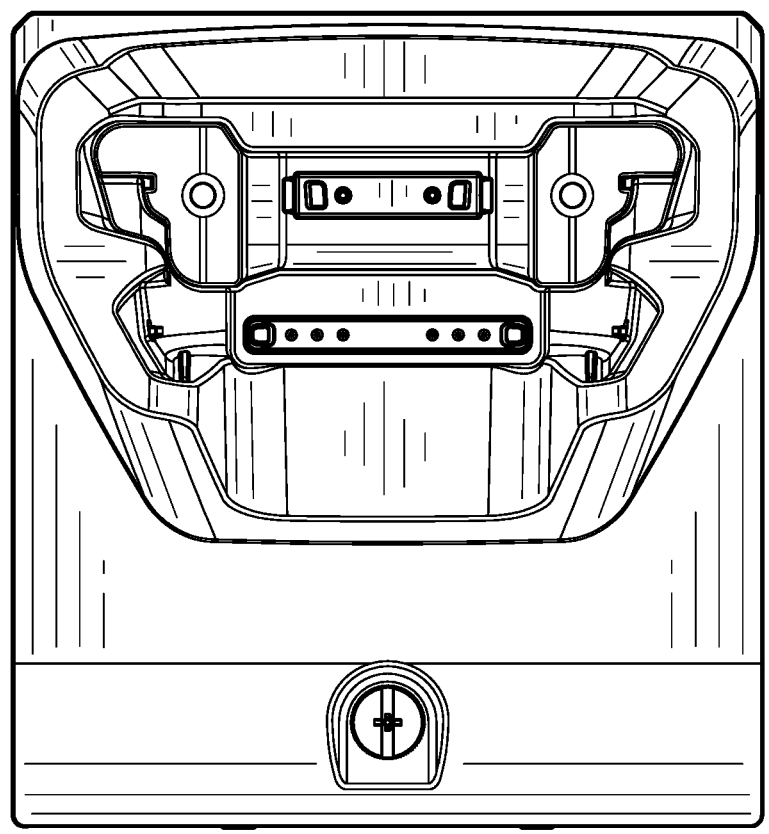
FIG. 68 illustrates a top plan view of the example assembly of FIGS. 62-67 in accordance with various embodiments.
Figure 69:
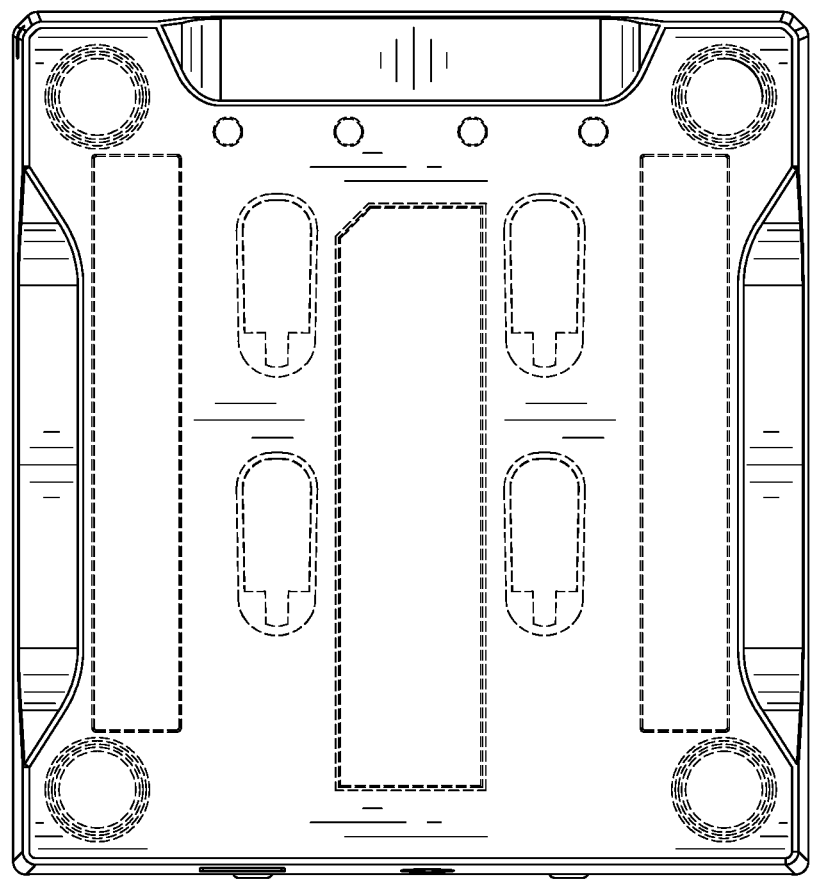
FIG. 69 illustrates a bottom plan view of the example assembly of FIGS. 62-68 in accordance with various embodiments.
Figure 70:
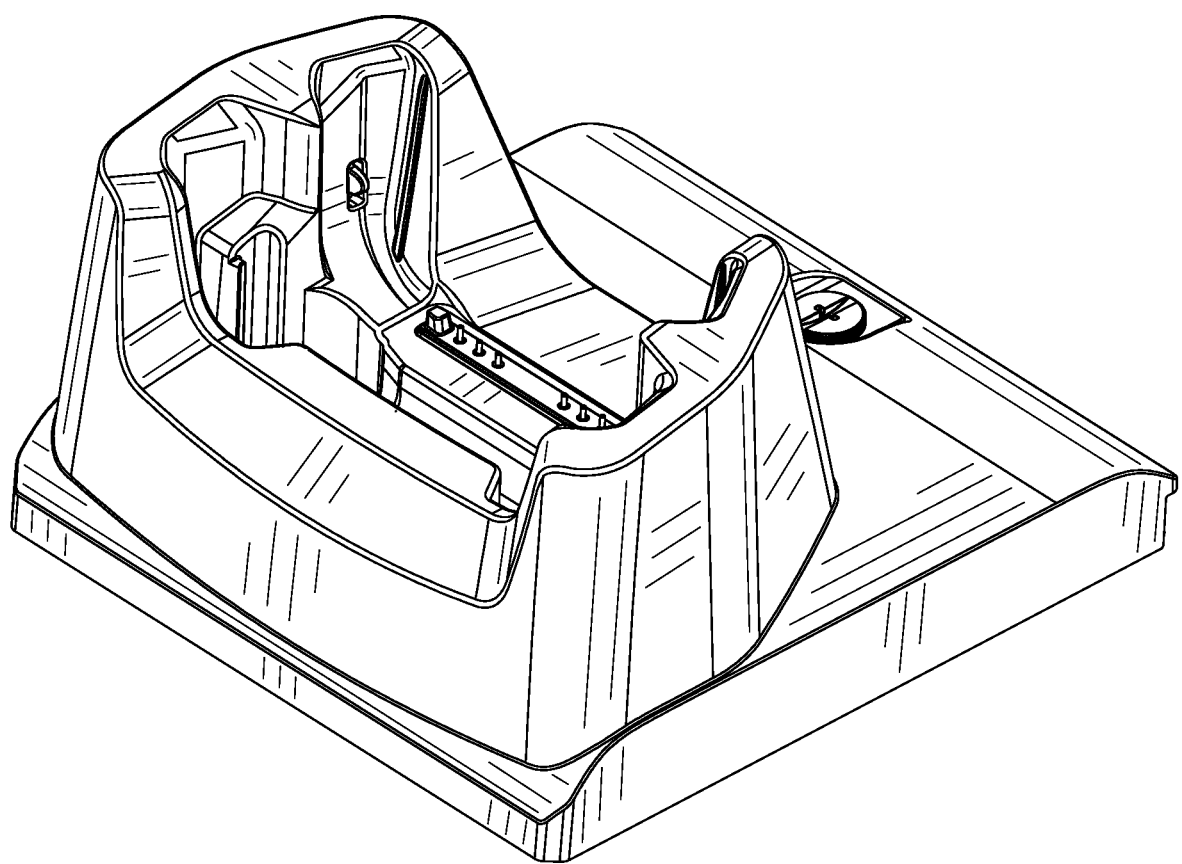
FIG. 70 illustrates a perspective view of an example cup assembly in accordance with various embodiments.
Figure 71:
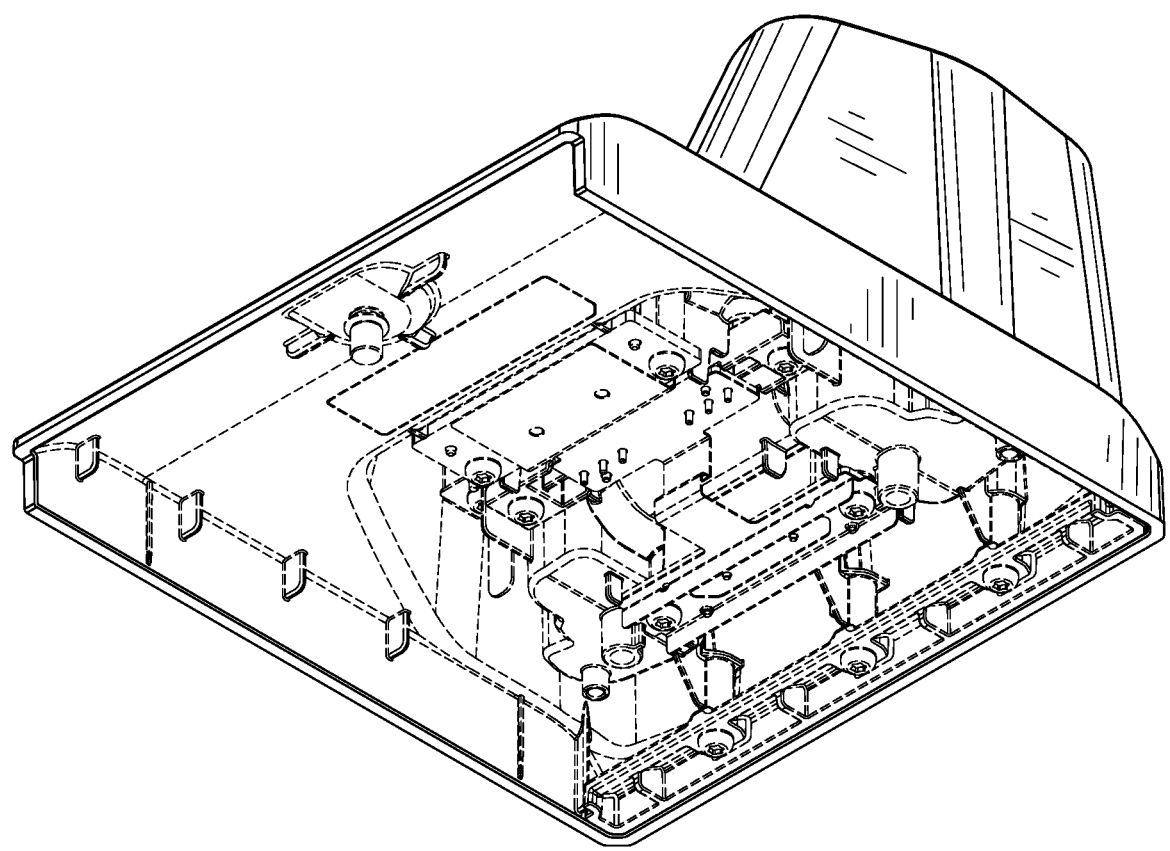
FIG. 71 illustrates a lower perspective view of the example cup assembly of FIG. 70 in accordance with various embodiments.
Figure 72:
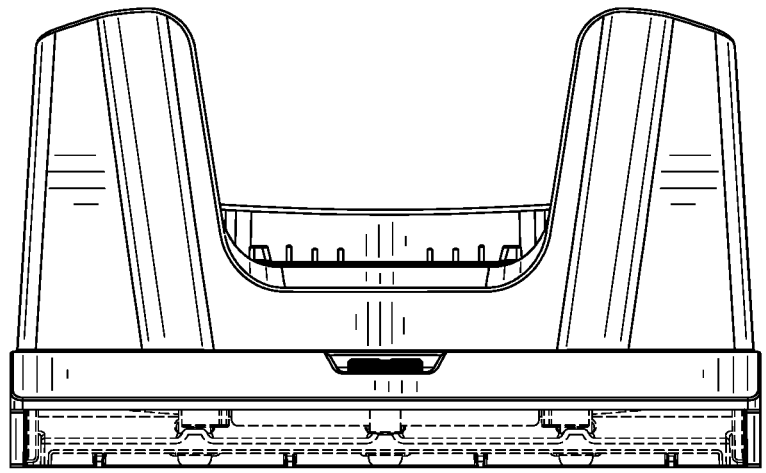
FIG. 72 illustrates rear elevation view of the example cup assembly of FIGS. 70 & 71 in accordance with various embodiments.
Figure 73:
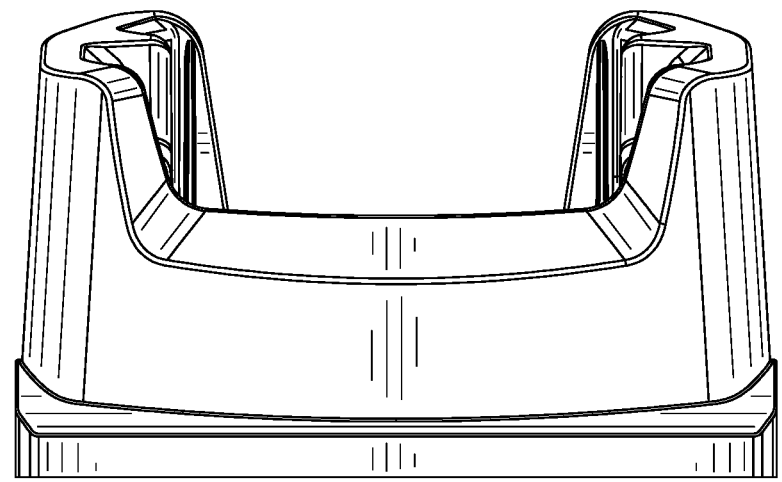
FIG. 73 illustrates a front elevation view of the example cup assembly of FIGS. 70-72 in accordance with various embodiments.
Figure 74:
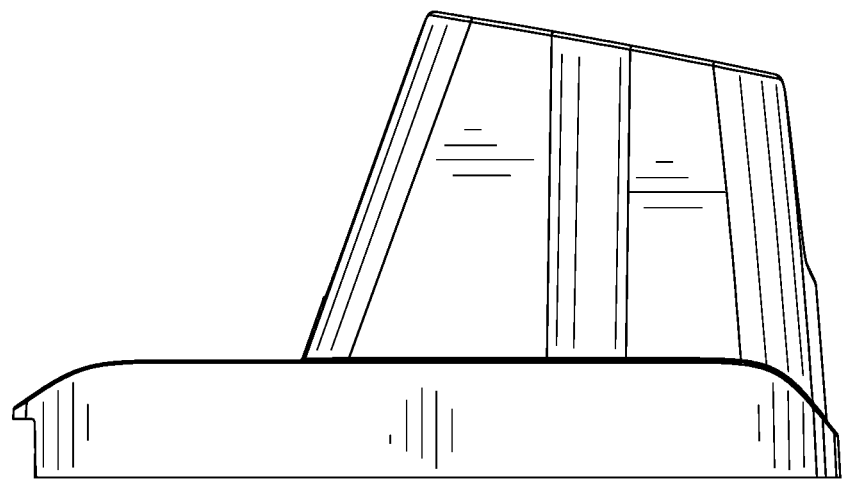
FIG. 74 illustrates a left side elevation view of the example cup assembly of FIGS. 70-73 in accordance with various embodiments.
Figure 75:
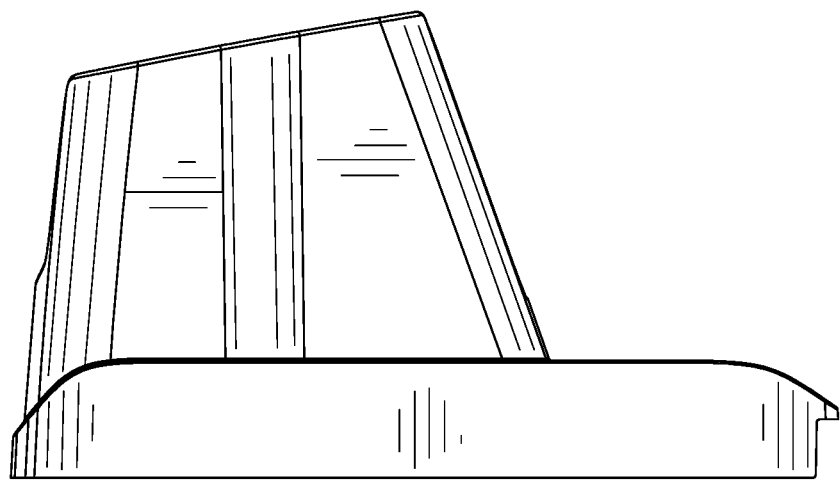
FIG. 75 illustrates a right side elevation view of the example cup assembly of FIGS. 70-74 in accordance with various embodiments.
Figure 76:
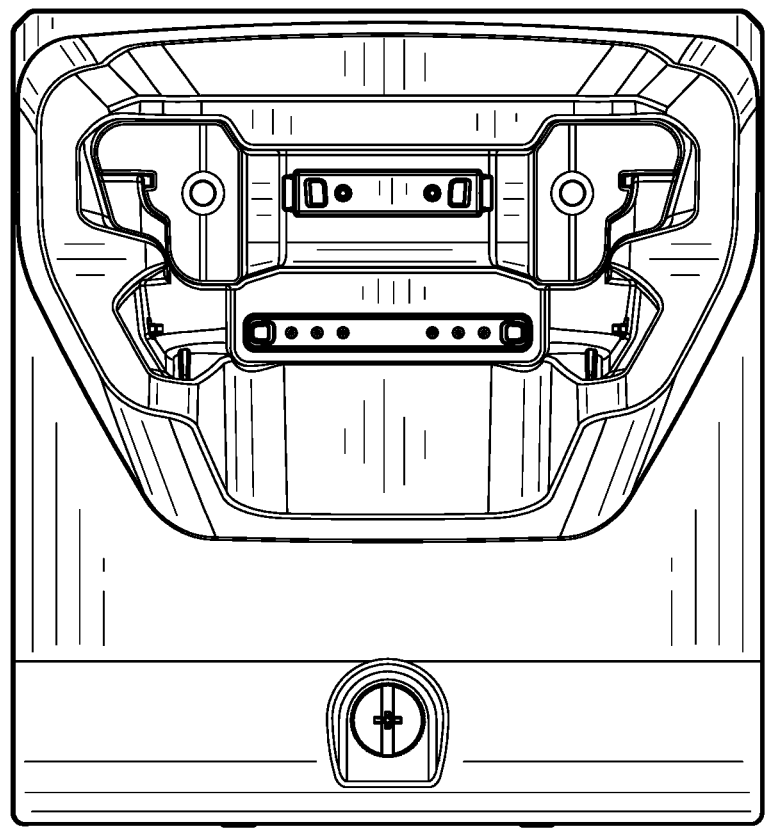
FIG. 76 illustrates a top plan view of the example cup assembly of FIGS. 70-75 in accordance with various embodiments.
Figure 77:
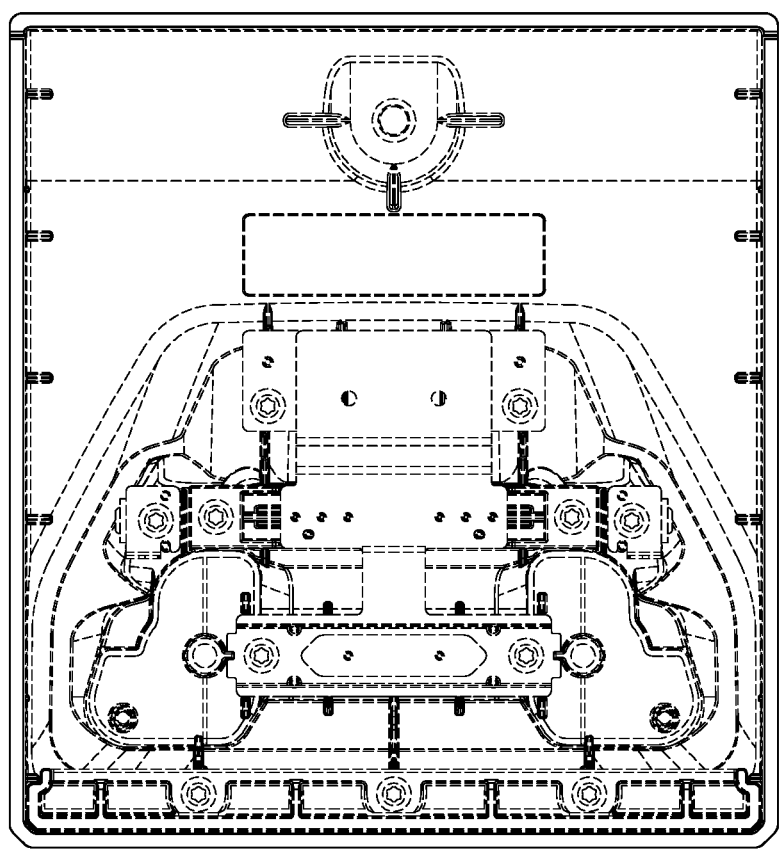
FIG. 77 illustrates a bottom plan view of the example cup assembly of FIGS. 70-76 in accordance with various embodiments.
Figure 78:
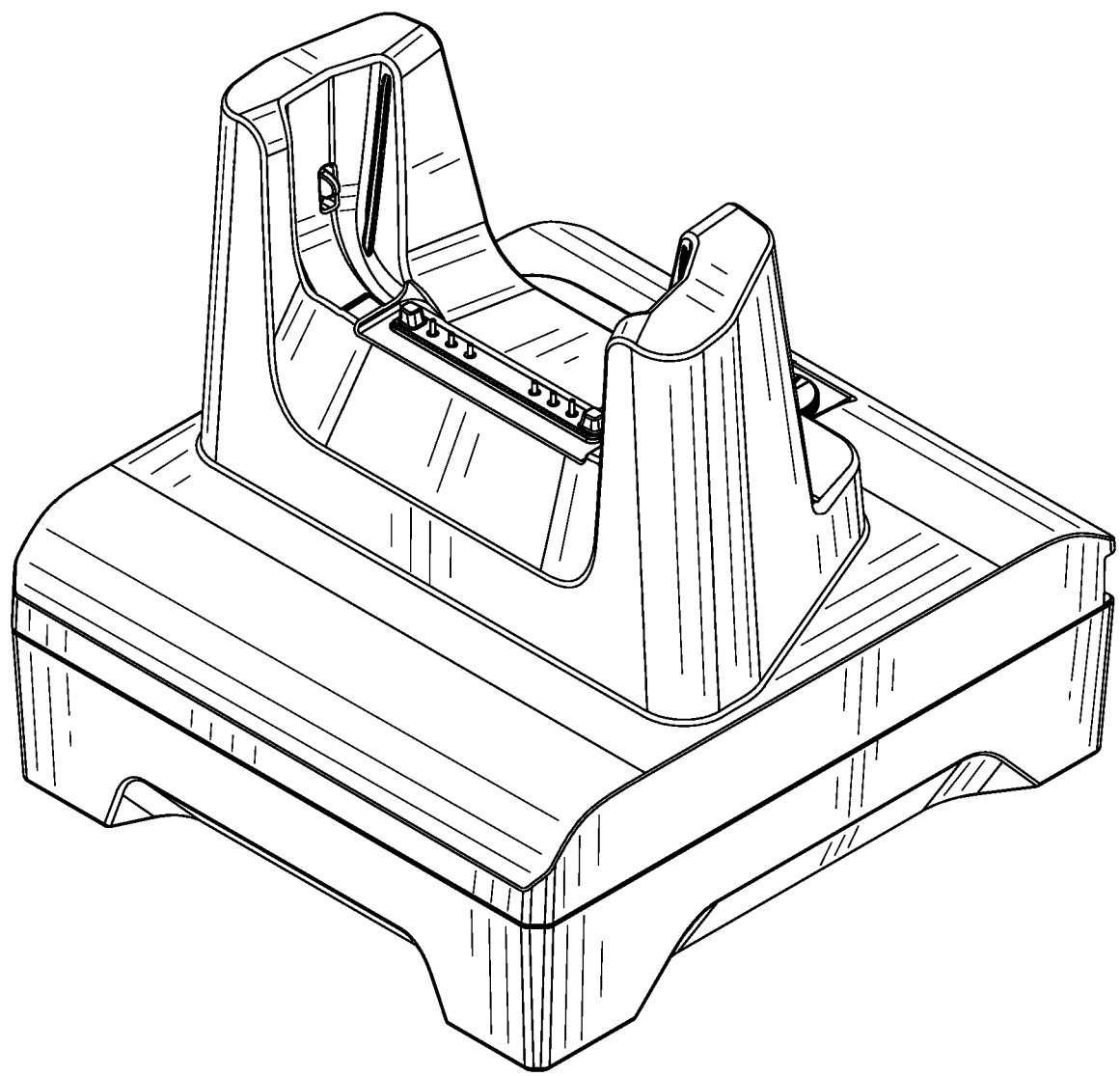
FIG. 78 illustrates a perspective view of an example assembly in accordance with various embodiments.
Figure 79:
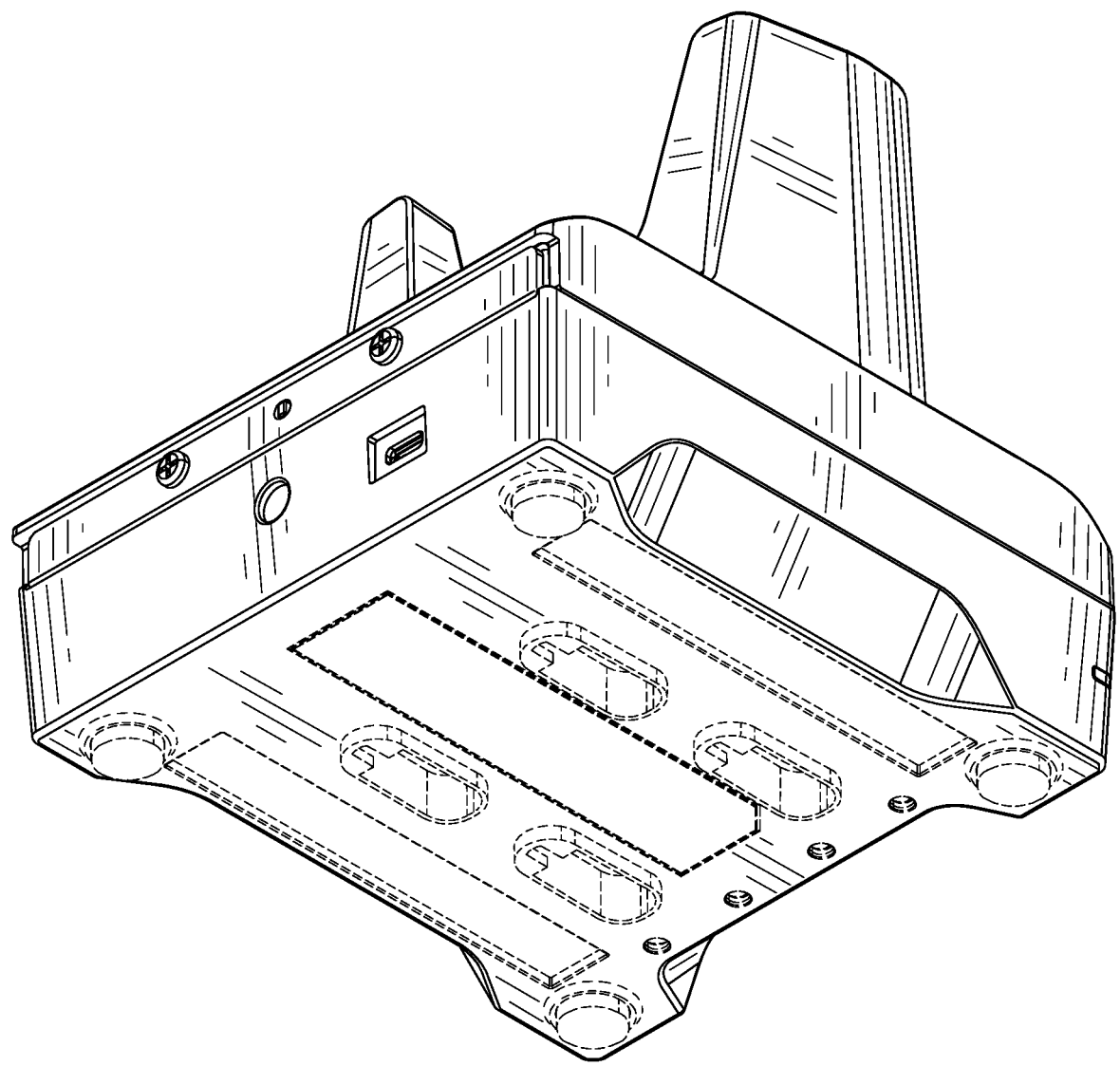
FIG. 79 illustrates a lower perspective view of the example assembly of FIG. 78 in accordance with various embodiments.
Figure 80:
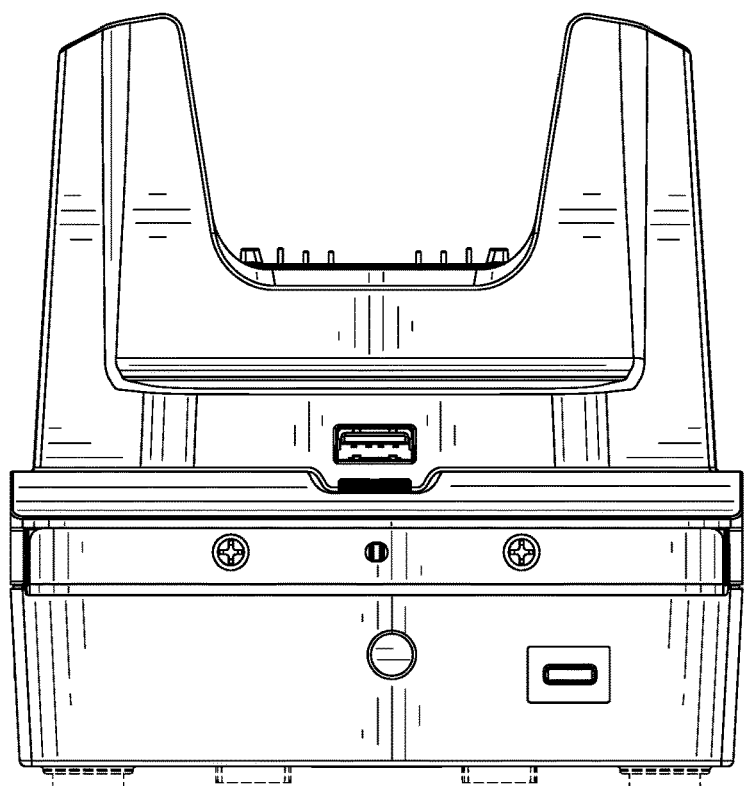
FIG. 80 illustrates rear elevation view of the example assembly of FIGS. 78 & 79 in accordance with various embodiments.
Figure 81:
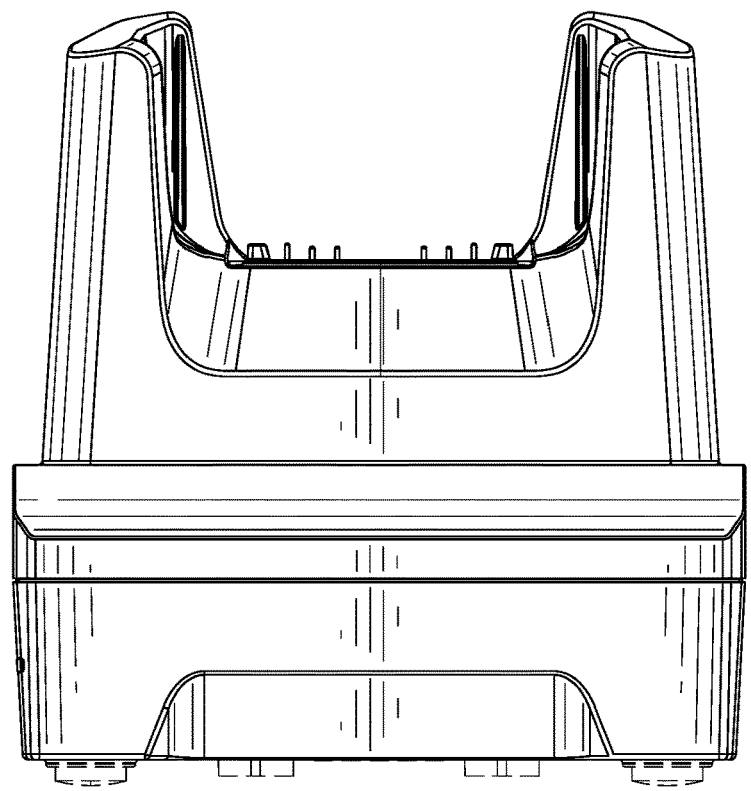
FIG. 81 illustrates a front elevation view of the example assembly of FIGS. 78-80 in accordance with various embodiments.
Figure 82:
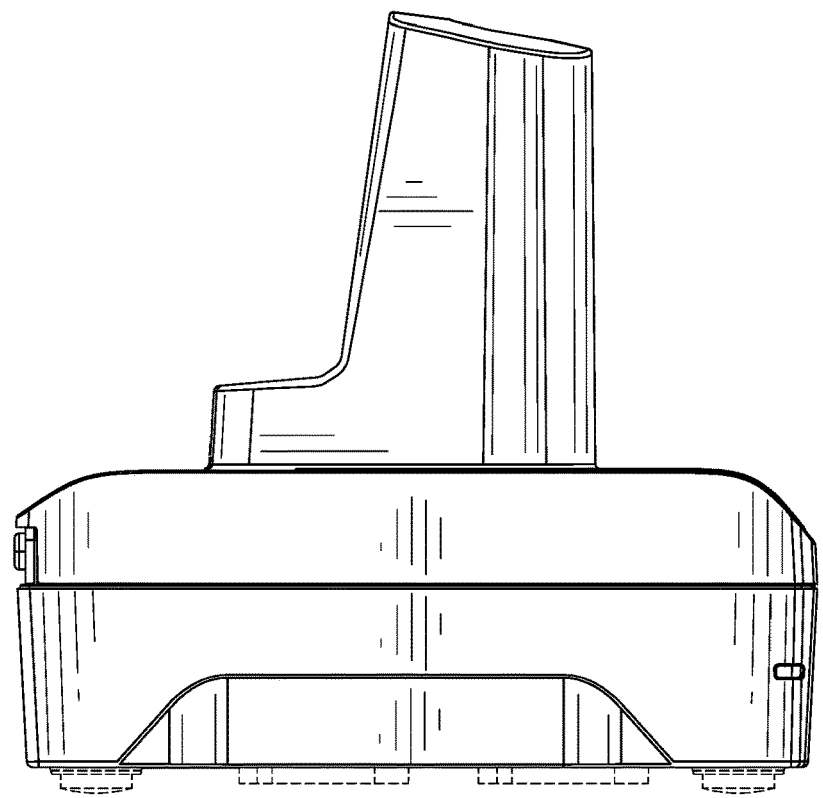
FIG. 82 illustrates a left side elevation view of the example assembly of FIGS. 78-81 in accordance with various embodiments.
Figure 83:
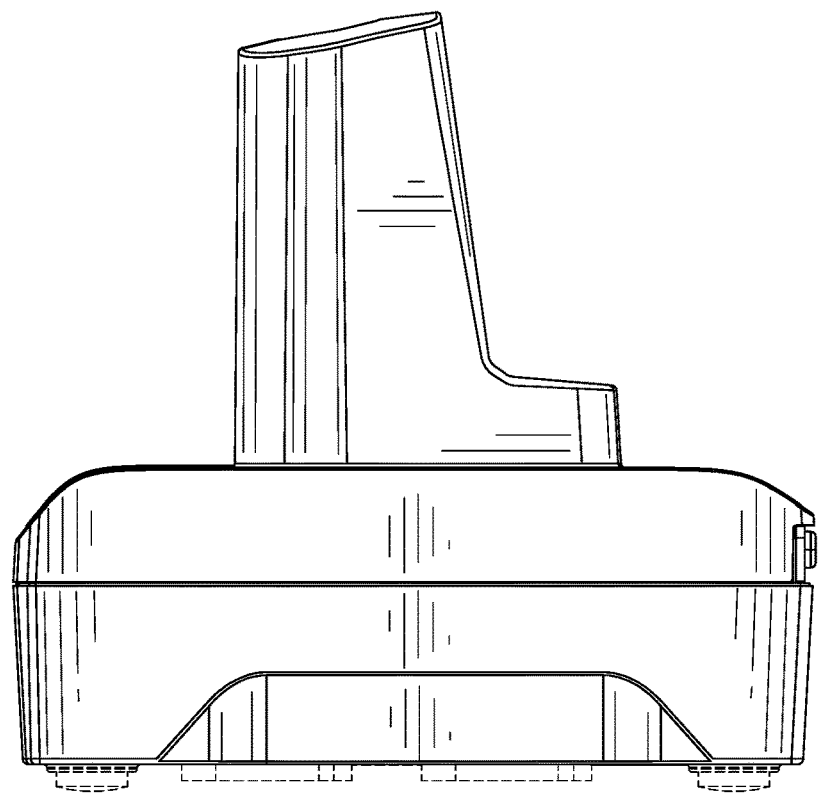
FIG. 83 illustrates a right side elevation view of the example assembly of FIGS. 78-82 in accordance with various embodiments.
Figure 84:
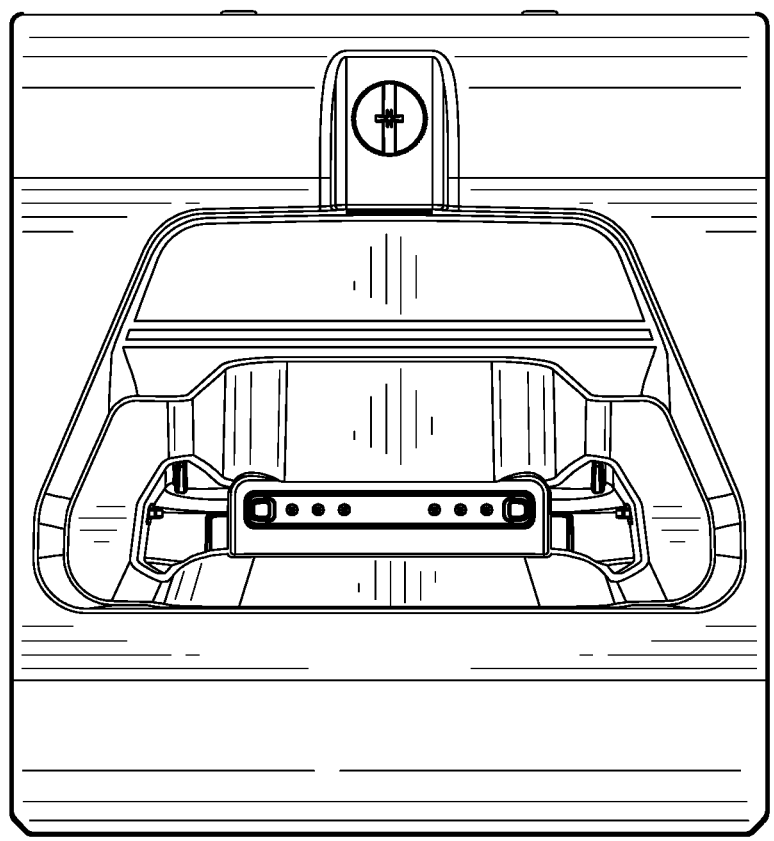
FIG. 84 illustrates a top plan view of the example assembly of FIGS. 78-83 in accordance with various embodiments.
Figure 85:
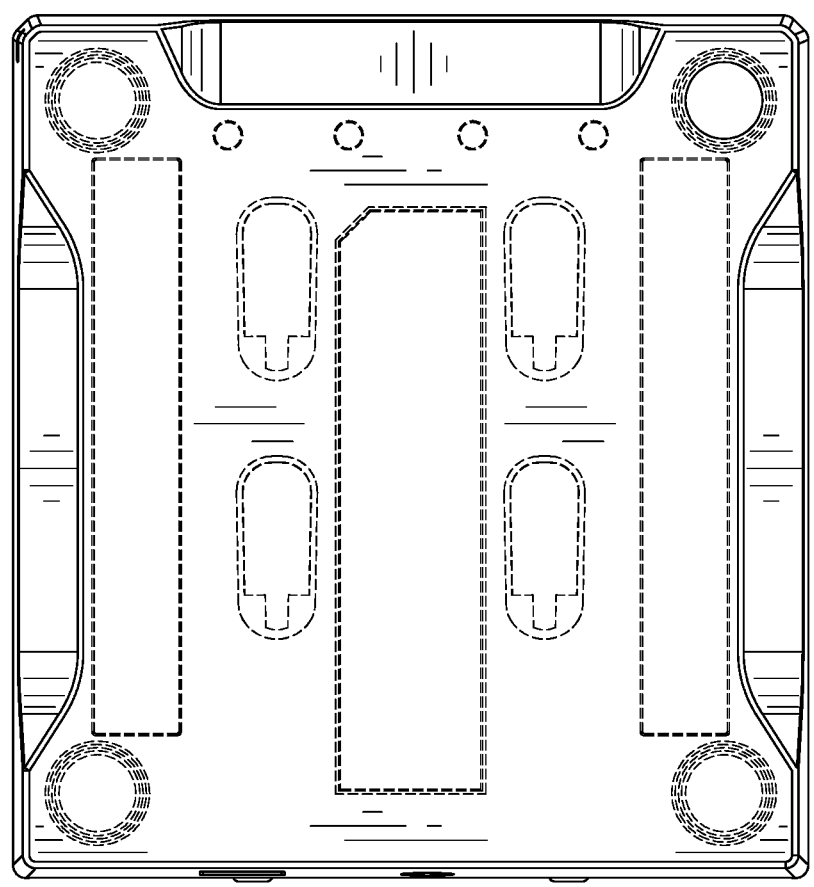
FIG. 85 illustrates a bottom plan view of the example assembly of FIGS. 78-84 in accordance with various embodiments.
Figure 86:
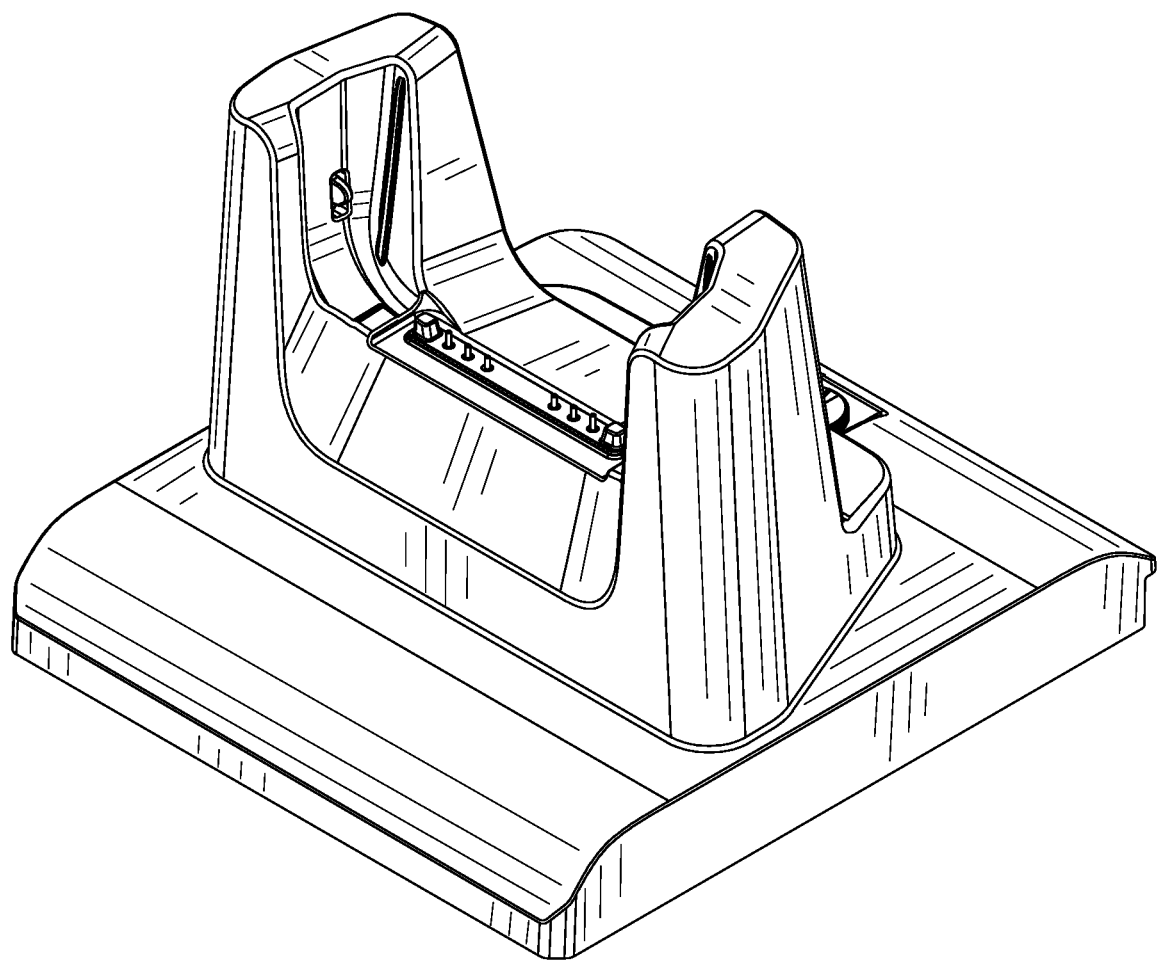
FIG. 86 illustrates a perspective view of an example cup assembly in accordance with various embodiments.
Figure 87:
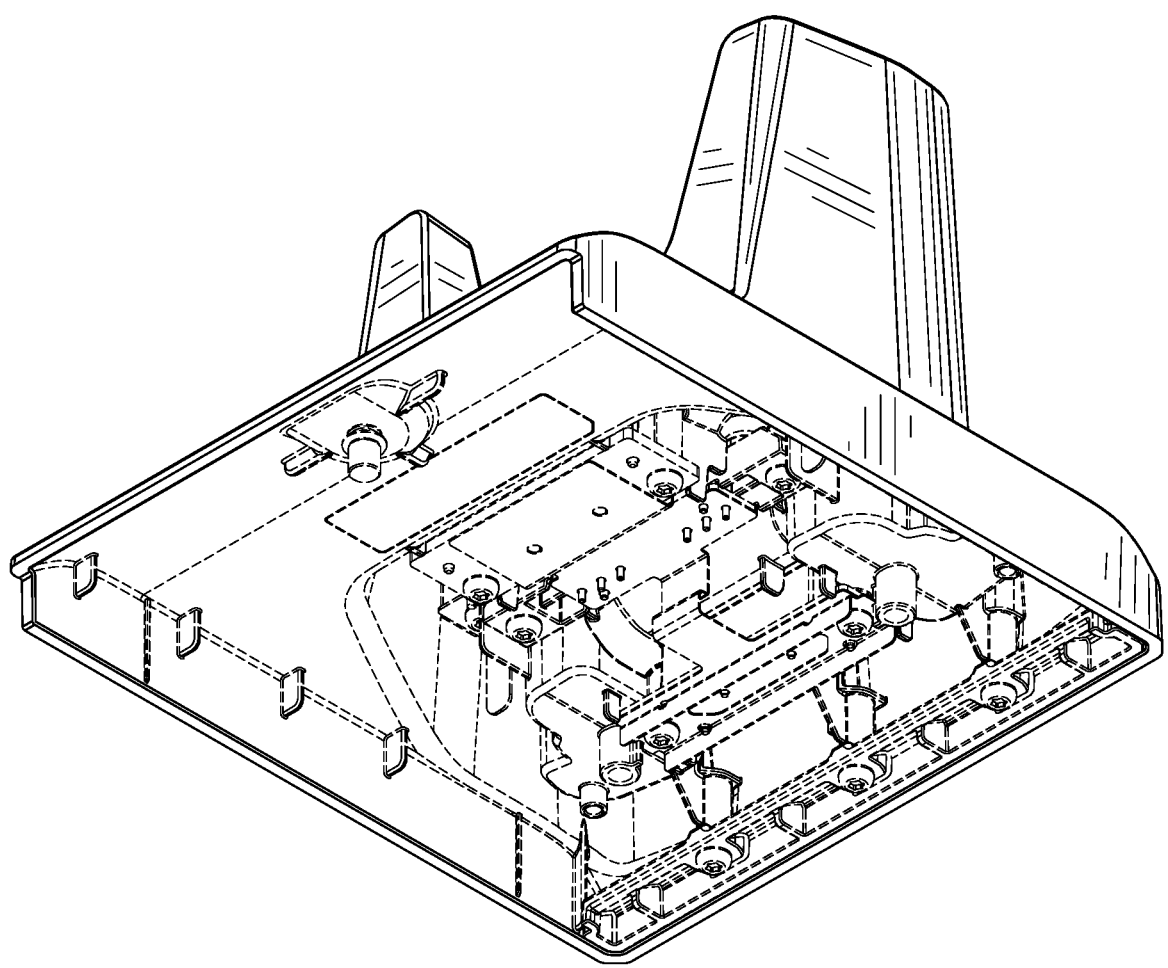
FIG. 87 illustrates a lower perspective view of the example cup assembly of FIG. 86 in accordance with various embodiments.
Figure 88:
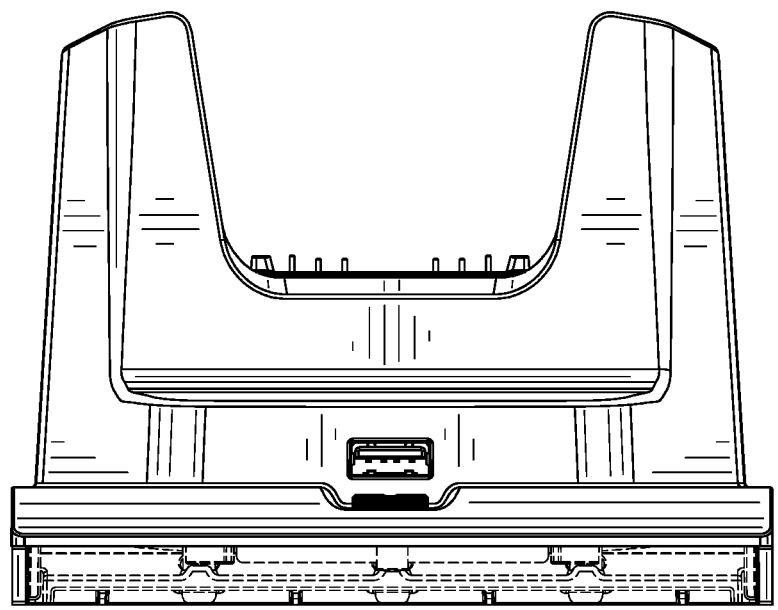
FIG. 88 illustrates rear elevation view of the example cup assembly of FIGS. 86 & 71 in accordance with various embodiments.
Figure 89:
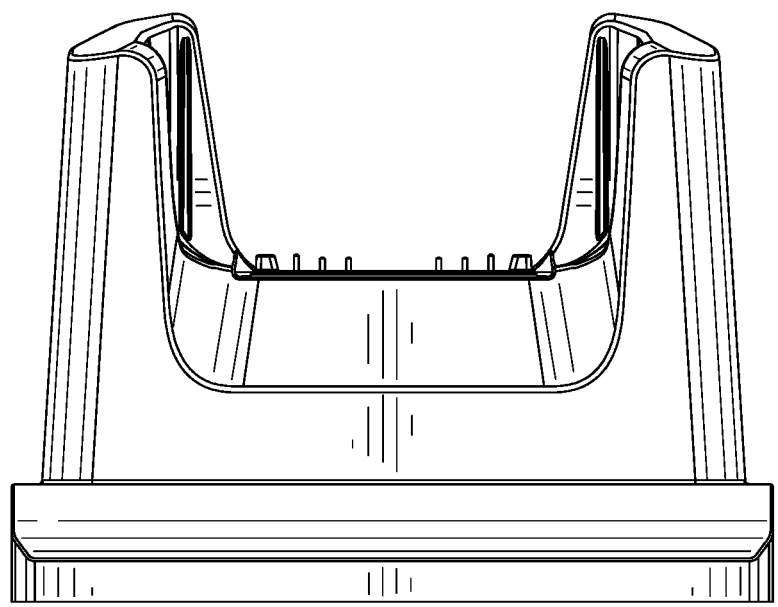
FIG. 89 illustrates a front elevation view of the example cup assembly of FIGS. 86-72 in accordance with various embodiments.
Figure 90:
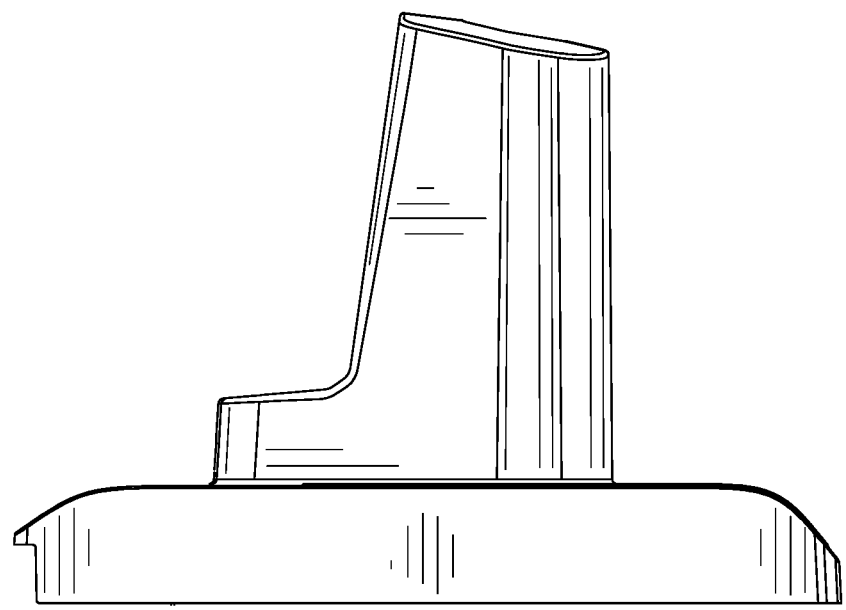
FIG. 90 illustrates a left side elevation view of the example cup assembly of FIGS. 86-89 in accordance with various embodiments.
Figure 91:
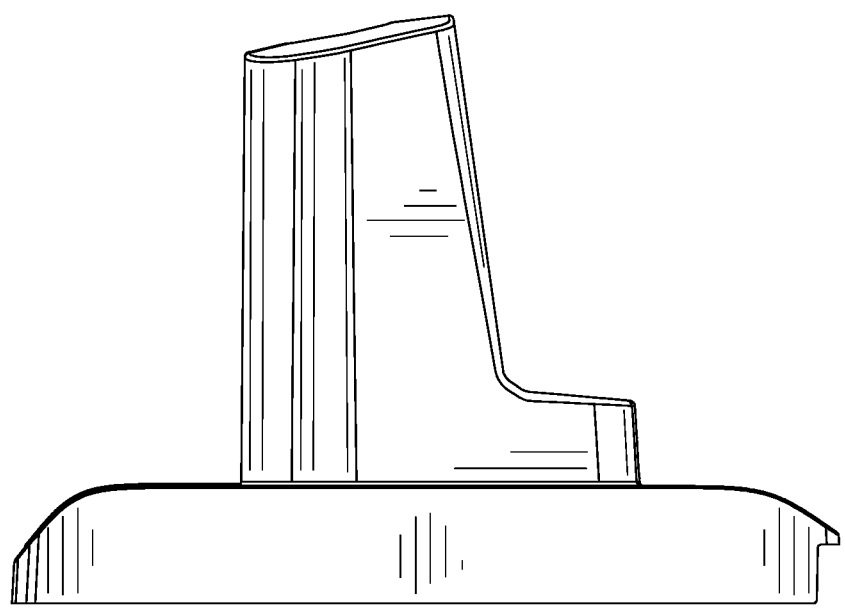
FIG. 91 illustrates a right side elevation view of the example cup assembly of FIGS. 86-90 in accordance with various embodiments.
Figure 92:
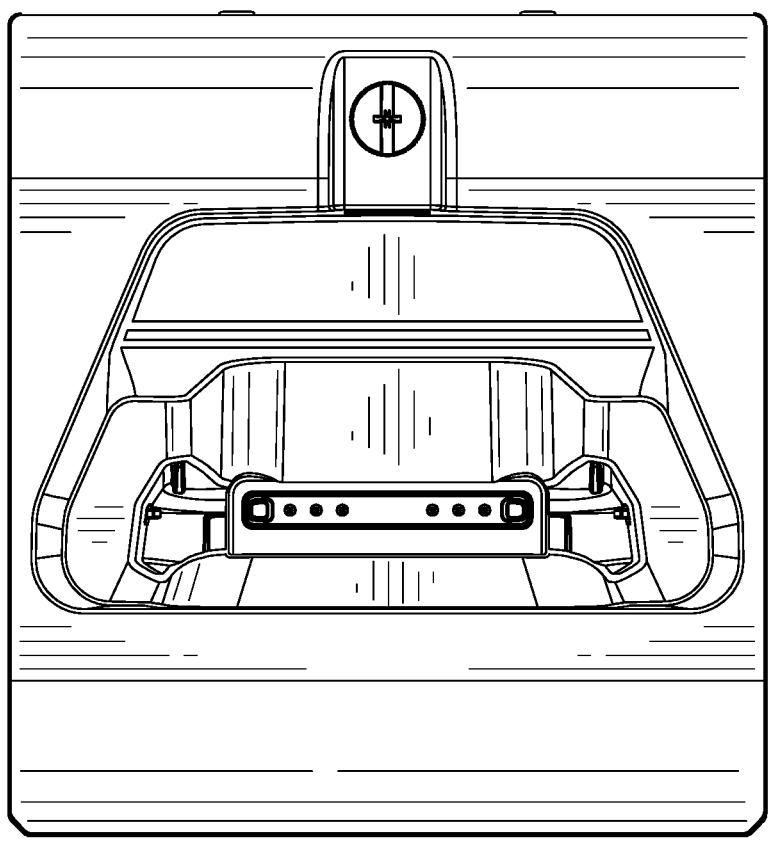
FIG. 92 illustrates a top plan view of the example cup assembly of FIGS. 86-91 in accordance with various embodiments.
Figure 93:
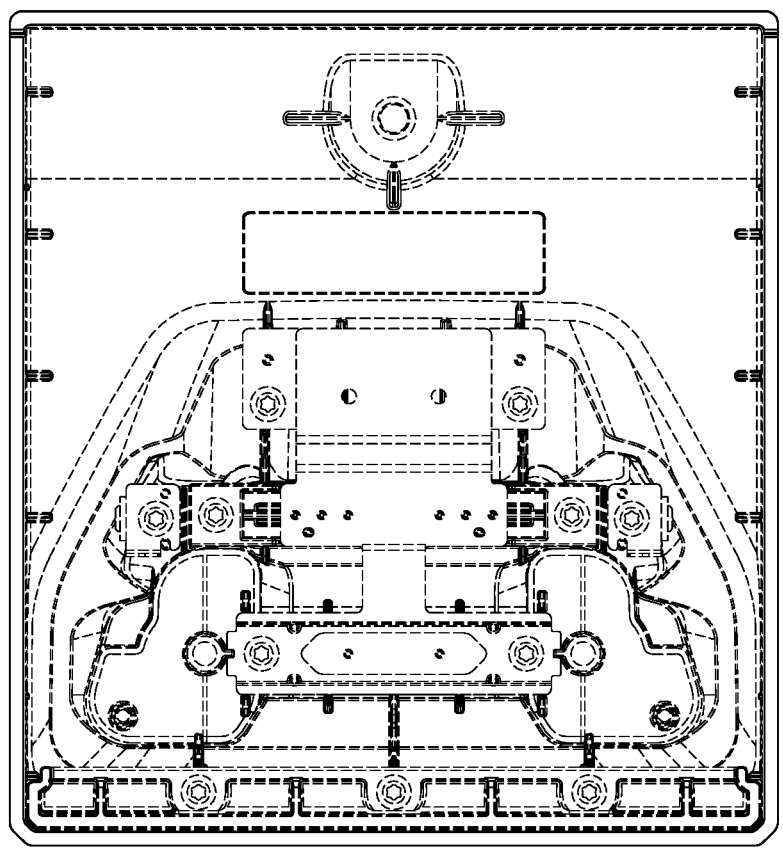
FIG. 93 illustrates a bottom plan view of the example cup assembly of FIGS. 86-92 in accordance with various embodiments.

In some examples, and with reference to FIG. 23, an alternative cradle 600 may be provided capable of accommodating a number of handheld scanning devices and/or additional components. In this example, the cradle 600 may include a number of base assemblies 120, each having respective top housing assemblies 130 and circuit board assemblies 150 coupled therewith. In such a configuration, any number of cup assemblies may be coupled thereto, including cup assemblies having different configurations to receive different handheld scanning devices as desired. In some examples, the entire handheld scanning device may be disposed within these and other cup assemblies, and in other examples, a portion of the handheld scanning device (e.g., the terminal) may be retained by the desired cup assembly to be charged and/or to transmit data while the remainder of the device is used in the field. Further, in some examples, the cradle 600 may include battery receptacles 605 to receive battery units which are removed from their respective handheld scanning device.

So configured, the cradle 100 described herein may be used with different cup assemblies having different interfaces as needed to reduce a number of distinct cradle SKUs in the environment. Such a configuration eliminates the need to disassemble the entire cradle, thereby avoiding problems such as incorrect reassembly, loose connections, and/or contamination. In some examples, the top housing assembly 130 may provide a liquid drain path that prevents any liquids from contacting the circuit board assembly 150 and/or any components disposed within the cavity 121 of the base assembly 120. Further, a replacement cup assembly of the same or different type may be quickly coupled with the top housing assembly 130.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A cradle for a handheld scanning device, comprising:
    a base assembly including a coupling mechanism;
    a top housing assembly operably coupled with the coupling mechanism of the base assembly, the top housing assembly including a housing opening;
    a circuit board assembly at least partially disposed within the housing opening, the circuit board assembly including a board communication interface and at least one of a power interface or a data connection interface; and
    a first cup assembly adapted to removably couple with at least one of the base assembly or the top housing assembly, the first cup assembly including at least one dock to operably couple with a handheld scanning device and further including a cup communication interface;
    wherein the board communication interface is adapted to communicatively couple with the cup communication interface to allow transmission between at least one of the power interface or the data interface and the handheld scanning device.

2. The cradle of claim 1, wherein the cup communication interface comprises a flex tail interconnection.

3. The cradle of claim 2, wherein the flex tail interconnection includes at least one of a leaf spring contact or a pogo pin connection.

4. The cradle of claim 1, wherein the board communication interface includes at least one of a leaf spring contact or a pogo pin connection.

5. The cradle of claim 1, further including a retention mechanism adapted to secure the first cup assembly with the top housing assembly.

6. The cradle of claim 5, wherein the retention mechanism comprises a coin screw.

7. The cradle of claim 1, wherein the first cup assembly further includes a latch adapted to rotatably couple the first cup assembly with the top housing assembly or the base assembly.

8. The cradle of claim 1, wherein the first cup assembly includes a first dock adapted to receive a sled of the handheld scanning device and a second dock adapted to receive a terminal of the handheld scanning device.

9. The cradle of claim 1, wherein the cradle is adapted to retain a plurality of base assemblies.

10. A cradle for a handheld scanning device, comprising:
    a base assembly including a coupling mechanism;
    a top housing assembly operably coupled with the coupling mechanism of the base assembly, the top housing assembly including a housing opening;
    a circuit board assembly at least partially disposed within the housing opening, the circuit board assembly including at least one of a power interface or a data connection interface, the circuit board assembly further including a board communication interface to removably couple with at least one of: 1) a first cup assembly including a cup communication interface to communicatively couple with the board communication interface and at least one dock having a first configuration to operably couple with a handheld scanning device; or 2) a second cup assembly including a cup communication interface to communicatively couple with the board communication interface and at least one dock having a second configuration to operably couple with the handheld scanning device.

11. The cradle of claim 10, wherein the board communication interface includes at least one of a leaf spring contact or a pogo pin connection.

12. The cradle of claim 10, further including a retention mechanism adapted to secure the first cup assembly or the second cup assembly with the top housing assembly.

13. The cradle of claim 12, wherein the retention mechanism comprises a coin screw.

14. The cradle of claim 10, wherein the first cup assembly and the second cup assembly are adapted to be rotatably coupled with the top housing assembly or the base assembly via a latch.

15. The cradle of claim 10, wherein the cradle is adapted to retain a plurality of base assemblies.

16. A method of manufacturing a cradle having a replaceable cup assembly, the method comprising:
    operably coupling a cable with an interface of a circuit board assembly, the circuit board assembly further including a board communication interface;
    at least partially disposing the circuit board assembly within a top housing opening of a top housing assembly;
    operably coupling the top housing assembly with a coupling mechanism of a base assembly; and
    removably coupling a first cup assembly including a cup communication interface and at least one dock to operably couple with a handheld scanning device with at least one of the base assembly or the top housing assembly.

17. The method of claim 16, wherein the step of removably coupling causes the board communication interface of the circuit board to electrically couple with the cup communication interface of the first cup assembly.

18. The method of claim 16, further comprising the step of securing the first cup assembly with at least one of the base assembly or the top housing assembly via a coin screw.

19. The method of claim 18, further comprising the step of replacing the first cup assembly with a second cup assembly including a cup communication interface and at least one dock.

* * * * *